US007529325B2

(12) United States Patent
Li

(10) Patent No.: US 7,529,325 B2
(45) Date of Patent: *May 5, 2009

(54) VOICE AND DATA EXCHANGE OVER A PACKET BASED NETWORK WITH TIMING RECOVERY

(75) Inventor: Henry Li, Vancouver (CA)

(73) Assignee: Broadcom Corporation, Irvine, CA (US)

( * ) Notice: Subject to any disclaimer, the term of this patent is extended or adjusted under 35 U.S.C. 154(b) by 0 days.
This patent is subject to a terminal disclaimer.

(21) Appl. No.: 10/918,829

(22) Filed: Aug. 13, 2004

(65) Prior Publication Data

US 2005/0018798 A1  Jan. 27, 2005

Related U.S. Application Data

(63) Continuation of application No. 10/341,807, filed on Jan. 14, 2003, now Pat. No. 6,850,577, which is a continuation of application No. 09/493,458, filed on Jan. 28, 2000, now Pat. No. 6,549,587, which is a continuation-in-part of application No. 09/454,219, filed on Dec. 9, 1999, now Pat. No. 6,882,711.

(60) Provisional application No. 60/154,903, filed on Sep. 20, 1999, provisional application No. 60/156,266, filed on Sep. 27, 1999, provisional application No. 60/157,470, filed on Oct. 1, 1999, provisional application No. 60/160,124, filed on Oct. 18, 1999, provisional application No. 60/161,152, filed on Oct. 22, 1999, provisional application No. 60/162,315, filed on Oct. 28, 1999, provisional application No. 60/163,169, filed on Nov. 2, 1999, provisional application No. 60/163,170, filed on Nov. 2, 1999, provisional application No. 60/163,600, filed on Nov. 4, 1999, provisional application No. 60/164,379, filed on Nov. 9, 1999, provisional application No. 60/164,690, filed on Nov. 10, 1999, provisional application No. 60/164,689, filed on Nov. 10, 1999, provisional application No. 60/166,289, filed on Nov. 18, 1999, provisional application No. 60/171,203, filed on Dec. 15, 1999, provisional application No. 60/171,180, filed on Dec. 16, 1999, provisional application No. 60/171,169, filed on Dec. 16, 1999, provisional application No. 60/171,184, filed on Dec. 16, 1999, provisional application No. 60/178,258, filed on Jan. 25, 2000.

(51) Int. Cl.
H04L 27/06 (2006.01)

(52) U.S. Cl. .................. 375/344; 375/324; 375/326; 375/354; 375/327

(58) Field of Classification Search ............. 375/304, 375/326, 344, 345, 376, 324, 354, 355, 327; 348/357; 329/3.4
See application file for complete search history.

(56) References Cited

U.S. PATENT DOCUMENTS 4,285,060 A    8/1981   Cobb et al.
(Continued)

FOREIGN PATENT DOCUMENTS

WO    WO 97/26753 A1    7/1997
WO    WO 97/28628 A1    8/1997

OTHER PUBLICATIONS

ETSI EN 300 973, Global System for Mobile Communications, Digital cellular telecommunications system (Phase 2+); Half rate speech; Voice Activity Detector (VAD) for half rate speech traffic channels; GSM 06.42 version 8.0.1 Release 1999); © 2000; pp. 1-22.
(Continued)

*Primary Examiner*—Ted Wang
(74) *Attorney, Agent, or Firm*—McAndrews, Held & Malloy, Ltd.

(57) ABSTRACT

A signal processing system which discriminates between voice signals and data signals modulated by a voiceband carrier. The signal processing system includes a voice exchange, a data exchange and a call discriminator. The voice exchange is capable of exchanging voice signals between a switched circuit network and a packet based network. The signal processing system also includes a data exchange capable of exchanging data signals modulated by a voiceband carrier on the switched circuit network with unmodulated data signal packets on the packet based network. The data exchange is performed by demodulating data signals from the switched circuit network for transmission on the packet based network, and modulating data signal packets from the packet based network for transmission on the switched circuit network. The call discriminator is used to selectively enable the voice exchange and data exchange.

15 Claims, 30 Drawing Sheets

U.S. PATENT DOCUMENTS

| | | | |
|---|---|---|---|
| 4,617,676 | A | 10/1986 | Jayant et al. |
| 5,119,322 | A | 6/1992 | Stroobach |
| 5,329,587 | A | 7/1994 | Morgan et al. |
| 5,339,384 | A | 8/1994 | Chen |
| 5,353,346 | A | 10/1994 | Cox et al. |
| 5,388,127 | A | 2/1995 | Scarpa |
| 5,452,289 | A | 9/1995 | Sharma et al. |
| 5,454,015 | A | 9/1995 | Olafsson |
| 5,471,470 | A | 11/1995 | Sharma et al. |
| 5,535,271 | A | 7/1996 | Jangi et al. |
| 5,577,041 | A | 11/1996 | Sharma et al. |
| 5,598,468 | A | 1/1997 | Ammicht et al. |
| 5,600,649 | A | 2/1997 | Sharma et al. |
| 5,661,765 | A * | 8/1997 | Ishizu ......................... 375/376 |
| 5,694,517 | A | 12/1997 | Sugino et al. |
| 5,764,627 | A | 6/1998 | Sharma et al. |
| 5,790,532 | A | 8/1998 | Sharma et al. |
| 5,790,641 | A | 8/1998 | Chan et al. |
| 5,793,498 | A | 8/1998 | Scholl et al. |
| 5,802,117 | A * | 9/1998 | Ghosh ......................... 375/344 |
| 5,818,929 | A | 10/1998 | Yaguchi |
| 5,841,323 | A * | 11/1998 | Fujimoto ..................... 331/11 |
| 5,852,630 | A | 12/1998 | Langberg et al. |
| 5,859,671 | A | 1/1999 | Kim |
| 5,893,054 | A * | 4/1999 | White ......................... 702/189 |
| 5,970,441 | A | 10/1999 | Mekuria |
| 5,987,061 | A | 11/1999 | Chen |
| 5,995,569 | A * | 11/1999 | Shimoi et al. ............... 375/354 |
| 6,023,470 | A | 2/2000 | Lee et al. |
| 6,028,679 | A | 2/2000 | Murphy |
| 6,125,177 | A | 9/2000 | Whittaker |
| 6,137,809 | A * | 10/2000 | Martinez et al. ............ 370/503 |
| 6,141,341 | A | 10/2000 | Jones et al. |
| 6,151,636 | A | 11/2000 | Schuster et al. |
| 6,218,896 | B1 * | 4/2001 | Becker et al. ............... 329/304 |
| 6,233,226 | B1 | 5/2001 | Gringeri et al. |
| 6,236,675 | B1 * | 5/2001 | Bedingfield et al. ......... 375/222 |
| 6,259,677 | B1 | 7/2001 | Jain |
| 6,366,628 | B1 * | 4/2002 | Su et al. ..................... 375/355 |
| 6,549,587 | B1 * | 4/2003 | Li .............................. 375/326 |
| 6,850,577 | B2 * | 2/2005 | Li .............................. 375/326 |
| 7,006,511 | B2 | 2/2006 | Lanzafame et al. |

OTHER PUBLICATIONS

Mike Gray, *Fax Technology Tutorial and Testing Issues*, Agilent Technologies, © 2000, pp. 1-20.

*Fax Over IP Opportunities and Options*, Natural MicroSystems, 7 sheets, Oct. 10, 2000.

EIA/TIA-464-B, Requirements for Private Branch Exchange (PBX) Switching Equipment, "6 Signaling Requirements, 6.1 Network Signaling—Analog," pp. 140-146, Apr. 1, 1996.

Man Mohan Sondhi et al., Silencing Echoes on the Telephone Network, Proceedings of the IEEE, © Aug. 1980, vol. 68, No. 8, pp. 948-963.

Bell Communications Research, *Dual-Tone Multifrequency Receiver Generic Requirements for End-to-End Signaling Over Tandem-Switched Voice Links*, © Mar. 1987, Technical Reference TR-TSY-000181 Issue 1, 11 sheets.

Bell Communications Research, *Impulse Noise Tape No. 201*, Technical Reference TR-TSY-000762 Issue 1, © Jul. 1987, 4 sheets.

Bell Communications Research, *Digit Simulation Test Tape*, Technical Reference TR-TSY-000763 Issue 1, © Jul. 1987, 6 sheets.

International Telecommunication Union, ITU-T Telecommunication Standardization Sector of ITU, General Aspects of Digital Transmission Systems, Terminal Equipments, *Pulse Code Modulation (PCM) of Voice Frequencies*, ITU-T Recommendation, G. 711; © ITU 1988, 1993; 8 sheets.

International Telecommunication Union, ITU-T Telecommunication Standardization Sector of ITU, Transmission Systems and Media, Apparatus Associated With Long-Distance Telephone Circuits and Other Terminal Equipments, *Echo Suppressors*, ITU-T Recommendation, G. 164; © ITU 1988, 1993; 36 sheets.

International Telecommunication Union, ITU-T Telecommunication Standardization Sector of ITU, General Aspects of Digital Transmission Systems, Terminal Equipments, *7 kHz Audio-Coding Within 64 Kbit/s*, ITU Recommendation; G. 722; © ITU 1988, 1993; 76 sheets.

International Telecommunication Union, ITU-T Telecommunication Standardization Sector of ITU, General Recommendations On Telephone Switching and Signalling, International Automatic and Semi-Automatic Working, *Technical Features of Push-Button Telephone Sets*, ITU-T Recommendation; Q 23; © ITU 1988, 1993, 4 sheets.

International Telecommunication Union, ITU-T Telecommunication Standardization Sector of ITU, General Recommendations on Telephone Switching and Signalling, International Automatic and Semi-Automatic Working, *Multifrequency Push-button Signal Reception*, ITU-T Recommendation, Q. 24, © ITU 1988, 1993, 7 sheets.

International Telecommunication Union, ITU-T Telecommunication Standardization Sector of ITU, Data Communication Over the Telephone Network,*300 Bits Per Second Duplex Modem Standardized For Use in The General Switched Telephone Network*, ITU-T Recommendation V. 21; © ITU 1988, 1993; 7 sheets.

International Telecommunication Union, ITU-T Telecommunication Standardization Sector of ITU, Data Communication Over the Telephone Network, *4800/2400 Bits Per Second Modem Standardized For Use in The General Switched Telephone Network*, ITU-T Recommendation, V.27 ter, © ITU 1988, 1993; 15 sheets.

International Telecommunication Union, ITU-T Telecommunication Standardization Sector of ITU, Data Communication Over the Telephone Network, *9600 Bits Per Second Modem Standardized For Use On Point-To-Point 4-Wire Leased Telephone-Type Circuits*, ITU-T Recommendation, V. 29, © ITU 1988, 1993, 17 sheets.

International Telecommunication Union, CCITT The International Telegraph and Telephone Consultative Committee, Data Communication Over the Telephone Network, *Data Compression Procedures For Data Circuit Terminating Equipment (DCE) Using Error Correction Procedures*, ITU-T Recommendation, V.42 bis; © ITU 1990; 29 sheets.

International Telecommunication Union, CCITT The International Telegraph and Telephone Consultative Committee, General Aspects of Digital Transmission Systems; Terminal Equipments, *40, 32, 24, 16 kbit/s Adaptive Differential Pulse Code Modulation (ADPCM)*, ITU-T Recommendation, G.726; © 1990; 59 sheets.

International Telecommunication Union, CCITT The International Telegraph and Telephone Consultative Committee, General Aspects of Digital Transmission Systems; Terminal Equipments, *5-, 4-, 3- And 2-bits Sample Embedded Adaptive Differential Pulse Code Modulation (ADPCM)*; Recommendation G. 727; © ITU 1990; 57 sheets.

International Telecommunication Union, CCITT—The International Telegraph and Telephone Consultative Committee, Data Communication Over the Telephone Network, *A 2-Wire Modem for Facsimile Applications With Rates up to 14 400 bit/s*, Recommendation V. 17; © ITU 1991; 13 sheets.

Dennis R. Morgan et al., AT & T Bell Laboratories; *A Multi-Tone Pseudo-Cascade Filtered-XLMS Adaptive Notch Filter*, Proceeding of the IEEE International Conference in Acoustic Speech and Signal Processing, ICASSP 91, vol. 3 D, May 1991, Toronto, Ontario, Canada, pp. 2093-2096.

Panos E. Papamichalis, Texas Instruments, Inc., *Practical Approaches to Speech Coding*, Prentice-Hall, Inc., Englewood Cliffs, New Jersey; 1992, pp. 163-167.

James Thi et al., AT & T Bell Laboratories; *A Broadband Pseudo-Cascade Active Control System*, Proceeding of the IEEE International Conference in Acoustic Speech and Signal Processing; © 1992 IEEE; pp. II-233-II-236.

International Telecommunication Union, ITU-T Telecommunication Standardization Sector of ITU; General Aspects of Digital Transmission Systems; Terminal Equipments, *Coding of Speech at 16 kbit/s Using Low-delay Code Excited Linear Prediction*, Recommendation G. 728; Sep. 1992, 65 sheets.

Dennis R. Morgan et al., AT & T Bell Laboratories, *A Multitone Pseudocascade Filtered-XLMS Adaptive Notch Filter*, IEEE Transcations on Signal Processing, vol. 41, No. 2; © Feb. 1993; pp. 946-956.

International Telecommunication Union, ITU-T Telecommunication Standardization Sector of ITU, General Characteristics of International Telephone Connections and International Telephone Circuits, *Echo Cancellers*, ITU-T Recommendation G. 165; © 1994; 31 sheets.

International Telecommunication Union, ITU-T Telecommunication Standardization Sector or ITU, Data Communication Over the Telephone Network, Error-Correcting Procedures for DCES Using Asynchronous-to- Synchronous Conversion, ITU-T Recommendation V. 42; © 1993; 78 sheets.

Gardner et al.; Qualcomm Inc.; *QCELP: A Variable Rate Speech Coder for CDMA Digital Cellular*, © 1993 by Kluwer Academic Publishers; Second Printing 1995; 9 sheets.

International Telecommunication Union, ITU-T Telecommunication Standardization Sector of ITU; Data Communication Over The Telephone Network, *A Modem Operating At Data Signalling Rates Of Up To 28 800 bit/s For Use On The General Switched Telephone Network And On Leased Point-To-Point 2-Wire Telephone-Type Circuits*, ITU-T Recommendation V.34; © ITU 1994; 43 sheets.

International Telecommunication Union ITU-T Telecommunication Standardization Sector of ITU, General Aspects of Digital Transmission Systems, *Coding of Speech at 16 kbit/s Using Low-Delay Code Excited Linear Prediction*, Annex G: 16 kbit/s Fixed Point Specification, ITU-T Recommendation G.728—Annex G; © ITU 1995; 67 sheets.

IEEE; IEEE Standards for Local and Metropolitan Area Networks: Supplement to Carrier Sense Multiple Access with Collision Detection (CSMA/CD) Access Method and Physical Layer Specifications, Media Access Control (MAC) Parameters, Physical Layer, Medium Attachment Units, and Repeater for 100 Mb/s Operation, Type 100BASE-T (Clauses 21-30); © 1995; 408 sheets.

Dennis R. Morgan et al., *A Delayless Subband Adaptive Filter Architecture*, IEEE Transactions on Signal Processing; vol. 43, No. 8; © Aug. 1995, pp. 1819-1830.

Internet Papers: Schulzrinne H.; *RTP Profile for Audio and Video Conferences with Minimal Control*, Network Working Group Request for Comments: 1890; http://www.cis.ohio-state.edu/cgi-bin/rfc/rfc1890.html; Jan. 1996; 15 sheets.

International Telecommunication Union, ITU-T Telecommunication Standardization Sector of ITU, General Aspects of Digital Transmission Systems, *Dual Rate Speech Coder For Multimedia Communications Transmitting at 5.3 and 6.3 kbit/s*; ITU-T Recommendation G. 723.1; © ITU 1996; 31 sheets.

International Telecommunication Union ITU-T Telecommunication Standardization Sector of ITU, General Aspects of Digital Transmission Systems, *Coding of Speech at 8 kbit/s Using Conjugate-Structure Algebraic-Code-Excited Linear-Prediction (CS-ACELP)*; ITU-T Recommendation G.729; © ITU 1996; 38 sheets.

Bellcore Bell Communication Research, Generic Requirements GR-506-CORE, *LSSGR: Signaling for Analog Interfaces*, (A Module of LSSGR, FR-64); Issue 1; © Jun. 1996; 240 sheets.

International Telecommunication Union, ITU-T-Telecommunication Standardization Sector of ITU, Series T: Terminal Equipments and Protocols for Telematic Services, *Procedures for Document Facsimile Transmission in the General Switched Telephone Network*, ITU-T Recommendation T. 30; © ITU 1997; 74 sheets.

International Telecommunication Union, ITU-T Telecommunication Standardization Sector of ITU, Series T: Terminal Equipments and Protocols for Telematic Services, *Standardization of Group 3 Facsimile Terminals for Document Transmission*, ITU-T Recommendation T. 4; © ITU 1997; 61 sheets.

International Telecommunication Union, ITU-T Telecommunication Standardization Sector of ITU, Series G: Transmission Systems and Media, Digital Transmission Systems—Terminal Equipments—Coding of Analogue Signals By Methods Other Than PCM, *Dual Rate Speech Coder for Multimedia Communications Transmitting at 5.3 and 6.3 kbit/s, Annex A: Silence Compression Scheme*; ITU-T Recommendation G.723.1—Annex A; © ITU 1997; 22 sheets.

International Telecommunication Union, ITU-T Telecommunication Standardization Sector of ITU, Series G: Transmission Systems and Media, Digital Transmission Systems—Terminal Equipments—Coding of Analogue Signals by Methods Other Than PCM, Coding of Speech at 8 kbit/s Using Conjugate Structure Algebraic-Code-Excited Linear-Prediction (CS-ACELP), Annex B: A Silence Compression Scheme For G.729 Optimized for Terminals Conforming to Recommendation V.70, ITU-T Recommendation G.729—Annex B; © ITU 1997; 23 sheets.

International Telecommunication Union, ITU-T Telecommunication Standardization Sector of ITU, Series G: Transmission Systems and Media, Digital Transmission Systems—Terminal Equipments—Coding of Analogue Signals by Methods Other Than PCM, *Coding of Speech at 8 kbit/s Using Conjugate Structure Algebraic-Code-Excited Linear-Prediction (CS-ACELP) Annex A: Reduced Complexity 8 kbit/s CS-ACELP Speech Codec*, ITU-T Recommendation G.729—Annex A; © ITU 1997; 15 sheets.

European Telecommunication Standard, *Digital Cellular Telecommunications System; Half Rate Speech; Voice Activity Detector (VAD) for Half Rate Speech Traffic Channels (GSM 06.42 version 5.0.1)*; Source ETS; TC-GSM; Reference DE/SMG-110642Q; © 1997; 21 sheets.

International Telecommunication Union, ITU-T, Telecommunication Standardization Sector of ITU, Series I: Integrated Services Digital Network, Overall Network Aspects and Functions—Protocol Layer Requirements, *B-ISDN ATM Adaptation Layer Specification: Type 2 AAL*, ITU-T Recommendation I.363.2; © 1998; 47 sheets.

Internet Papers: Perkins et al.; *RTP Payload for Redundant Audio Data*; Network Working Group Request for Comments: 2198; http://www.cis.ohio-state.edu/cgi-bin/rfc/rfc2198.html; Sep. 1997; pp. 1-9.

Internet Papers: Schulzrinne, "RTP Profile for Audio and Video Conferences with Minimal Control," Internet Engineering Task Force, Internet Draft; http://hegel.ittc.ukans.edu/topics/internet/internet-drafts/draft-i/draft-ietf-avt-profile-new-C..; Nov. 20, 1997; pp. 1-29.

IMTC Voice over IP Forum Technical Committee, "IMTC Voice over IP Forum Service Interoperability Implementation Agreement 1.0," Dec. 1, 1997, VoIP97-061; pp. 1-44.

Edward B. Morgan, Fax Over Packet; Telogy Networks, Inc., Germantown, Maryland; © 1998; pp. 1-12.

International Telecommunication Union, ITU-T Telecommunication Standardization Sector of ITU, Series V: Data Communication Over the Telephone Network, Simultaneous Transmission of Data and Other Signals, *A Digital Modem and Analogue Modem Pair For Use on the Public Switched Telephone Network (PSTN) at Data Signalling Rates of up to 56 000 bit/s Downstream and up to 33 600 bit/s Upstream*, ITU-T Recommendation V. 90; © ITU 1999; 49 sheets.

Frame Relay Forum Technical Committee, *Voice over Frame Relay Implementation Agreement*; © 1998; 54 sheets.

International Telecommunication Union, ITU-T Telecommunication Standardization Sector of ITU, Series I: Integrated Services Digital Network, Overall Network Aspects and Functions—Protocol Layer Requirements, *AAL Type 2 Service Specific Convergence Sublayer For Trunking*; ITU-T Recommendation I.366.2; © ITU 1999; 96 sheets.

International Telecommunication Union, ITU-T Telecommunication Standardization Sector of ITU, Series G: Transmission Systems and Media, Digital Systems and Networks, *Automatic Level Control Devices*; ITU-T Recommendation G.169; © ITU 1999; pp. 1-52.

Internet Papers: Schulzrinne et al.; *RTP Payload for DTMF Digits, Telephony Tones and Telephony Signals*; Network Working Group Request for Comments: 2833; © The Internet Society 2000; 31 sheets.

International Telecommunication Union, ITU-T Telecommunication Standardization Sector of ITU, Series G: Transmission Systems and Media, Digital Systems and Networks, International Telephone Connections and Circuits—Apparatus Associated With Long-Distance Telephone Circuits, *Digital Network Echo Cancellers*; ITU-T Recommendation G. 168; © ITU 1997; 95 sheets.

CCITT The International Telegraph and Telephone Consultative Committee, "A Duplex Modem Operating at Data Signalling Rates of up to 14 400 bits/s For Use on the General Switched Telephone Network and on Leased Point-to-Point 2-Wire Telephone-Type Circuits," Data Communication Over the Telephone Network, 1991, 24 pages, Recommendation V.32 bis, ITU, Geneva.

ITU-T Telecommunication Standardization Sector of ITU, "A Family of 2-Wire, Duplex Modems Operating at Data Signalling Rates of up to 9600 bit/s For Use on the General Switched Telephone Network and on Leased Telephone-Type Circuits," Data Communication Over the Telephone Network, Mar. 1993, 26 pages, ITU-T Recommendation V32, ITU.

ITU-T Telecommunication Standardization Sector of ITU, "1200 Bits Per Second Duplex Modem Standardized For Use in the General Switched Telephone Network and on Point-to-Point 2-Wire Leased Telephone-Type Circuits," Data Communication Over the Telephone Network (Extract from the Blue Book), 1988, 1993, 16 pages, ITU-T Recommendation V.22, ITU.

International Telecommunication Union, ITU-T Telecommunication Standardization Sector of ITU, Series V: Data Communication Over The Telephone Network, "A Modem Operating at Data Signalling Rates of up to 33 600 bit/s for Use on the General Switched Telephone Network and on Leased Point-to-Point 2-Wire Telephone-Type Circuits," Feb. 1998, 78 pages, ITU-T Recommendation V. 34, ITU.

ITU-T Telecommunication Standardization Sector of ITU, "2400 Bits Per Second Duplex Modem Using the Frequency Division Technique Standardized for use on the General Switched Telephone Network and on Point-to-Point 2-Wire Leased Telephone-Type Circuits", Data Communication Over the Telephone Network (Extract from the Blue Book), 1988, 1993, 18 pages, ITU-T Recommendation V.22 bis, ITU.

ITU-T Telecommunication Standardization Sector of ITU, "Procedures for Real Time Group 3 Facsimile Communication Over IP Networks", Series T: Terminals for Telematic Services, Jun. 1998, 32 pages, Prepublished Recommendation T.38, ITU.

Fuyun Ling and Shahid Qureshi, "Convergence and Steady-State Behavior of a Phase-Splitting Fractionally Spaced Equalizer, "IEEE Transactions on Communications, Apr. 4, 1990, pp. 418-425, vol. 38, No. 4, IEEE.

Paul Fischer, "State Machines In C," The C Users Journal, Dec. 1990, pp. 199-122.

R. W. Lucky, Applications of Communications Theory, pp. 127-134, Chapter 13, Bellcore, Aug. 31, 1995.

Edward A. Lee and David G. Messerschmitt, Adaptive Equalization, Digital Communication, pp. 371-402, Chapter 9, 1998.

John A.C. Bingham, Timing Recovery, The Theory and Practice of Modem Design, pp. 189-236, Chapter 7, Canada, Apr. 26, 1988.

Edward A. Lee and David G. Messerschmitt, Digital Communication, Timing Recovery, pp. 560-582, 1998.

John G. Proakis, Digital Communications, Digital Signaling Over a Channel With Intersymbol Interference, ISBN 0-07-05097-1, Copyright 1983, pp. 357-381.

John A.C. Bingham, The Theory and Practice of Modem Design, Copyright 1988, Chapter 8 Linear Adaptive Equalizers, pp. 237-252.

William Webb and Lajos Hanzo, Modern Quadrature Amplitude Modulation, Principles and Applications for Fixed and Wireless Communications, Chapter 7 Basic Equaliser Techniques, pp. 197-211, Aug. 1994.

Applications of Communications Theory Series Editor: R.W. Lucky, Bellcore, QAM Receiver II. The Passband Adaptive Equalizer and Carrier Recovery System, pp. 137-151, Aug. 31, 1995.

* cited by examiner

US 7,529,325 B2

VOICE AND DATA EXCHANGE OVER A PACKET BASED NETWORK WITH TIMING RECOVERY

CROSS REFERENCE TO RELATED APPLICATIONS

This application is a continuation of patent application Ser. No. 10/341,807 filed Jan. 14, 2003, now U.S. Pat. No. 6,850,577 which is a continuation of patent application Ser. No. 09/493,458 filed Jan. 28, 2000, now issued as U.S. Pat. No. 6,549,587, which is a continuation-in-part of patent application Ser. No. 09/454,219, filed Dec. 9, 1999 now U.S. Pat. No. 6,882,711, and claims benefit of 60/154,903, filed Sep. 20, 1999; and claims benefit of 60/156,266, filed Sep. 27, 1999; and claims benefit of 60/157,470, filed Oct. 1, 1999; and claims benefit of 60/160,124, filed Oct. 18, 1999; and claims benefit of 60/161,152, filed Oct. 22, 1999; and claims benefit of 60/162,315, filed Oct. 28, 1999; and claims benefit of 60/163,169, filed Nov. 2, 1999; and claims benefit of 60/163,170, filed Nov. 2, 1999; and claims benefit of 60/163,600, filed Nov. 4, 1999; and claims benefit of 60/164,379, filed Nov. 9, 1999; and claims benefit of 60/164,690, filed Nov. 10, 1999; and claims benefit of 60/164,689, filed Nov. 10, 1999; and claims benefit of 60/166,289, filed Nov. 18, 1999; and claims benefit of 60/171,203, filed Dec. 15, 1999; and claims benefit of 60/171,180, filed Dec. 16, 1999; and claims benefit of 60/171,169, filed Dec. 16, 1999; and claims benefit of 60/171,184, filed Dec. 16, 1999; and claims benefit of 60/178,258, filed Jan. 25, 2000.

This application contains subject matter that is related to patent application Ser. No. 09/639,527, filed Aug. 16, 2000, now issued as U.S. Pat. No. 6,757,367; co-pending patent application Ser. No. 09/643,920, filed Aug. 23, 2000; co-pending patent application Ser. No. 09/692,554, filed Oct. 19, 2000; co-pending patent application Ser. No. 09/644,586, filed Aug. 23, 2000; co-pending patent application Ser. No. 09/643,921, filed Aug. 23, 2000; co-pending patent application Ser. No. 09/653,261, filed Aug. 31, 2000; co-pending patent application Ser. No. 09/654,376, filed Sep. 1, 2000; co-pending patent application Ser. No. 09/533,022, filed Mar. 22, 2000; co-pending patent application Ser. No. 09/697,777, filed Oct. 26, 2000; co-pending patent application Ser. No. 09/522,184, filed Mar. 9, 2000; and, patent application Ser. No. 09/651,006, filed Aug. 29, 2000, now issued as U.S. Pat. No. 6,504,838.

FIELD OF THE INVENTION

The present invention relates generally to telecommunications systems, and more particularly, to a system for interfacing telephony devices with packet based networks.

BACKGROUND

Telephony devices, such as telephones, analog fax machines, and data modems, have traditionally utilized circuit switched networks to communicate. With the current state of technology, it is desirable for telephony devices to communicate over the Internet, or other packet based networks. Heretofore, an integrated system for interfacing various telephony devices over packet based networks has been difficult due to the different modulation schemes of the telephony devices. Accordingly, it would be advantageous to have an efficient and robust integrated system for the exchange of voice, fax data and modem data between telephony devices and packet based networks.

SUMMARY OF THE INVENTION

In accordance with one aspect of the present invention, a method of compensating a signal includes averaging the signal in a first phase, and combining the average signal with the signal in a second phase.

In another aspect of the present invention, a method of timing recovery includes receiving a signal having a data rate, sampling the signal at a sampling rate, estimating a timing error between the data rate and the sampling rate, averaging the estimated timing error during a first phase, combining the averaged estimated timing error with the estimated timing error during a second phase, and adjusting the sampling rate as a function of the combined averaged estimated timing error and the estimated timing error.

In yet another aspect of the present invention, a method of timing recovery includes receiving a signal at a data rate, sampling the signal at a sampling rate, measuring a phase error between the data rate and the sampling rate, estimating a frequency error between the data rate and the sampling rate during a first phase, combining the phase error and the frequency error during a second phase, and adjusting the sampling rate as a function of the combined frequency error and phase error.

In a further aspect of the present invention, a signal compensator includes an estimator which estimates an average of the signal in a first phase, and a combiner which combines the signal with the estimated average signal in a second phase.

In yet a further aspect of the present invention, a timing recovery system includes a sampler capable of sampling a signal at a sampling rate, the signal having a data rate, a timing error estimator which estimates a phase error between the data rate and the sampling rate, a frequency offset estimator which estimates a frequency error between the data rate and the sampling rate during a first phase, a combiner which combines the estimated phase error and the estimated frequency error during a second phase, and a clock adjuster which adjusts the sampling rate of the sampler as a function of the combined estimated frequency error and estimated phase error.

In still yet another aspect of the present invention, a data transmission system includes a telephony device which outputs a signal having a data rate, a data exchange coupled to the telephony device, the data exchange having a sampler capable of sampling the signal at a sampling rate, a timing error estimator which estimates a phase error between the data rate and the sampling rate, a frequency offset estimator which estimates a frequency error between the data rate and the sampling rate during a first phase, a combiner which combines the phase error and the estimated frequency error during a second phase, and a clock adjuster which adjusts the sampling rate of the sampler as a function of the combined estimated frequency error and estimated phase error.

In still yet a further aspect of the present invention, a signal compensator includes estimation means for estimating an average of the signal in a first phase, and combining means for combining the signal with the estimated average signal in a second phase.

In an alternative aspect of the present invention, a timing recovery system includes sampling means for sampling a signal at a sampling rate, the signal having a data rate, phase error estimation means for estimating a phase error between the data rate and the sampling rate, frequency error estimation means for estimating a frequency error between the data rate and the sampling rate during a first phase, combining means for combining the estimated phase error and the estimated frequency error during a second phase, and clock adjusting means for adjusting the sampling rate of the sampler as a function of the combined estimated frequency error and estimated phase error.

In another aspect of the present invention, computer-readable media embodying a program of instructions executable by a computer performs a method of compensating a signal, the method includes averaging the signal in a first phase, and combining the average signal with the signal in a second phase.

In yet another aspect of the present invention, computer-readable media embodying a program of instructions executable by a computer performs a method of timing recovery, the method including receiving a signal having a data rate, sampling the signal at a sampling rate, estimating a timing error between the data rate and the sampling rate, averaging the estimated timing error during a first phase, combining the averaged estimated timing error with the estimated error during a second phase, and adjusting the sampling rate as a function of the combined averaged estimated timing error and the estimated timing error.

In still yet another aspect of the present invention, computer-readable media embodying a program of instructions executable by a computer performs a method of timing recovery, the method including receiving a signal at a data rate, sampling the signal at a sampling rate, measuring a phase error between the data rate and the sampling rate, estimating a frequency error between the data rate and the sampling rate during a first phase, combining the phase error and the frequency error during a second phase, and adjusting the sampling rate as a function of the combined frequency error and phase error.

It is understood that other embodiments of the present invention will become readily apparent to those skilled in the art from the following detailed description, wherein it is shown and described only embodiments of the invention by way of illustration of the best modes contemplated for carrying out the invention. As will be realized, the invention is capable of other and different embodiments and its several details are capable of modification in various other respects, all without departing from the spirit and scope of the present invention. Although the timing recovery system is described in the context of a data exchange, those skilled in the art will appreciate that the timing recovery system is likewise suitable for various other telephony and telecommunications application. Accordingly, the drawings and detailed description are to be regarded as illustrative in nature and not as restrictive.

DESCRIPTION OF THE DRAWINGS

These and other features, aspects, and advantages of the present invention will become better understood with regard to the following description, appended claims, and accompanying drawings where:

DETAILED DESCRIPTION

An Embodiment of a Signal Processing System

In a preferred embodiment of the present invention, a signal processing system is employed to interface telephony devices with packet based networks. Telephony devices include, by way of example, analog and digital phones, ethernet phones, Internet Protocol phones, fax machines, data modems, cable modems, interactive voice response systems, PBXs, key systems, and any other conventional telephony devices known in the art. The described preferred embodiment of the signal processing system can be implemented with a variety of technologies including, by way of example, embedded communications software that enables transmission of voice, fax and modem data over packet based networks. The embedded communications software is preferably run on programmable digital signal processors (DSPs) and is used in gateways, cable modems, remote access servers, PBXs, and other packet based network appliances.

Figure 1:
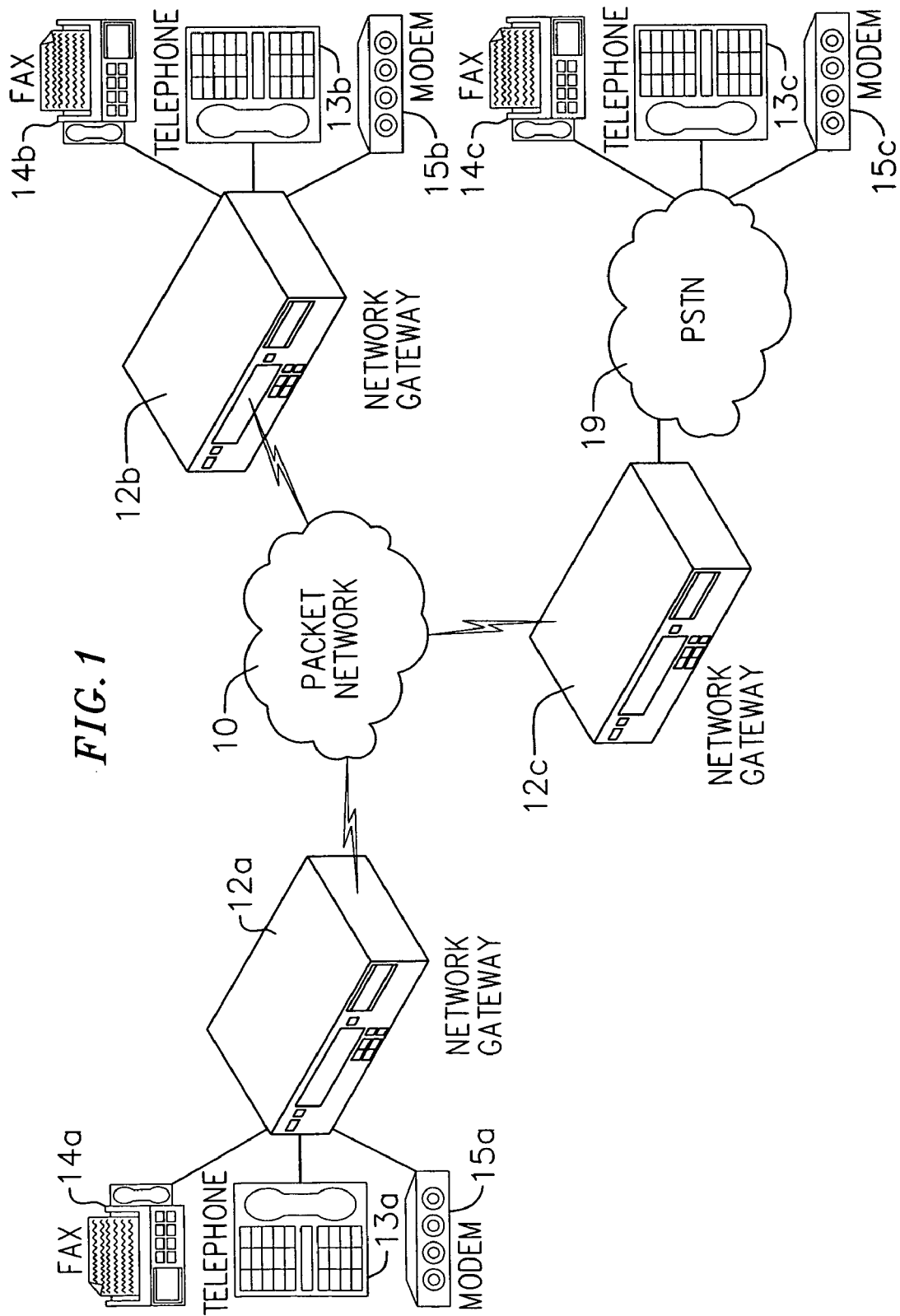
FIG. 1 is a block diagram of packet based infrastructure providing a communication medium with a number of telephony devices in accordance with a preferred embodiment of the present invention.

An exemplary topology is shown in FIG. 1 with a packet based network 10 providing a communication medium between various telephony devices. Each network gateway 12a, 12b, 12c includes a signal processing system which provides an interface between the packet based network 10 and a number of telephony devices. In the described exemplary embodiment, each network gateway 12a, 12b, 12c supports a fax machine 14a, 14b, 14c, a telephone 13a, 13b, 13c, and a modem 15a, 15b, 15c. As will be appreciated by those skilled in the art, each network gateway 12a, 12b, 12c could support a variety of different telephony arrangements. By way of example, each network gateway might support any number telephony devices and/or circuit switched networks including, among others, analog telephones, fax machines, data modems, PSTN lines (Public Switching Telephone Network), ISDN lines (Integrated Services Digital Network, T1 systems, PBXs, key systems, or any other conventional telephony device and/or circuit switched network. In the described exemplary embodiment, two of the network gateways 12a, 12b provide a direct interface between their respective telephony devices and the packet based network 10. The other network gateway 12c is connected to its respective telephony device through a PSTN 19. The network gateways 12a, 12b, 12c permit voice, fax and modem data to be carried over packet based networks such as PCs running through a USB (Universal Serial Bus) or an asynchronous serial interface, Local Area Networks (LAN) such as Ethernet, Wide Area Networks (WAN) such as Internet Protocol (IP), Frame Relay (FR), Asynchronous Transfer Mode (ATM), Public Digital Cellular Network such as TDMA (IS-13x), CDMA (IS-9x) or GSM for terrestrial wireless applications, or any other packet based system.

Figure 2:
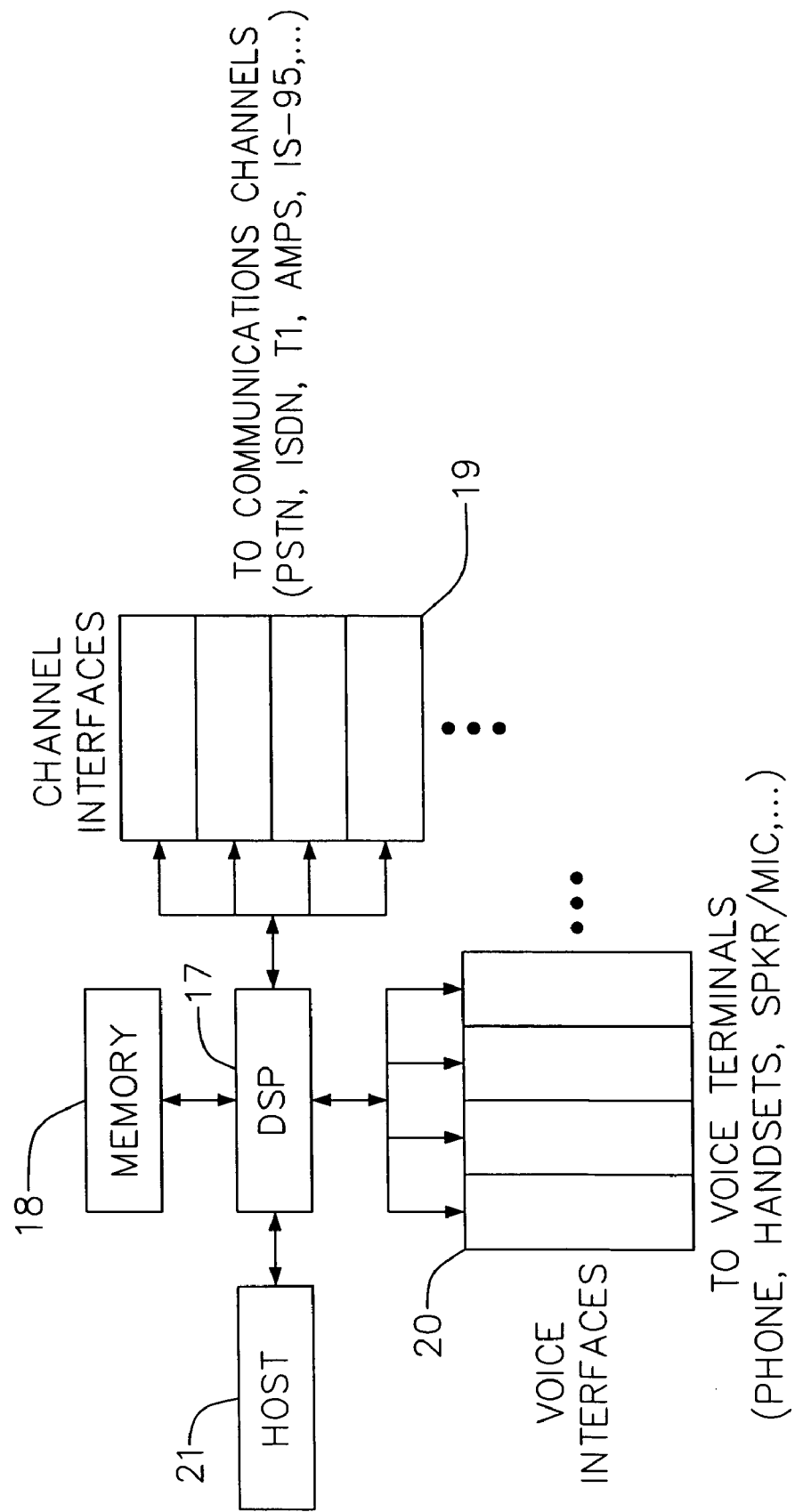
FIG. 2 is a block diagram of a signal processing system implemented with a programmable digital signal processor (DSP) software architecture in accordance with a preferred embodiment of the present invention.

The exemplary signal processing system can be implemented with a programmable DSP software architecture as shown in FIG. 2. This architecture has a DSP 17 with memory 18 at the core, a number of network channel interfaces 19 and telephony interfaces 20, and a host 21 that may reside in the DSP itself or on a separate microcontroller. The network channel interfaces 19 provide multi-channel access to the packet based network. The telephony interfaces 23 can be connected to a circuit switched network, such as a PSTN line, or directly to any telephony device. The programmable DSP is effectively hidden within the embedded communications software layer. The software layer binds all core DSP algorithms together, interfaces the DSP hardware to the host, and provides low level services such as the allocation of resources to allow higher level software programs to run.

Figure 3:
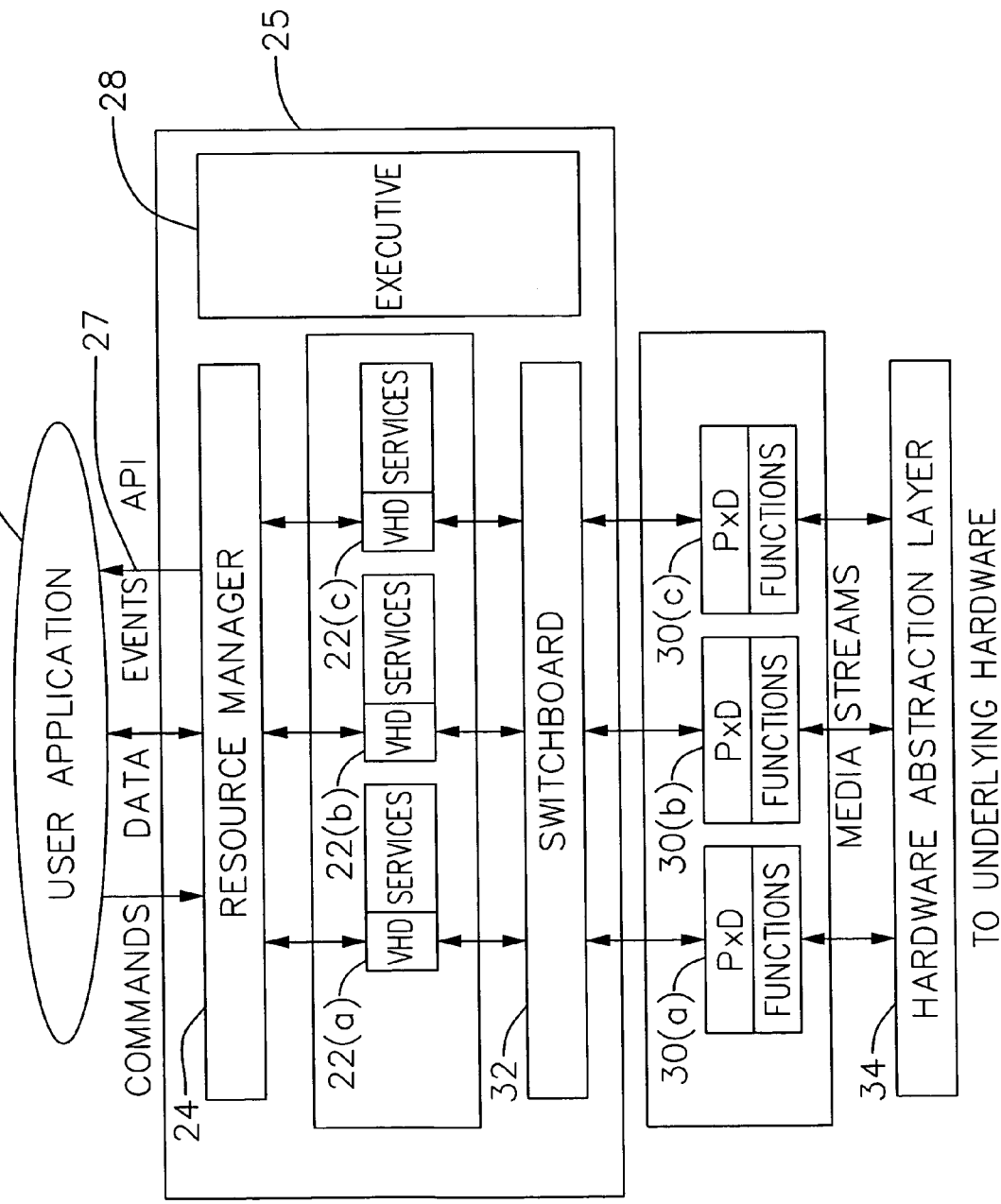
FIG. 3 is a block diagram of the software architecture operating on the DSP platform of FIG. 2 in accordance with a preferred embodiment of the present invention.

An exemplary multi-layer software architecture operating on a DSP platform is shown in FIG. 3. A user application layer 26 provides overall executive control and system management, and directly interfaces a DSP server 25 to the host 21 (see to FIG. 2). The DSP server 25 provides DSP resource management and telecommunications signal processing. Operating below the DSP server layer are a number of physical devices (PXD) 30a, 30b, 30c. Each PXD provides an interface between the DSP server 25 and an external telephony device (not shown) via a hardware abstraction layer (HAL) 34.

The DSP server 25 includes a resource manager 24 which receives commands from, forwards events to, and exchanges data with the user application layer 26. The user application layer 26 can either be resident on the DSP 17 or alternatively on the host 21 (see FIG. 2), such as a microcontroller. An application programming interface 27 (API) provides a software interface between the user application layer 26 and the resource manager 24. The resource manager 24 manages the internal/external program and data memory of the DSP 17. In addition the resource manager dynamically allocates DSP resources, performs command routing as well as other general purpose functions.

The DSP server 25 also includes virtual device drivers (VHDS) 22a, 22b, 22c. The VHDs are a collection of software objects that control the operation of and provide the facility for real time signal processing. Each VHD 22a, 22b, 22c includes an inbound and outbound media queue (not shown) and a library of signal processing services specific to that VHD 22a, 22b, 22c. In the described exemplary embodiment, each VHD 22a, 22b, 22c is a complete self-contained software module for processing a single channel with a number of different telephony devices. Multiple channel capability can be achieved by adding VHDs to the DSP server 25. The resource manager 24 dynamically controls the creation and deletion of VHDs and services.

A switchboard 32 in the DSP server 25 dynamically interconnects the PXDs 30a, 30b, 30c with the VHDs 22a, 22b, 22c providing multi-channel operation. Each PXD 30a, 30b, 30c is a collection of software objects which provide signal conditioning for one external telephony device. For example, a PXD may provide volume and gain control for signals from a telephony device prior to communication with the switchboard 32. Multiple telephony functionalities can be supported on a single channel by connecting multiple PXDS, one for each telephony device, to a single VHD via the switchboard 32. Connections within the switchboard 32 are managed by the user application layer 26 via a set of API commands to the resource manager 24. The number of PXDs and VHDs is expandable, and limited only by the memory size and the MIPS (millions instructions per second) of the underlying hardware.

A hardware abstraction layer (HAL) 34 interfaces directly with the underlying DSP 17 hardware (see FIG. 2) and exchanges telephony signals between the external telephony devices and the PXDS. The HAL 34 includes basic hardware interface routines, including DSP initialization, target hardware control, codec sampling, and hardware control interface routines. The DSP initialization routine is invoked by the user application layer 26 to initiate the initialization of the signal processing system. The DSP initialization sets up the internal registers of the signal processing system for memory organization, interrupt handling, timer initialization, and DSP configuration. Target hardware initialization involves the initialization of all hardware devices and circuits external to the signal processing system. The HAL 34 is a physical firmware layer that isolates the communications software from the underlying hardware. This methodology allows the communications software to be ported to various hardware platforms by porting only the affected portions of the HAL 34 to the target hardware.

The exemplary software architecture described above can be integrated into numerous telecommunications products. In an exemplary embodiment, the software architecture is designed to support telephony signals between telephony devices and/or circuit switched networks and packet based networks. A network VHD (NetVHD) is used to provide a single channel of operation and provide the signal processing services for transparently managing voice, fax, and modem data across a variety of packet based networks. More particularly, the NetVHD encodes and packetizes DTMF, voice, fax, and modem data received from various telephony devices and/or circuit switched networks and transmits the packets to the user application layer. In addition, the NetVHD disassembles DTMF, voice, fax, and modem data from the user application layer, decodes the packets into signals, and transmits the signals to the circuit switched network or device.

Figure 4:
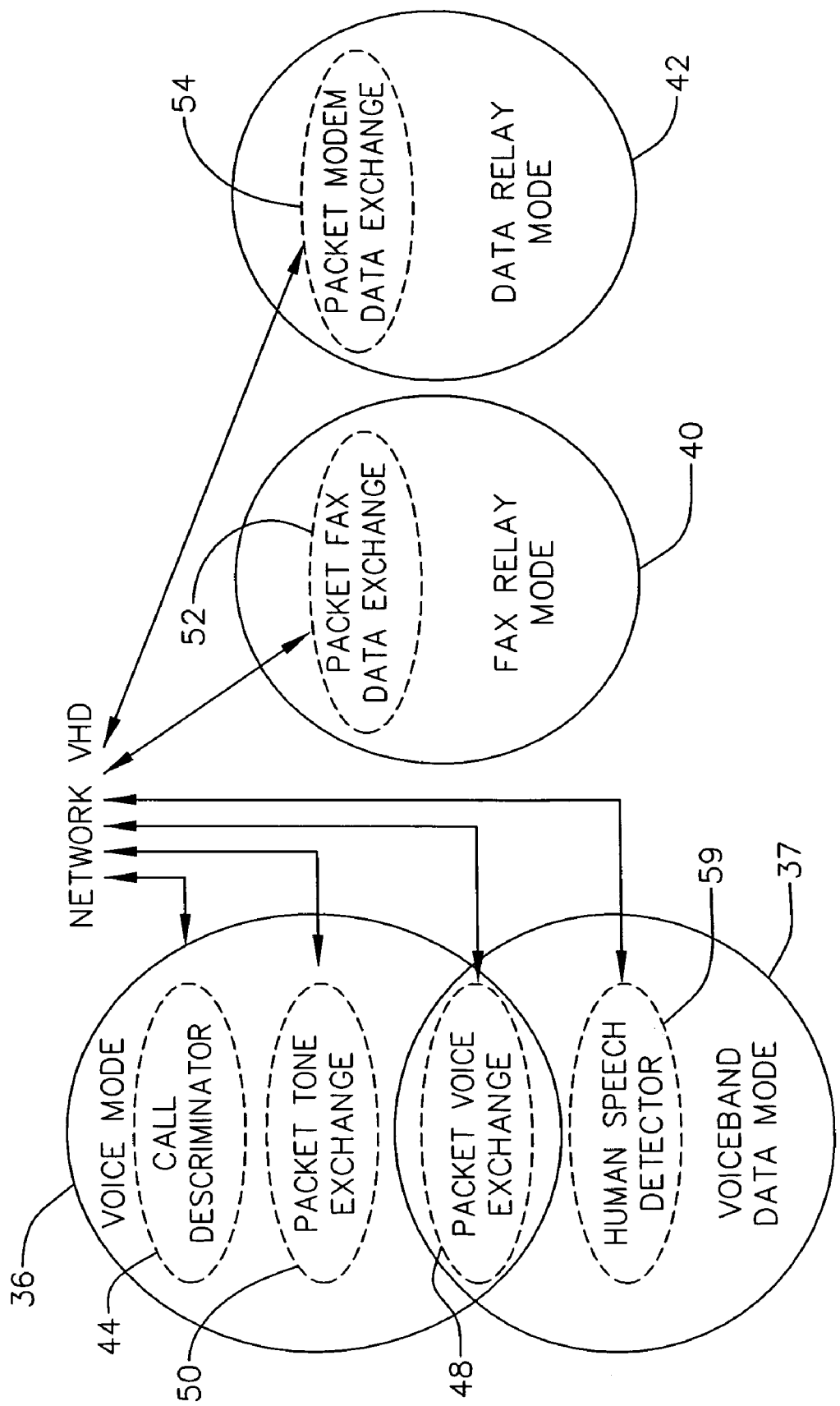
FIG. 4 is state machine diagram of the operational modes of a virtual device driver for packet based network applications in accordance with a preferred embodiment of the present invention.

An exemplary embodiment of the NetVHD operating in the described software architecture is shown in FIG. 4. The NetVHD includes four operational modes, namely voice mode 36, voiceband data mode 37, fax relay mode 40, and data relay mode 42. In each operational mode, the resource manager invokes various services. For example, in the voice mode 36, the resource manager invokes call discrimination 44, packet voice exchange 48, and packet tone exchange 50. The packet voice exchange 48 may employ numerous voice compression algorithms including, among others, Linear 128 kbps, G.711 u-law/A-law 64 kbps (ITU Recommendation G.711 (1988)—Pulse code modulation (PCM) of voice frequencies), G.726 16/24/32/40 kbps (ITU Recommendation G.726 (12/90)—40, 32, 24, 16 kbit/s Adaptive Differential Pulse Code Modulation (ADPCM)), G.729A 8 kbps (Annex A (11/96) to ITU Recommendation G.729—Coding of speech at 8 kbit/s using conjugate structure algebraic-code-excited linear-prediction (CS-ACELP)—Annex A: Reduced complexity 8 kbit/s CS-ACELP speech codec), and G.723 5.3/6.3 kbps (ITU Recommendation G.723.1 (03/96)—Dual rate coder for multimedia communications transmitting at 5.3 and 6.3 kbit/s). The contents of each of the foregoing ITU Recommendations being incorporated herein by reference as if set forth in full.

The packet voice exchange 48 is common to both the voice mode 36 and the voiceband data mode 37. In the voiceband data mode 37, the resource manager invokes the packet voice exchange 48 for exchanging transparently data without modification (other than packetization) between the telephony device or circuit switched network and the packet based network. This is typically used for the exchange of fax and modem data when bandwidth concerns are minimal as an alternative to demodulation and remodulation. During the voiceband data mode 37, the human speech detector service 59 is also invoked by the resource manager. The human speech detector 59 monitors the signal from the near end telephony device for speech. In the event that speech is detected by the human speech detector 59, an event is forwarded to the resource manager which, in turn, causes the resource manager to terminate the human speech detector service 59 and invoke the appropriate services for the voice mode 36 (i.e., the call discriminator, the packet tone exchange, and the packet voice exchange).

In the fax relay mode 40, the resource manager invokes a fax exchange 52 service. The packet fax exchange 52 may employ various data pumps including, among others, V.17 which can operate up to 14,400 bits per second, V.29 which uses a 1700-Hz carrier that is varied in both phase and amplitude, resulting in 16 combinations of 8 phases and 4 amplitudes which can operate up to 9600 bit per second, and V.27ter which can operate up to 4800 bits per second. Likewise, the resource manager invokes a packet data exchange 54 service in the data relay mode 42. The packet data exchange 52 may employ various data pumps including, among others, V.22bis/V.22 with data rates up to 2400 bits per second, V.32bis/V.32 which enables full-duplex transmission at 14,400 bits per second, and V.34 which operates up to 33,600 bits per second. The ITU Recommendations setting forth the standards for the foregoing data pumps are incorporated herein by reference as if set forth in full.

In the described exemplary embodiment, the user application layer does not need to manage any service directly. The user application layer manages the session using high-level commands directed to the NetVHD, which in turn directly runs the services. However, the user application layer can access more detailed parameters of any service if necessary to change, by way of example, default functions for any particular application.

In operation, the user application layer opens the NetVHD and connects it to the appropriate PXD. The user application then may configure various operational parameters of the NetVHD, including, among others, default voice compression (Linear, G.711, G.726, G.723.1, G.723.1A, G.729A, G.729B), fax data pump (Binary, V.17, V.29, V.27ter), and modem data pump (Binary, V.22bis, V.32bis, V.34). The user application layer then loads an appropriate signaling service (not shown) into the NetVHD, configures it and sets the NetVHD to the On-hook state.

In response to events from the signaling service (not shown) via a near end telephony device (hookswitch), or signal packets from the far end, the user application will set the NetVHD to the appropriate off-hook state, typically voice mode. In an exemplary embodiment, if the signaling service event is triggered by the near end telephony device, the packet tone exchange will generate dial tone. Once a DTMF tone is detected, the dial tone is terminated. The DTMF tones are packetized and forwarded to the user application layer for transmission on the packet based network. The packet tone exchange could also play ringing tone back to the near end telephony device (when a far end telephony device is being rung), and a busy tone if the far end telephony device is unavailable. Other tones may also be supported to indicate all circuits are busy, or an invalid sequence of DTMF digits were entered on the near end telephony device.

Once a connection is made between the near end and far end telephony devices, the call discriminator is responsible for differentiating between a voice and machine call by detecting the presence of a 2100 Hz. tone (as in the case when the telephony device is a fax or a modem), a 1100 Hz. tone or V.21 channel two modulated high level data link control (HDLC) flags (as in the case when the telephony device is a fax). If a 1100 Hz. tone, or V.21 modulated HDLC flags are detected, a calling fax machine is recognized. The NetVHD then terminates the voice mode 36 and invokes the packet fax exchange to process the call. If however, 2100 Hz tone is detected, the NetVHD terminates voice mode and invokes the packet data exchange.

The packet data exchange service further differentiates between a fax and modem by analyzing the incoming signal to determine whether V.21 modulated HDLC flags are present indicating that a fax connection is in progress. If HDLC flags are detected, the NetVHD terminates packet data exchange service and initiates packet fax exchange service. Otherwise, the packet data exchange service remains operative. In the absence of an 1100 or 2100 Hz. tone, or V.21 modulated HDLC flags the voice mode remains operative.

A. The Voice Mode

Figure 5:
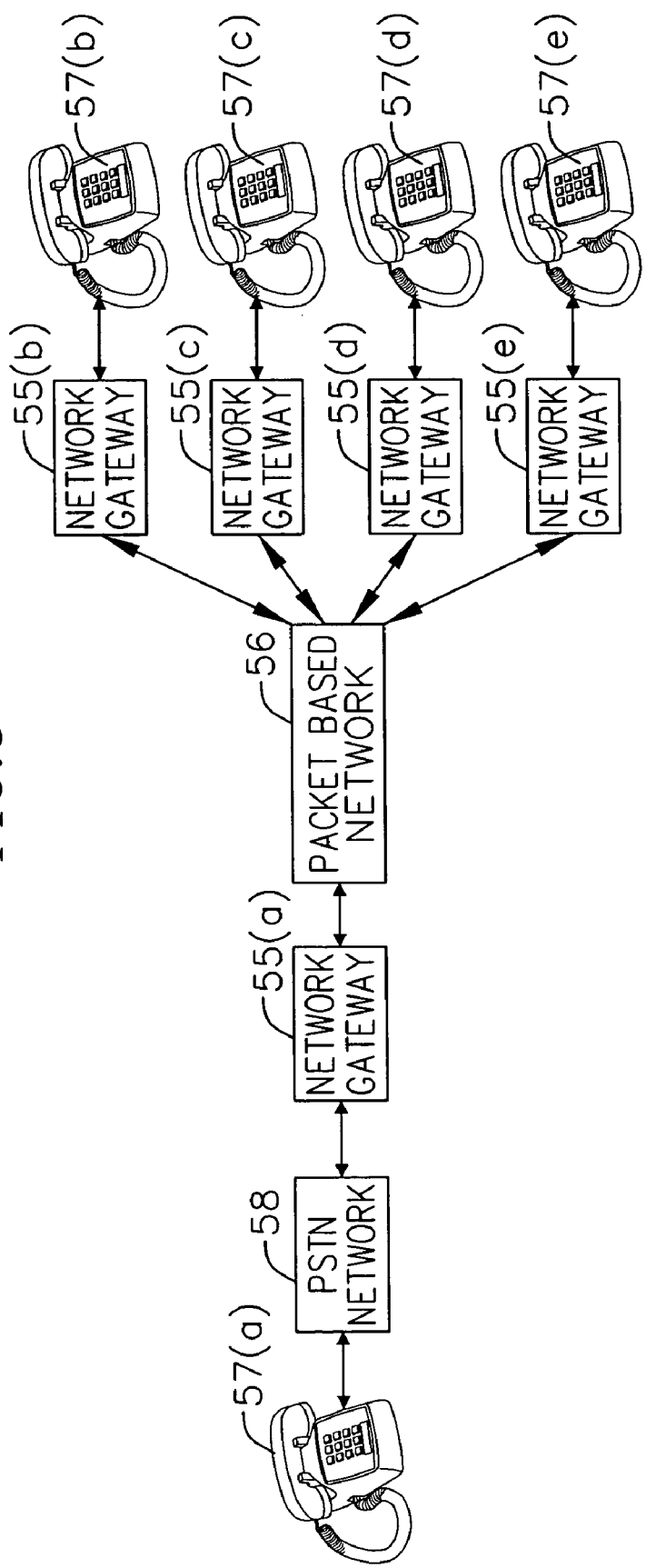
FIG. 5 is a block diagram of several signal processing systems in the voice mode for interfacing between a switched circuit network and a packet based network in accordance with a preferred embodiment of the present invention.

Voice mode provides signal processing of voice signals. As shown in the exemplary embodiment depicted in FIG. 5, voice mode enables the transmission of voice over a packet based system such as Voice over IP (VoIP, H.323), Voice over Frame Relay (VoFR, FRF-11), Voice Telephony over ATM (VTOA), or any other proprietary network. The voice mode should also permit voice to be carried over traditional media such as time division multiplex (TDM) networks and voice storage and playback systems. Network gateway 55a supports the exchange of voice between a traditional circuit switched 58 and a packet based network 56. In addition, network gateways 55b, 55c, 55d, 55e support the exchange of voice between the packet based network 56 and a number of telephones 57a, 57b, 57c, 57d, 57e. Although the described exemplary embodiment is shown for telephone communications across the packet based network, it will be appreciated by those skilled in the art that other telephony devices could be used in place of one or more of the telephones.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, voice activity detection, voice compression, and comfort noise estimation, and (2) a decoder system with delay compensation, voice decoding, DTMF generation, comfort noise generation and lost frame recovery.

Figure 6:
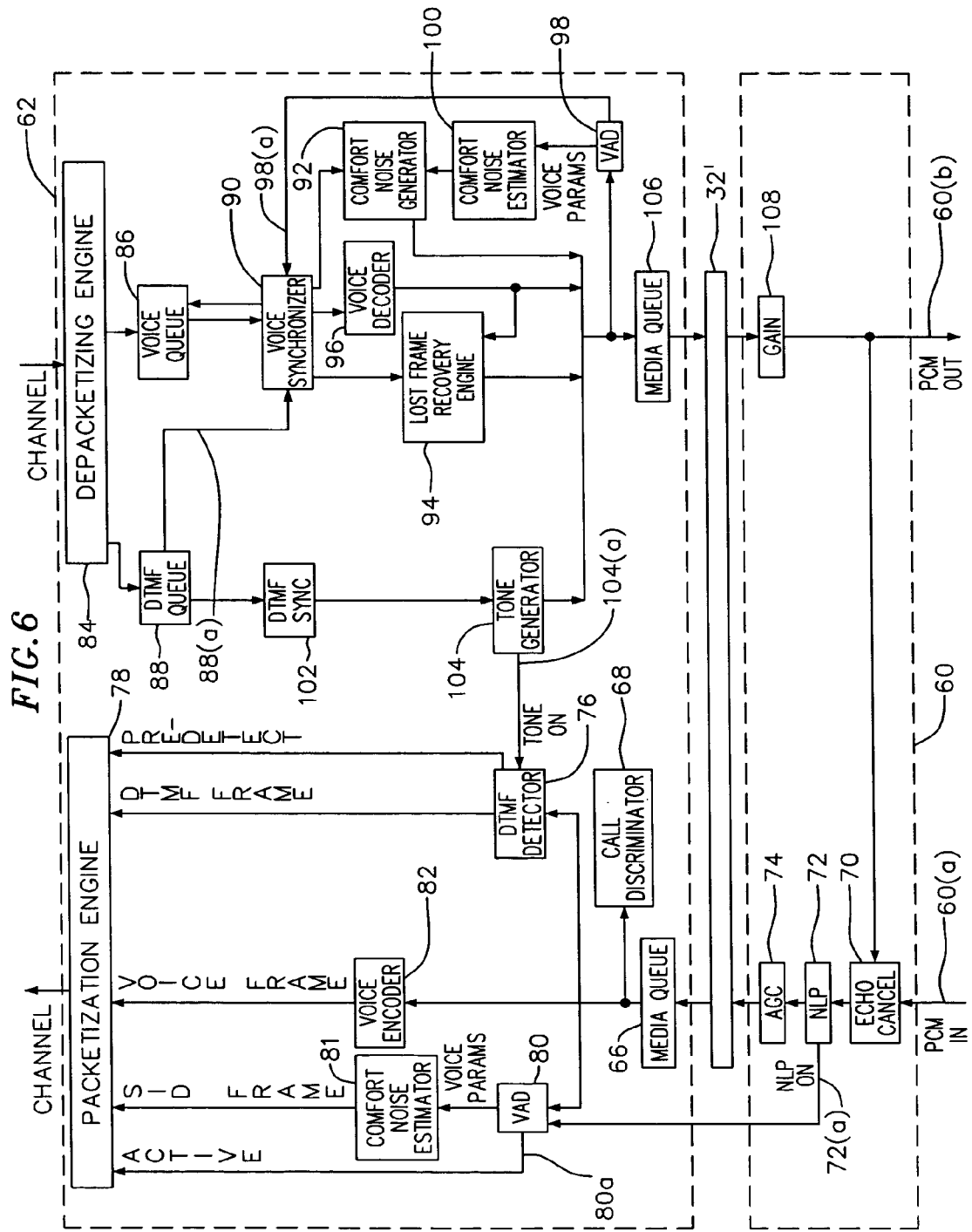
FIG. 6 is a system block diagram of a signal processing system operating in a voice mode in accordance with a preferred embodiment of the present invention.

The services invoked by the network VHD in the voice mode and the associated PXD is shown schematically in FIG. 6. In the described exemplary embodiment, the PXD 60 provides two way communication with a telephone or a circuit switched network, such as a PSTN line carrying a 64 kb/s pulse code modulated (PCM) signal, i.e., digital voice samples.

The incoming PCM signal 60a is initially processed by the PXD 60 to remove far end echos. As the name implies, echos in telephone systems is the return of the talker's voice resulting from the operation of the hybrid with its two-four wire conversion. If there is low end-to-end delay, echo from the far end is equivalent to side-tone (echo from the near-end), and therefore, not a problem. Side-tone gives users feedback as to how loud they are talking, and indeed, without side-tone, users tend to talk too loud. However, far end echo delays of more than about 10 to 30 msec significantly degrade the voice quality and is a major annoyance to the user.

An echo canceller 70 is used to remove echos from far end speech present on the incoming PCM signal 60a before routing the incoming PCM signal 60a back to the far end user. The echo canceller 70 samples an outgoing PCM signal 60b from the far end user, filters it, and combines it with the incoming PCM signal 60a. Preferably, the echo canceller 70 is followed by a non-linear processor (NLP) 72 which may mute the digital voice samples when far end speech is detected in the absence of near end speech. The echo canceller 70 may also inject comfort noise which may be roughly at the same level as the true background noise or at a fixed level.

After echo cancellation, the power level of the digital voice samples is normalized by an automatic gain control (AGC) 74 to ensure that the conversation is of an acceptable loudness. Alternatively, the AGC can be performed before the echo canceller 70, however, this approach would entail a more complex design because the gain would also have to be applied to the sampled outgoing PCM signal 60*b*. In the described exemplary embodiment, the AGC 74 is designed to adapt slowly, although it should adapt fairly quickly if overflow or clipping is detected. The AGC adaptation should be held fixed if the NLP 72 is activated.

After AGC, the digital voice samples are placed in the media queue 66 in the network VHD 62 via the switchboard 32'. In the voice mode, the network VHD 62 invokes three services, namely call discrimination, packet voice exchange, and packet tone exchange. The call discriminator 68 analyzes the digital voice samples from the media queue to determine whether a 2100, a 1100 Hz. tone or V.21 modulated HDLC flags are present. As described above with reference to FIG. 4, if either tone or HDLC flags are detected, the voice mode services are terminated and the appropriate service for fax or modem operation is initiated. In the absence of a 2100, a 1100 Hz. tone, or HDLC flags, the digital voice samples are coupled to the encoder system which includes a voice encoder 82, a voice activity detector (VAD) 80, a comfort noise estimator 81, a DTMF detector 76, and a packetization engine 78.

Typical telephone conversations have as much as sixty percent silence or inactive content. Therefore, high bandwidth gains can be realized if digital voice samples are suppressed during these periods. A VAD 80, operating under the packet voice exchange, is used to accomplish this function. The VAD 80 attempts to detect digital voice samples that do not contain active speech. If the comfort noise estimator 81 can accurately regenerate parameters for the digital voice samples without speech, silence identifier (SID) packets will be coupled to a packetization engine 78. The SID packets contain voice parameters that allow the reconstruction of the background noise at the far end.

From a system point of view, the VAD 80 may be sensitive to the change in the NLP 72. For example, when the NLP 72 is activated, the VAD 80 may immediately declare that voice is inactive. In that instance, the VAD 80 may have problems tracking the true background noise level. If the echo canceller 72 generates comfort noise, it may have a different spectral characteristic from the true background noise. The VAD 80 may deteyct a change in noise character when the NLP 72 is activated (or deactivated) and declare the comfort noise as active speech. For these reasons, the VAD 80 should be disabled when the NLP 72 is activated. This is accomplished by a "NLP on" message 72*a* passed from the NLP 72 to the VAD 80.

The voice encoder 82, operating under the packet voice exchange, can be a straight 16 bit PCM encoder or any voice encoder which support one or more of the standards promulgated by ITU. The encoded digital voice samples are formatted into a voice packet (or packets) by the packetization engine 78. These voice packets are formatted according to an applications protocol and outputted to the host (not shown). The voice encoder 82 is invoked only when digital voice samples with speech are detected by the VAD 80. Since the packetization interval may be a multiple of an encoding interval, both the VAD 80 and the packetization engine 78 should cooperate to decide whether or not the voice encoder 82 is invoked. For example, if the packetization interval is 10 msec and the encoder interval is 5 msec (a frame of digital voice samples is 5 ms), then a frame containing active speech will cause the subsequent frame to be placed in the 10 ms packet regardless of the VAD state during that subsequent frame. This interaction can be accomplished by the VAD 80 passing an "active" flag 80*a* to the packetization engine 78, and the packetization engine 78 controlling whether or not the voice encoder 82 is invoked.

In the described exemplary embodiment, the VAD 80 is applied after the AGC 74. This approach provides optimal flexibility because both the VAD 80 and the voice encoder 82 are integrated into some speech compression schemes such as those promulgated in ITU Recommendations G.729 with Annex B VAD (March 1996)—Coding of Speech at 8 kbits/s Using Conjugate-Structure Algebraic-Code-Exited Linear Prediction (CS-ACELP), and G.723.1 with Annex A VAD (March 1996)—Dual Rate Coder for Multimedia Communications Transmitting at 5.3 and 6.3 kbit/s, the contents of which is hereby incorporated by reference as through set forth in full herein.

Operating under the packet tone exchange, a DTMF detector 76 determines whether or not there is a DTMF signal present at the near end. The DTMF detector 76 also provides a pre-detection flag 76*a* which indicates whether or not it is likely that the digital voice sample might be a portion of a DTMF signal. If so, the pre-detection flag 76*a* is relayed to the packetization engine 78 instructing it to begin holding voice packets. If the DTMF detector 76 ultimately detects a DTMF signal, the voice packets are discarded, and the DTMF signal is coupled to the packetization engine 78. Otherwise the voice packets are ultimately released from the packetization engine 78 to the host (not shown). The benefit of this method is that there is only a temporary impact on voice packet delay when a DTMF signal is pre-detected in error, and not a constant buffering delay. Whether voice packets are held while the pre-detection flag 76*a* is active could be adaptively controlled by the user application layer.

The decoding system of the network VHD 62 essentially performs the inverse operation of the encoding system. The decoding system of the network VHD 62 comprises a depacketizing engine 84, a voice queue 86, a DTMF queue 88, a voice synchronizer 90, a DTMF synchronizer 102, a voice decoder 96, a VAD 98, a comfort noise estimator 100, a comfort noise generator 92, a lost packet recovery engine 94, and a tone generator 104.

The depacketizing engine 84 identifies the type of packets received from the host (i.e., voice packet, DTMF packet, SID packet), transforms them into frames which is protocol independent, transfers the voice frames (or voice parameters in the case of SID packets) into the voice queue 86, and transfers the DTMF frames into the DTMF queue 88. In this manner, the remaining tasks are, by and large, protocol independent.

A jitter buffer 87 is utilized to compensate for network impairments such as delay jitter caused by packets not arriving at the same time or in the same order in which they were transmitted. In addition, the jitter buffer 87 compensates for lost packets that occur on occasion when the network is heavily congested. In the described exemplary embodiment, the jitter buffer 87 includes a voice synchronizer 90 that operates in conjunction with a voice queue 86 to provide an isochronous stream of voice frames to the voice decoder 96.

Sequence numbers embedded into the voice packets at the far end can be used to detect lost packets, packets arriving out of order, and short silence periods. The voice synchronizer 90 can analyze the sequence numbers, enabling the comfort noise generator 92 during short silence periods and performing voice frame repeats via the lost packet recovery engine 94 when voice packets are lost. SID packets can also be used as an indicator of silent periods causing the voice synchronizer 90 to enable the comfort noise generator 92. Otherwise, during far end active speech, the voice synchronizer 90 couples voice frames from the voice queue 86 in an isochronous stream to the voice decoder 96. The voice decoder 96 decodes the voice frames into digital voice samples suitable for transmission on a circuit switched network, such as a 64 kb/s PCM signal for a PSTN line. The output of the voice decoder 96 (or the comfort noise generator 92 or lost packet recovery engine 94 if enabled) is written into a media queue 106 for transmission to the PXD 60.

The comfort noise generator 92 provides background noise to the near end user during silent periods. The background noise is reconstructed by the comfort noise generator 92 from the voice parameters in the SID packets from the voice queue 86. However, the comfort noise generator 92 should not be dependent upon SID packets from the far end for proper operation. In the absence of SID packets, the voice parameters of the background noise at the far end can be determined by running the VAD 98 at the voice decoder 96 in series with a comfort noise estimator 100.

If the protocol supports SID packets, (and these are supported for VTOA, FRF-11, and VoIP), the comfort noise estimator 81 should transmit SID packets. However, for some protocols, namely, FRF-11, the SID packets are optional, and other far end users may not support SID packets at all. In these systems, the voice synchronizer 90 must continue to operate properly. The voice synchronizer 90 can invoke a number of mechanisms to compensate for delay jitter in these systems if sequence numbers are not embedded in the voice packet. For example, the voice synchronizer 90 can assume that the voice queue 86 is in an underflow condition due to excess jitter and perform packet repeats by enabling the lost frame recovery engine 94. Alternatively, the VAD 98 at the voice decoder 96 can be used to estimate whether or not the underflow of the voice queue 86 was due to the onset of a silence period or due to packet loss. In this instance, the spectrum and/or the energy of the digital voice signals can be estimated and the result 98a fed back to the voice synchronizer 90. The voice synchronizer 90 can then invoke the lost packet recovery engine 94 during voice packet losses and the comfort noise generator 92 during silent periods.

When DTMF packets arrive, they are depacketized by the depacketizing engine 84. DTMF frames at the output of the depacketizing engine 84 are written into the DTMF queue. The DTMF synchronizer 102 couples the DTMF frames from the DTMF queue 88 to the tone generator 104. Much like the voice synchronizer, the DTMF synchronizer 102 is employed to provide an isochronous stream of DTMF frames to the tone generator 104. Generally speaking, when DTMF packets are being transferred, voice frames should be suppressed. To some extent, this is protocol dependent. However, the capability to flush the voice queue 86 to ensure that the voice frames do not interfere with DTMF generation is desirable. Essentially, old voice frames which may be queued are discarded when DTMF packets arrive. This will ensure that there is a significant inter-digit gap before DTMF tones are generated. This is achieved by a "tone present" message 88a passed between the DTMF queue and the voice synchronizer 90.

The tone generator 104 converts the DTMF signals into a DTMF tone suitable for a standard digital or analog telephone. The tone generator 104 overwrites the media queue 106 to prevent leakage through the voice path and to ensure that the DTMF tones are not too noisy.

There is also a possibility that DTMF tone may be fed back as an echo into the DTMF detector 76. To prevent false detection, the DTMF detector 76 can be disabled entirely (or disabled only for the digit being generated) during DTMF tone generation. This is achieved by a "tone on" message 104a passed between the tone generator 104 and the DTMF detector 76. Alternatively, the NLP 72 can be activated while generating DTMF tones.

The outgoing PCM signal in the media queue 106 is coupled to the PXD 60 via the switchboard 32'. The outgoing PCM signal is coupled to an amplifier 108 before being outputted on the PCM output line 60b.

1. Echo Canceller with NLP

The problem of line echos such as the reflection of the talker's voice resulting from the operation of the hybrid with its two-four wire conversion is a common telephony problem. In the context of packet voice systems in accordance with an exemplary embodiment of the present invention, telephony devices are coupled to a signal processing system which, for the purposes of explanation, is operating in a network gateway to support the exchange of voice between a traditional circuit switched network and a packet based network. In addition, the signal processing system operating on network gateways also supports the exchange of voice between the packet based network and a number of telephony devices.

Although echo cancellation is described in the context of a signal processing system with the packet voice exchange invoked, those skilled in the art will appreciate that echo cancellation is likewise suitable for various other telephony and telecommunications application. Accordingly, the described exemplary embodiment for echo cancellation in a signal processing system is by way of example only and not by way of limitation.

In the described exemplary embodiment the echo canceller preferably complies with one or more of the following ITU-T Recommendations G.164 (1988)—Echo Suppressors, G.165 (March 1993)—Echo Cancellers, and G.168 (April 1997)—Digital Network Echo Cancellers, the contents of which are incorporated herein by reference as though set forth in full. The described embodiment merges echo cancellation and echo suppression methodologies to remove the line echos that are prevalent in telecommunication systems. Typically, echo cancellers are favored over echo suppressors for superior overall performance in the presence of system noise such as, for example, background music or double talk etc., while echo suppressors tend to perform well over a wide range of operating conditions where clutter such as system noise are not present. The described exemplary embodiment utilizes an echo suppressor when the energy level of the line echo is below the audible threshold, otherwise an echo canceller is preferably used. The use of an echo suppressor reduces system complexity, leading to lower overall power consumption or higher densities (more VHDs per part or network gateway).

Figure 7:
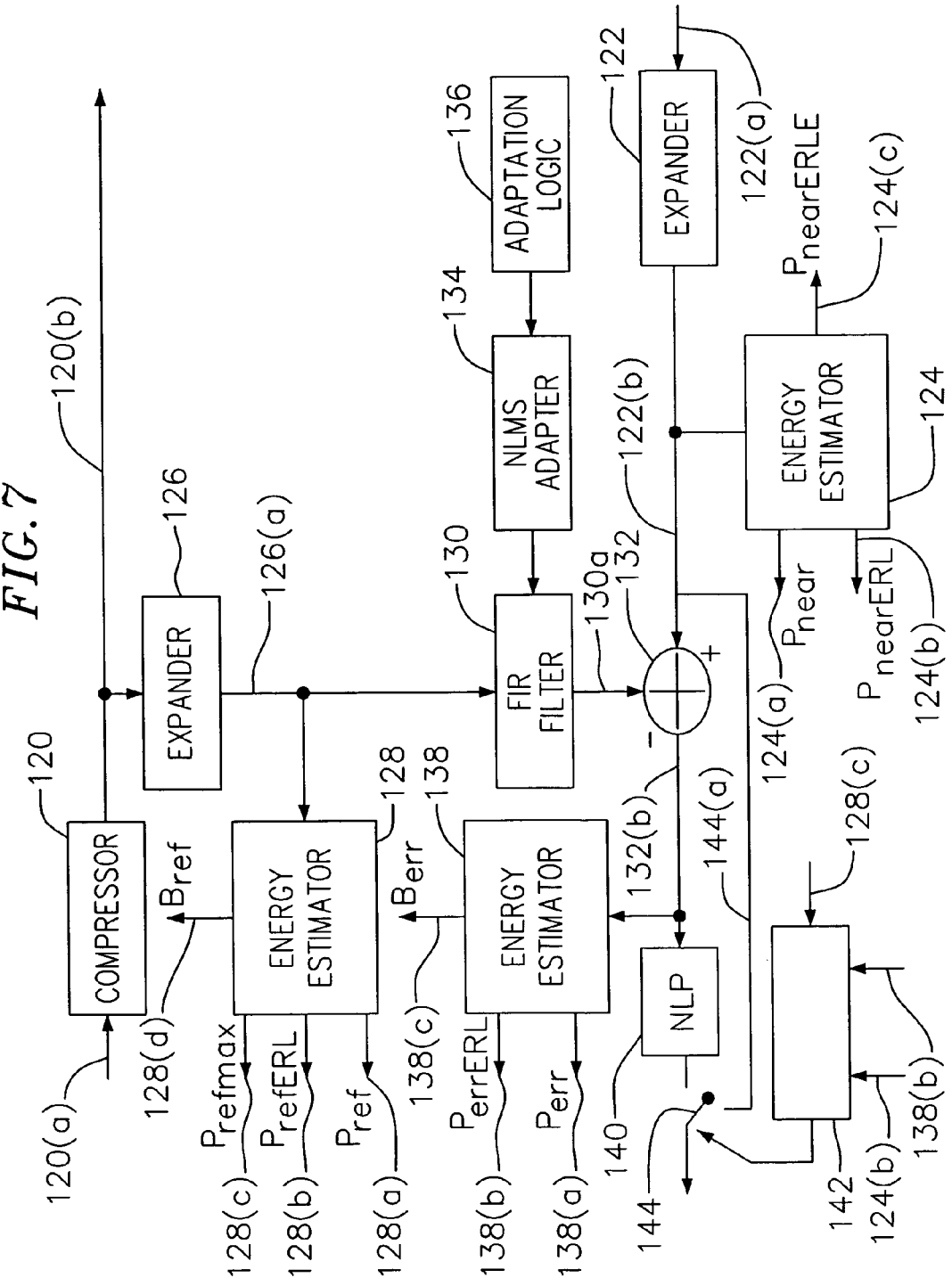
FIG. 7 is a block diagram of a method for canceling echo returns in accordance with a preferred embodiment of the present invention.

FIG. 7 shows the block diagram of an echo canceller in accordance with a preferred embodiment of the present invention. If required to support voice transmission via a T1 or other similar transmission media, a compressor 120 may compress the output 120(*a*) of the voice decoder system(far end received signal) into a format suitable for the channel at $R_{out}$ 120(*b*). Typically the compressor 120 provides µ-law or A-law compression in accordance with ITU-T standard G.711, although linear compression or compression in accordance with alternate companding laws should preferably be supported. The compressed signal at $R_{out}$ (signal that eventually makes its way to an ear piece/telephone receiver), may be reflected back as an input signal to the voice encoder system. A voice encoder input signal 122(*a*) may also be in the compressed domain (if compressed by compressor 120) and, if so, an expander 122 may be required to invert the companding law to obtain a near end signal 122(*b*). A power estimator 124 estimates a short term average power 124(a), a long term average power 124(b), and a maximum power level 124(c) for the near end signal 122(b).

An expander 126 inverts the companding law used to compress the voice decoder output signal 120(b) to obtain a reference signal 126(a). One of skill in the art will appreciated that the voice decoder output signal could alternatively be compressed downstream of the echo canceller so that expander 126 would not be required. However, to ensure that all non-linearities in the echo path are accounted for in the reference signal 126(a) it is preferable to compress/expand the voice decoder output signal 120(b). A power estimator 128 estimates a short term average power 128(a), a long term average power 128(b, a maximum power level 128(c) and a background power level 128(d) for the reference signal 126 (a). The reference signal 126(a) is input into a finite impulse response (FIR) filter 130. The FIR filter 130 models the transfer characteristics of a dialed telephone line circuit so that the unwanted echo may preferably be canceled by subtracting filtered reference signal 130(a) and the near end signal 122(b) in a difference operator 132. A power estimator 138 estimates the performance of the echo canceller by estimating a short term average power 138(a), and background power level for an error signal 132(b) which is an output of difference operator 132. In the described exemplary embodiment a filter adapter 134 controls the convergence of the adaptive FIR filter 130. The filter adapter 134 is preferably selectively enabled by adaptation logic 136. The adaptation logic 136 processes the estimated power levels of the reference signal (128a, 128b, 128c and 128d) the near end signal (124a, 124b and 124c) and the error signal (138a, 138b and 138c) to control the invocation of the filter adapter 134 as well as the step size to be used during adaptation.

However, for a variety of reasons, such as for example, non-linearities in the hybrid and tail circuit, estimation errors, noise in the system, etc., the adaptive FIR filter 130 may not identically model the transfer characteristics of the telephone line circuit so that the echo canceller may be unable to cancel all of the resulting echo. Therefore, a non linear processor (NLP) 140 is used to suppress the residual echo during periods of far end active speech with no near end speech. In the described preferred embodiment the echo suppressor is a simple bypass 144(a) that is selectively enabled by toggling the bypass cancellation switch 144. A bypass estimator 142 toggles the bypass cancellation switch 144 based upon the maximum power level 128(c) of the reference signal 126(a), the long term average power 128(b) of the reference signal 126(b) and the long term average power 124(b) of the near end signal 122(b). One skilled in the art will appreciate that a NLP or other suppressor could be included in the design of an echo suppressor in accordance with ITU-T Recommendation G.164, so that the described echo suppressor is by way of example only and not by way of limitation.

In an exemplary embodiment, the adaptive filter 130 models the transfer characteristics of the hybrid and the tail circuit of the telephone circuit. The tail length supported should preferably be at least 16 msec. The adaptive filter 130 may be a linear transversal filter or other suitable finite impulse response filter. In the described exemplary embodiment, the echo canceller preferably converges or adapts only in the absence of near end speech. Therefore, near end speech and/or noise present on the voice encoder input signal 122(a) may cause the filter adapter 134 to diverge. To avoid divergence the filter adapter 134 is preferably selectively enabled by the adaptation logic 136.

In addition, the time required for an adaptive filter to converge increases significantly with the number of coefficients to be determined. Reasonable modeling of the hybrid and tail circuits with a finite impulse response filter requires a large number of coefficients so that filter adaptation typically requires significant DSP resource to complete. In the described exemplary embodiment the DSP resources required for filter adaptation are minimized by adjusting the adaptation speed of the FIR filter 130. The adaptation logic 136 preferably processes the estimated power levels of the reference signal 126(a), the near end signal 122(b) and the error signal 132(b) to control the invocation of the filter adapter 134 as well as the step size to be used during adaptation.

The filter adapter 134 is preferably based upon a normalized least mean square algorithm (NLMS) as described in S. Haykin, *Adaptive Filter Theory*, and T. Parsons, *Voice and Speech Processing*, the contents of which are incorporated herein by reference as if set forth in full. The error signal for the adaptation logic may preferably be characterized as follows:

$$e(n) = s(n) - \sum_{j=0}^{L-1} c(j) r(n-j)$$

where e(n) is the error signal at time n, r(n) is the reference signal 126(a) at time n and s(n) is the near end signal 122(b) at time n, and c(j) are the coefficients of the transversal filter where the dimension of the transversal filter is preferably the length of the tail circuit L and c(j), for j=0 to L−1, is given by:

$$c(j) = c(j) + \mu * e(n) * r(n-j)$$

Assuming a block size of one msec (or 8 samples at a sampling rate of 8 kHz), the short term average power of the reference signal Pref is the sum of the last L reference samples and the energy for the current eight samples so that $$\mu = \frac{\alpha}{P_{ref(n)}}$$

where α is the adaptation step size. One of skill in the art will appreciate that the filter adaptation logic may be implemented in a variety of ways, including fixed point rather than the described floating point realization. Accordingly, the described exemplary adaptation logic is by way of example only and not by way of limitation.

To support filter adaptation the described exemplary embodiment includes the power estimator 128 that estimates the short term average power 128(a) of the reference signal 126(a) ($P_{ref}$). In the described exemplary embodiment the short term average power is preferably estimated over the worst case length of the echo path (the length of the FIR filter, presumably) In addition, the power estimator 128 computes the maximum power level 128(c) of the reference signal 126(a) ($P_{refmax}$) over a period of time that is preferably approximately equal to the tail length of the echo path. The second power estimator 124 estimates the short term average power of the near end signal 122(b) ($P_{near}$) in a similar manner. The short term average power 138(a) of the error signal 132(b) (the output of difference operator 132), $P_{err}$ is also estimated in a similar manner by the third power estimator 138.

In addition, the echo return loss (ERL), defined as the loss from $R_{out}$ to $S_{in}$ in the absence of near end speech, is periodically estimated and updated. In the described exemplary embodiment the ERL is estimated and update about every 5-20 msec. The power estimator 128 estimates the long term average power 128(*b*) ($P_{refERL}$) of the reference signal 126(*a*) in the absence of near end speech. The second power estimator 124 estimates the long term average power 124(*b*) ($P_{nearERL}$) of the near end signal 122(*b*) in the absence of near end speech. The adaptation logic 136 computes the ERL by dividing the long term average power of the reference signal, ($P_{refERL}$) by the long term average power of the near end signal ($P_{nearERL}$). The adaptation logic 136 preferably only updates the long term averages used to update the ERL if the estimated short term power level 128(*a*) ($P_{ref}$) of the reference signal 126(*a*) is greater than a predetermined threshold, preferably in the range of about −30 to −35 dBm0; and the estimated short term power level 128(*a*) ($P_{ref}$) of the reference signal 126(*a*) is preferably larger than about at least the short term average power 124(*a*) ($P_{near}$) of the near end signal 122(*b*) ($P_{ref} > P_{near}$ in the preferred embodiment)

In the preferred embodiment, the long term averages ($P_{refERL}$ and $P_{nearERL}$) are based on a first order infinite impulse response (IIR) recursive filter, wherein the inputs to the two first order filters are $P_{ref}$ and $P_{near}$.

$$PnearERL = (1-alpha)*PnearERL + Pnear*alpha; \text{ and}$$

$$PrefERL = (1-alpha)*PrefERL + Pref*alpha$$

where adaptation step size alpha=1/64

Similarly, the adaptation logic 136 of the described exemplary embodiment characterizes the effectiveness of the echo canceller by estimating the echo return loss enhancement (ERLE). The ERLE is an estimation of the reduction in power of the near end signal 122(*b*) due to echo cancellation when there is no near end speech present. The ERLE is the average loss from the input 132(*a*) of the difference operator 132 to the output 132(*b*) of the difference operator 132. The adaptation logic 136 in the described exemplary embodiment periodically estimates and updates the ERLE, preferably in the range of about 5 to 20 msec. In operation, the power estimator 124 estimates the long term average power 124(*b*) $P_{nearERLE}$ of the near end signal 122(*b*) in the absence of near end speech. The power estimator 138 estimates the long term average power 138(*b*) $P_{errERLE}$ of the error signal 132(*b*) in the absence of near end speech. The adaptation logic 136 computes the ERLE by dividing the long term average power 124(*a*) $P_{nearERLE}$ of the near end signal 122(*b*) by the long term average power 138(*b*) $P_{errERLE}$ of the error signal 132(*b*). The adaptation logic 136 preferably updates the long term averages used to estimate the ERLE only when the estimated short term average power 128(*a*) ($P_{ref}$) of the reference signal 126(*a*) is greater than a predetermined threshold preferably in the range of about −30 to −35 dBm0; and the estimated short term average power 124(*a*) ($P_{near}$) of the near end signal 122(*b*) is large as compared to the estimated short term average power 138(*a*) ($P_{err}$) of the error signal (preferably when $P_{near}$ is approximately greater than or equal to four times the power of the error signal ($4P_{err}$)). Therefore, an ERLE of approximately 6 dB is preferably required before the ERLE tracker will begin to function.

In the preferred embodiment, the long term averages ($P_{nearERLE}$ and $P_{errERLE}$) may be based on a first order IIR (infinite impulse response) recursive filter, wherein the inputs to the two first order filters are $P_{near}$ and $P_{err}$.

$$PnearERLE = (1-alpha)*PnearERL + Pnear*alpha; \text{ and}$$

$$PerrERLE = (1-alpha)*PerrERL + Perr*alpha$$

where adaptation step size alpha=1/64

It should be noted that PnearERL≠PnearERLE because the conditions under which each is updated are different.

To assist in the determination of whether to invoke the echo canceller and if so with what convergence rate, the described exemplary embodiment estimates the power level of the background noise. The power estimator 128 tracks the long term energy level of the background noise 128(*d*) ($B_{ref}$) of the reference signal 126(*a*). The power estimator 128 utilizes a much faster time constant when the input energy is lower than the background noise estimate (current output). With a fast time constant the power estimator 128 tends to track the minimum energy level of the reference signal 126(*a*). By definition, this minimum energy level is the energy level of the background noise of the reference signal $B_{ref}$. The energy level of the background noise of the error signal $B_{err}$ is calculated in a similar manner. The estimated energy level of the background noise of the error signal ($B_{err}$) is not updated when the energy level of the reference signal is larger than a predetermined threshold (preferably in the range of about 30-35 dBm0).

In addition, the invocation of the echo canceller depends on whether near end speech is active. Preferably, the adaptation logic 136 declares near end speech active when the short term power level of the error signal exceeds a minimum threshold, preferably on the order of about −36 dbm0 ($P_{err} \geq -36$ dbm0); the short term average power of the error signal exceeds the estimated power level of the background noise for the error signal by preferably at least about 6 dB ($P_{err} \geq B_{err} + 6$ dB); and the short term average power 124(*a*) of the near end signal 122(*b*) is preferably approximately 3 dB greater than the maximum power level 128(*c*) of the reference signal 126(*a*) less the estimated ERL ($P_{near} \geq P_{refmax} - ERL + 3$ dB). The adaptation logic 136 preferably sets a hangover counter when near end speech is detected. The hangover counter is used to prevent clipping of near end speech by delaying the invocation of the NLP 140 when near end speech is detected. Preferably the hangover counter is on the order of about 150 msec.

In the described exemplary embodiment, if the maximum power level ($P_{refmax}$) of the reference signal minus the estimated ERL is less than the threshold of hearing (all in dB) neither echo cancellation or non-linear processing are invoked. In this instance, the energy level of the echo is below the threshold of hearing so that echo cancellation and non-linear processing are not required for the current time period. Therefore, the bypass estimator 142 sets the bypass cancellation switch 144 in the down position, so as to bypass the echo canceller and the NLP and no processing (other than updating the power estimates) is performed. Also, if the maximum power level ($P_{refmax}$) of the reference signal minus the estimated ERL is less than the maximum of either the threshold of hearing, or background power level $B_{err}$ of the error signal minus a predetermined threshold ($P_{refmax} - ERL <$ threshold of hearing or ($B_{err}$-threshold)) neither echo cancellation or non-linear processing are invoked. In this instance, the echo is buried in the background noise or below the threshold of hearing, so that echo cancellation and non-linear processing are not required for the current time period. In the described preferred embodiment the background noise estimate is preferably greater than the threshold of hearing, such that this is a broader method for setting the bypass cancellation switch. The threshold is preferably in the range of about 8-10 dB.

Similarly, if the maximum power level ($P_{refmax}$) of the reference signal minus the estimated ERL is less than the short term average power $P_{near}$ minus a predetermined threshold ($P_{refmax} - ERL < P_{near}$ − threshold) neither echo cancellation or non-linear processing are invoked. In this instance, it is highly probably that near end speech is present, and that such speech will likely mask the echo. This method operates in conjunction with the above described techniques for bypassing the echo canceller and NLP. The threshold is preferably in the range of about 8-10 dB. If the NLP contains a real comfort noise generator, i.e., a non-linearity which mutes the incoming signal and injects comfort noise of the appropriate character then a determination that the NLP will be invoked in the absence of filter adaptation allows the adaptive filter to be bypassed or not invoked. This method is, used in conjunction with the above methods. If the adaptive filter is not executed then adaptation does not take place, so this method is preferably used only when the echo canceller has converged.

For those inputs where the maximum reference power ($P_{refmax}$) minus the estimated ERL exceeds the threshold of hearing ($P_{refmax}$-ERL>threshold of hearing), the bypass estimator sets the bypass cancellation switch 144 in the up position and both adaptation and cancellation may take place. In operation the preferred adaptation logic 136 proceeds as follows:

If the bypass cancellation switch 144 is in the down position, the adaptation logic 136 disables the filter adapter 134. Otherwise if the bypass cancellation switch 144 is in the up position, such that adaptation and cancellation are enabled and the estimated echo return loss enhancement is low the adaptation logic 136 enables rapid convergence with an adaptation step size $\alpha=\frac{1}{4}$. In this instance, the echo canceller is not converged so that rapid adaptation is warranted. However, if near end speech is detected within the hangover period, the adaptation logic 136 either disables adaptation or uses very slow adaptation, preferably an adaptation speed on the order of about one-eighth that used for rapid convergence or an adaptation step size $\alpha=\frac{1}{32}$. In this case the adaptation logic 136 disables adaptation when the echo canceller is converged. Convergence may be assumed if adaptation has been active for a total of one second after the off hook transition or subsequent to the invocation of the echo canceller. Otherwise if the combined loss (ERL+ERLE) is in the range of about 33-36 dB, the adaptation logic 136 enables slow adaptation (preferably one-eighth the adaptation speed of rapid convergence or an adaptation step size $\alpha=\frac{1}{32}$). If the combined loss (ERL+ERLE) is on the order of about 24 dB, the adaptation logic 136 enables a moderate convergence speed, preferably on the order of about one-fourth the adaptation speed used for rapid convergence or an adaptation step size $\alpha=\frac{1}{16}$.

Otherwise, one of three preferred adaptation speeds is chosen based on the estimated echo power ($P_{refmax}$ minus the ERL) in relation to the power level of the background noise of the error signal. If the estimated echo power ($P_{refmax}$-ERL) is large compared to the power level of the background noise of the error signal ($P_{refmax}$-ERL$\geq B_{err}$+24 dB), rapid adaptation/convergence is enabled with an adaptation step size on the order of about $\alpha=\frac{1}{4}$. Otherwise, if ($P_{refmax}$-ERL$\geq B_{err}$+18 dB) the adaptation speed is reduced to approximately one-half the adaptation speed used for rapid convergence or an adaptation step size on the order of about $\alpha=\frac{1}{8}$. Otherwise, if ($P_{refmax}$-ERL$\geq B_{err}$+9 dB) the adaptation speed is further reduced to approximately one-quarter the adaptation speed used for rapid convergence or an adaptation step size $\alpha=\frac{1}{16}$.

As a further limit on adaptation speed, if echo canceller adaptation has been active for a sum total of one second since initialization or an off-hook condition then the maximum adaptation speed is limited to one-fourth the adaptation speed used for rapid convergence ($\alpha=\frac{1}{16}$). Also, if the echo path changes appreciably or if for any reason the estimated ERLE is negative, (which typically occurs when the echo path changes) then the coefficients are cleared and an adaptation counter is set to zero (the adaptation counter measures the sum total of adaptation cycles in samples).

The NLP 140 is a two state device. The NLP 140 is either on (applying non-linear processing) or it is off (applying unity gain). When the NLP 140 is on it tends to stay on, and when the NLP 140 is off it tends to stay off. The NLP 140 is preferably invoked when the bypass cancellation switch 144 is in the upper position so that adaptation and cancellation are active. Otherwise, the NLP 140 is not invoked and the NLP 140 is forced into the off state.

Initially, a stateless first decision is created. The decision logic is based on three decision variables (D1-D3). The decision variable D1 is set if the far end appears to be active (i.e. the short term average power 128(a) of the reference signal 126(a) is preferably about 6 dB greater than the power level of the background noise 128(d) of the reference signal), and the short term average power 128(a) of the reference signal 126(a) minus the estimated ERL is greater than the estimated short term average power 124(a) of the near end signal 122(b) minus a small threshold, preferably in the range of about 6 dB. In the preferred embodiment, this is represented by: ($P_{ref} \geq B_{ref}$+6 dB) and (($P_{ref}$-ERL)$\geq(P_{near}$-6 dB)). Thus, decision variable D1 attempts to detect far end active speech and high ERL (implying no near end). Preferably, decision variable D2 is set if the power level of the error signal is on the order of about 9 dB below the power level of the estimated short term average power 124(a) of the near end signal 122(b) (a condition that is indicative of good short term ERLE). In the preferred embodiment, $P_{err} \leq P_{near}$-9 dB is used (a short term ERLE of 9 dB). The third decision variable D3 is preferably set if the combined loss (reference power to error power) is greater than a threshold. In the preferred embodiment, this is: $P_{err} \leq P_{ref}$-t, where t is preferably initialized to about 6 dB and preferably increases to about 12 dB after about one second of adaptation. (In other words, it is only adapted while convergence is enabled).

The third decision variable D3 results in more aggressive non linear processing while the echo canceller is unconverged. Once the echo canceller converges, the NLP 140 can be slightly less aggressive. The initial stateless decision is set if two of the sub-decisions or control variables are initially set. The initial decision set implies that the NLP 140 is in a transition state or remaining on.

The NLP 140 utilizes two hangover counters. The "on" counter, delays the invocation of NLP processing (i.e. state switch from off to on) and an "off" counter which is a delays termination of NLP 140 processing. The "on" counter is set so as to delay NLP processing when near end speech is detected. It is cleared so that NLP processing may begin when the near end hangover counter is cleared and decremented while non-zero and the NLP is in the off state. The "off" counter is cleared when near end speech is detected and decremented while non-zero when the NLP is on. The "off" counter is set, so as to delay termination of NLP processing, after the NLP has been in the "on" state for a predetermined period of time, preferably about the tail length in msec. The "on" counter prevents clipping of near end speech by delaying the invocation of the NLP 140. The off counter prevents the reflection of echo stored in the tail circuit when there is a decrease in the far end power by delaying the termination of NLP processing. If the near end speech detector hangover counter is on, the above NLP decision is overridden and the NLP is forced into the off state.

In the preferred embodiment, the NLP 140 may be implemented with a suppressor that adaptively suppresses down to the background noise level ($B_{err}$), or a suppressor that suppresses completely and inserts comfort noise with a spectrum that models the true background noise.

2. Automatic Gain Control

In an exemplary embodiment, the AGC can be either fully adaptive or have a fixed gain. Preferably, the AGC supports a fully adaptive operating mode with a range of about −30 dB to 30 dB. A default gain value may be independently established, and is typically 0 dB. If adaptive gain control is used, the initial gain value is specified by this default gain. The AGC adjusts the gain factor in accordance with the power level of an input signal. Input signals with a low energy level are amplified to a comfortable sound level, while high energy signals are attenuated.

Figure 8A:
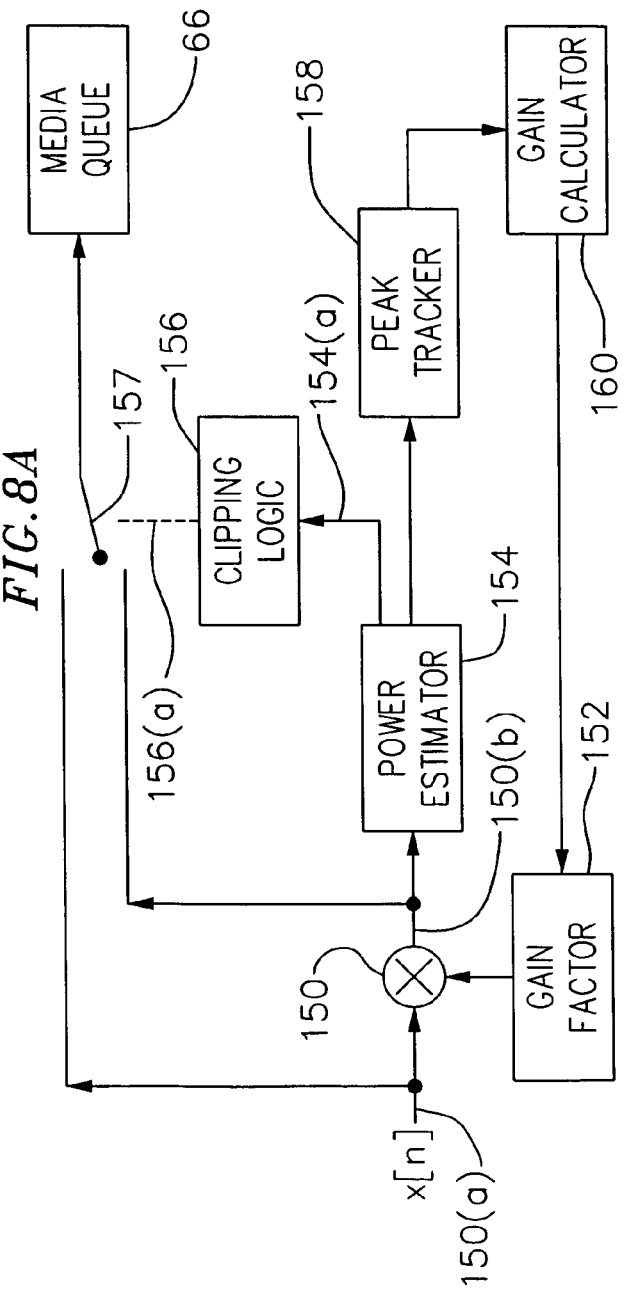
FIG. 8A is a block diagram of a method for normalizing the power level of a digital voice samples to ensure that the conversation is of an acceptable loudness in accordance with a preferred embodiment of the present invention.

A block diagram of a preferred embodiment of the AGC is shown in FIG. 8A. A multiplier 150 applies a gain factor 152 to an input signal 150(*a*) which is then output to the media queue 66 of the network VHD (see FIG. 6). The default gain, typically 0 dB is initially applied to the input signal 150(*a*). A power estimator 154 estimates the short term average power 154(*a*) of the gain adjusted signal 150(*b*). The short term average power of the input signal 150(*a*) is preferably calculated every eight samples, typically every one ms for a 8 kHz signal. Clipping logic 156 analyzes the short term average power 154(*a*) to identify gain adjusted signals 150(*b*) whose amplitudes are greater than a predetermined clipping threshold. The clipping logic 156 controls 156(*a*) an AGC bypass switch 157, which directly connects the input signal 150(*a*) to the media queue 66 when the amplitude of a gain adjusted signal 150(*b*) exceeds the predetermined clipping threshold. The AGC bypass switch 157 remains in the up or bypass position until the AGC adapts so that the amplitude of the gain adjusted signal 150(*b*) falls below the clipping threshold.

Figure 8B:
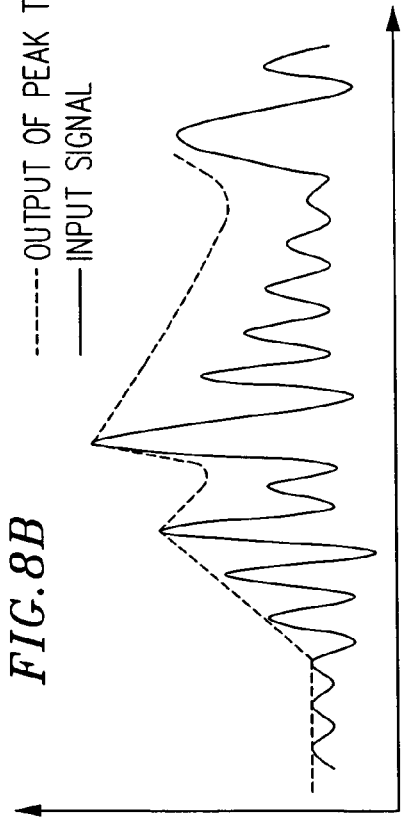
FIG. 8B is a graphical depiction of a representative output of a peak tracker as a function of a typical input signal, demonstrating that the reference value that the peak tracker forwards to a gain calculator to adjust the power level of digital voice samples should preferably rise quickly if the signal amplitude increases, but decrement slowly if the signal amplitude decreases in accordance with a preferred embodiment of the present invention.
Figure 9:
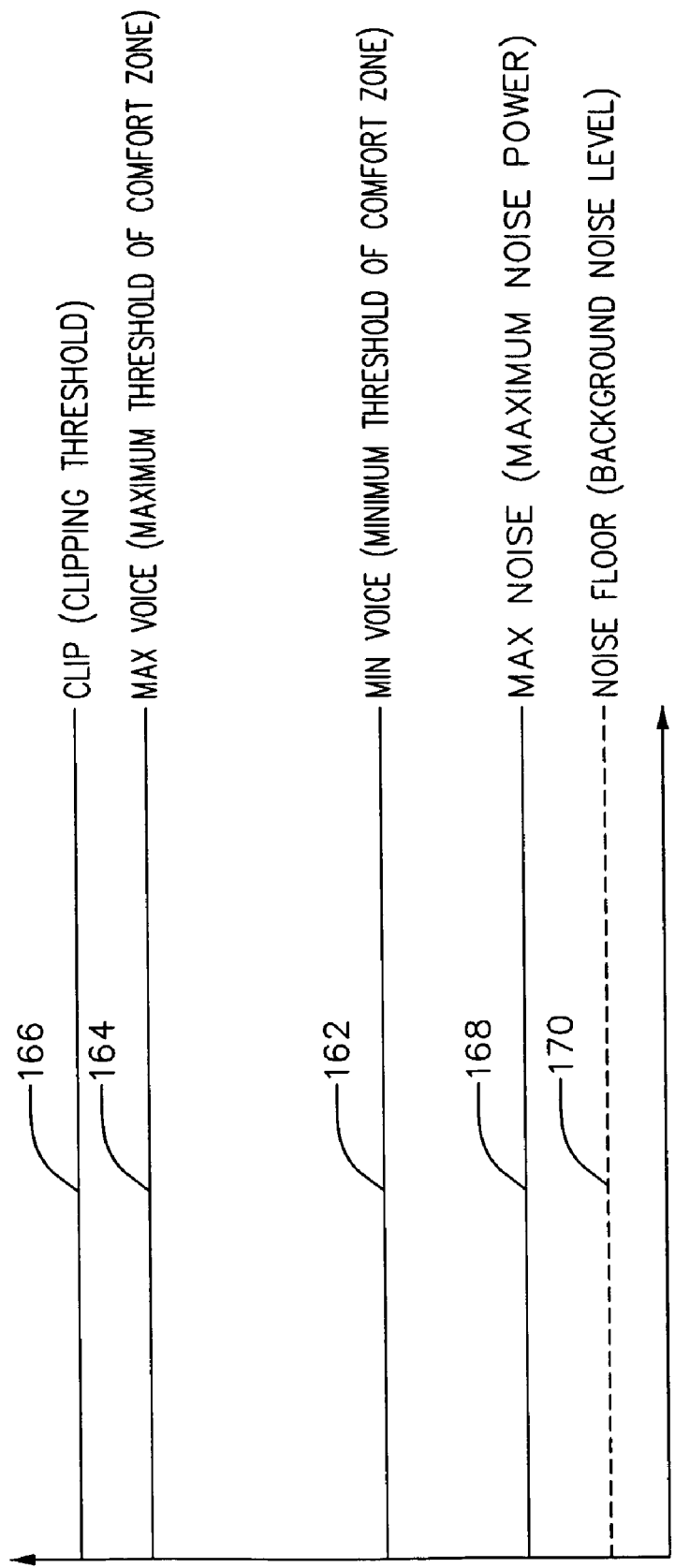
FIG. 9 is a graphical depiction of exemplary operating thresholds for adjusting the gain factor applied to digital voice samples to ensure that the conversation is of an acceptable loudness in accordance with a preferred embodiment of the present invention.

The power estimator 154 also calculates a long term average power 154(*b*) for the input signal 150(*a*), by averaging thirty two short term average power estimates, (i.e. averages thirty two blocks of eight samples). The long term average power is a moving average which provides significant hangover. A peak tracker 158 utilizes the long term average power 154(*b*) to calculate a reference value which gain calculator 160 utilizes to estimate the required adjustment to a gain factor 152 which is applied to the input signal 150(*a*) by the multiplier 150. The peak tracker stores in memory a reference value which is dependent upon the last maximum peak. The peak tracker 158 compares the long term average power estimate to the reference value. FIG. 8B shows the peak tracker output as a function of an input signal, demonstrating that the reference value that the peak tracker 158 forwards to the gain calculator 160 should preferably rise quickly if the signal amplitude increases, but decrement slowly if the signal amplitude decreases. Thus for active voice segments followed by silence, the peak tracker output slowly decreases, so that the gain factor applied to the input signal 150(*a*) may be slowly increased. However, for long inactive or silent segments followed by loud or high amplitude voice segments, the peak tracker output increases rapidly, so that the gain factor applied to the input signal 150(*a*) may be quickly decreased. Referring to FIG. 9, a preferred embodiment of the gain calculator 160 slowly increments the gain factor 152 for signals below the comfort level of hearing 166 (below minVoice) and decrements the gain for signals above the comfort level of hearing 164 (above MaxVoice). The described exemplary embodiment of the gain calculator 160 decrements the gain factor 152 for signals above the clipping threshold relatively fast, preferably on the order of about 3 dB/sec, until the signal has been attenuated 10 dB or the power level of the signal drops to the comfort zone. The gain calculator 160 preferably decrements the gain factor 152 for signals with power levels that are above the comfort level of hearing 164 (MaxVoice) but below the clipping threshold 166 (Clip) relatively slowly, preferably on the order of about 0.2 dB/sec until the signal has been attenuated 4 dB or the power level of the signal drops to the comfort zone.

The gain calculator 160 preferably does not adjust the gain factor 152 for signals with power levels within the comfort zone (between minVoice and MaxVoice), or below the maximum noise power threshold 168 (MaxNoise). The preferred values of MaxNoise, minVoice, MaxVoice, Clip are related to a noise floor 170 and are preferably in 3 dB increments. A MaxNoise value of 2 corresponds to a power level 6 dB above the noise floor 170, whereas a clip level of 9 corresponds to 27 dB above noise floor 170. For signals with power levels below the comfort zone (less than minVoice) but above the maximum noise threshold, the gain calculator 160 preferably increments the gain factor 152 logarithmically at a rate of about 0.2 dB/sec, until the power level of the signal is within the comfort zone or a gain of 10 dB is reached.

3. Voice Activity Detector

In an exemplary embodiment, the VAD, in either the encoder system or the decoder system, can be configured to operate in multiple modes so as to provide system tradeoffs between voice quality and bandwidth requirements. In a first mode, the VAD is always disabled and declares all digital voice samples as active speech. This mode is applicable if the signal processing system is used over a TDM network, a network which is not congested with traffic, or when used with PCM (ITU Recommendation G.711 (1988)—Pulse Code Modulation (PCM) of Voice Frequencies, the contents of which is incorporated herein by reference as if set forth in full) in a PCM bypass mode.

In a second "transparent" mode, the voice quality is indistinguishable from the first mode. In transparent mode, the VAD identifies digital voice samples with an energy below the threshold of hearing as inactive speech. The threshold may be adjustable between −90 and −40 dBm with a default value of −60 dBm default value. For loud background noise which is rich in character such as music on hold, background music, or loud background talkers (so-called cocktail noise), the threshold can be adjustable between −90 and −20 dBm with a default value of −20 dBM. The transparent mode may be used if voice quality is much more important than bandwidth. This may be the case, for example, if a G.711 voice encoder (or decoder) is used.

In a third "conservative" mode, the VAD identifies low level (but audible) digital voice samples as inactive, but will be fairly conservative about discarding the digital voice samples. A low percentage of active speech will be clipped at the expense of slightly higher transmit bandwidth. In the conservative mode, a skilled listener may be able to determine that voice activity detection and comfort noise generation is being employed.

In a fourth "aggressive" mode, bandwidth is at a premium. The VAD is aggressive about discarding digital voice samples which are declared inactive. This approach will result in speech being occasionally clipped, but system bandwidth will be vastly improved.

The transparent mode is typically the default mode when the system is operating with 16 bit PCM, companded PCM (G.711) or adaptive differential PCM (ITU Recommendations G.726 (December 1990)—40, 32, 24, 16 kbit/s Using Low-Delay Code Exited Linear Prediction, and G.727 (December 1990)—5-, 4-, 3-, and 2-Sample Embedded Adaptive Differential Pulse Code Modulation). In these instances, the user is most likely concerned with high quality voice since a high bit-rate voice encoder (or decoder) has been selected. As such, a high quality VAD should be employed. The transparent mode should also be used for the VAD operating in the decoder system since bandwidth is not a concern (the VAD in the decoder system is used only to update the comfort noise parameters). The conservative mode could be used with ITU Recommendation G.728 (September 1992)—Coding of Speech at 16 kbit/s Using Low-Delay Code Excited Linear Prediction, G.729, and G.723.1. For systems demanding high bandwidth efficiency, the aggressive mode can be employed as the default mode.

The mechanism in which the VAD detects digital voice samples that do not contain active speech can be implemented in a variety of ways. One such mechanism entails monitoring the energy level of the digital voice samples over short periods (where a period length is typically in the range of about 10 to 30 msec). If the energy level exceeds a fixed threshold, the digital voice samples are declared active, otherwise they are declared inactive. The transparent mode can be obtained when the threshold is set to the threshold level of hearing.

Alternatively, the threshold level of the VAD can be adaptive and the background noise energy can be tracked. If the energy in the current period is sufficiently larger than the background noise estimate by the comfort noise estimator, the digital voice samples are declared active, otherwise they are declared inactive. The VAD may also freeze the comfort noise estimator or extend the range of active periods (hangover). This type of VAD is used in GSM (European Digital Cellular Telecommunications System; Half rate Speech Part 6: Voice Activity Detector (VAD) for Half Rate Speech Traffic Channels (GSM 6.42), the contents of which is incorporated herein by reference as if set forth in full) and QCELP (W. Gardner, P. Jacobs, and C. Lee, "QCELP: A Variable Rate Speech Coder for CDMA Digital Cellular," in *Speech and Audio Coding for Wireless and Network Applications*, B. S. et al, V. Cuperman, and A. Gersho (eds)., the contents of which is incorporated herein by reference as if set forth in full).

In a VAD utilizing an adaptive threshold level, speech parameters such as the zero crossing rate, spectral tilt, energy and spectral dynamics are measured and compare stored values for noise. If the parameters differ significantly from the stored values, it is an indication that active speech is present even if the energy level of the digital voice samples is low.

When the VAD operates in the conservative or transparent mode, measuring the energy of the digital voice samples can be sufficient for detecting inactive speech. However, the spectral dynamics of the digital voice samples may be useful in discriminating between long voice segments with audio spectra and long term background noise. In an exemplary embodiment of a VAD employing spectral analysis, the VAD performs auto-correlations using Itakura or Itakura-Saito distortion to compare long term estimates based on background noise to short term estimates based on a period of digital voice samples. In addition, if supported by the voice encoder, line spectrum pairs (LSPs) can be used to compare long term LSP estimates based on background noise to short terms estimates based on a period of digital voice samples. Alternatively, FFT methods can be are used when the spectrum is available from another software module.

Preferably, hangover should be applied to the end of active periods of the digital voice samples with active speech. Hangover bridges short inactive segments to ensure that quiet trailing, unvoiced sounds (such as /s/), are classified as active. The amount of hangover can be adjusted according to the mode of operation of the VAD. If a period following a long active period is clearly inactive (i.e., very low energy with a spectrum similar to the measured background noise) the length of the hangover period can be reduced. Generally, a range of about 40 to 300 msec of inactive speech following an active speech burst will be declared active speech due to hangover.

4. Comfort Noise Generator

Comfort noise generation refers to the generation of comfort noise on the voice decoder side when voice encoder packets do not contain active speech, (i.e. during periods of silence). In accordance with an exemplary embodiment of the present invention, telephony devices are coupled to signal processing systems, which for the purposes of explanation are operating in a network gateway so as to transmit voice across a packet based network. In the described exemplary packet voice exchange, source speech is encoded and packetized, for transmission across the packet based network to a voice decoder system, where the packet is decoded and communicated to a telephony device. However, according to industry research the average voice conversation includes as much as sixty percent silence or inactive content so that transmission across the packet based network can be significantly reduced if non-active speech packets are not transmitted across the packet based network. Voice activity detection (VAD) on the encoder side in conjunction with a comfort noise generator (CNG) on the decoder side may be used to effectively reduce the average bandwidth required for a typical voice channel.

Although the exemplary embodiment is described in the context of a signal processing system for telephone communications across a packet based network, it will be appreciated by those skilled in the art that the comfort noise generator is likewise suitable for various other telephony and telecommunications application such as, for example, a comfort noise generator within an echo canceller. Accordingly, the described exemplary embodiment of the comfort noise generator in a signal processing system is by way of example only and not by way of limitation.

A comfort noise generator plays noise. In an exemplary embodiment, a comfort noise generator in accordance with ITU standards G.729 Annex B or G.723.1 Annex A may be used. These standards specify background noise levels and spectral content. Referring to FIG. 6, the VAD 80 determines whether the digital voice samples in the media queue 66 contain active speech. If the VAD determines that the digital voice samples do not contain active speech, then comfort noise estimator 81 estimates the energy and spectrum of the background noise parameters at the near end to update a long running background noise energy and spectral estimates. These estimates are periodically quantized and transmitted in a SID packet by the comfort noise estimator (usually at the end of a talk spurt and periodically during the ensuing silent segment, or when the background noise parameters change appreciably). The comfort noise estimator 81 should update the long running averages, when necessary, decide when to transmit a SID packet, and quantize and pass the quantized parameters to the packetization engine. SID packets should not be sent while on-hook, unless they are required to keep the connection between the telephony devices alive. There may be multiple quantization methods depending on the protocol chosen.

However, in many instances a characterization of either the spectral content or energy level of the background noise may not be available to the CNG on the decoder side. For example, SID packets may not be used or the contents of the SID packet may not be specified (see FRF-11). Similarly, the SID packets may only contain an energy estimate, so that estimating some or all of the parameters of the noise in the decoding system may be necessary. Therefore, the comfort noise generator 92 (see FIG. 6) preferably should not be dependent upon SID packets from the far end encoder system for proper operation.

In the absence of SID packets, or SID packets containing energy only, the parameters of the background noise at the far end may be estimated by either of two alternative methods. First, the VAD 98 at the voice decoder 96 can be executed in series with a comfort noise estimator 100 to identify silence periods and to estimate the parameters of the background noise during those silence periods. During the identified inactive periods, the digital samples from the voice decoder 96 are used to update the comfort noise parameters of the comfort noise estimator. The far end voice encoder should preferably ensure that a relatively long hangover period is used in order to ensure that there are noise-only digital voice samples which the VAD 98 may identify as inactive speech.

Alternatively, the comfort noise estimate may be updated with the two or three digital voice frames which arrived immediately prior to the SID packet. The far end voice encoder should preferably ensure that at least two or three frames of inactive speech are transmitted before the SID packet is transmitted. This can be realized by extending the hangover period. The comfort noise estimator 100 may then estimate the parameters of the background noise based upon the spectrum and or energy level of these frames. In this alternate approach continuous VAD execution is not required to identify silence periods, so as to further reduce the average bandwidth required for a typical voice channel.

Alternatively, if it is unknown whether or not the far end voice encoder supports (sending) SID packets, the decoder system may start with the assumption that SID packets are not being sent, utilizing a VAD to identify silence periods, and then only use the comfort noise parameters contained in the SID packets if and when a SID packet arrives.

Figure 10:
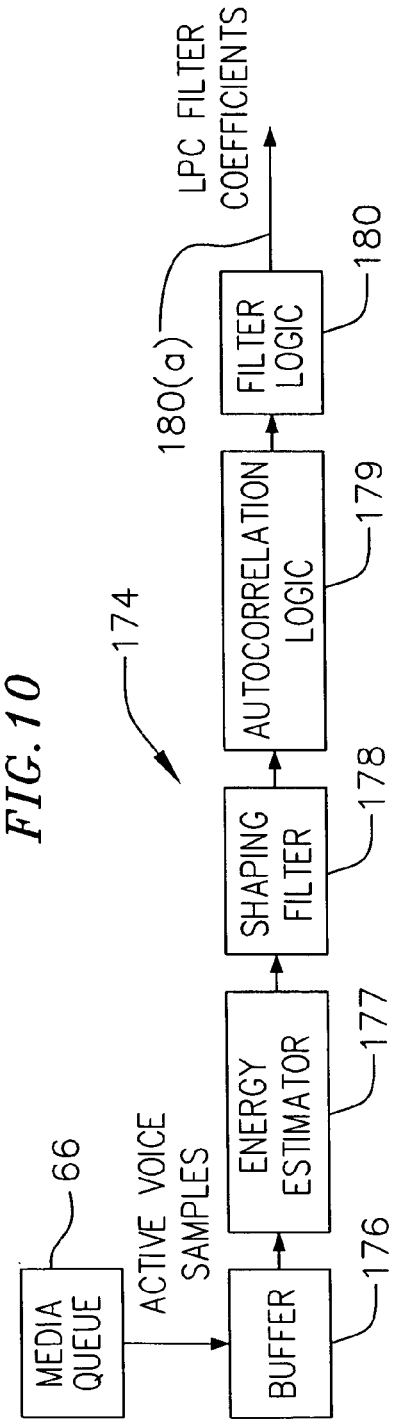
FIG. 10 is a block diagram of a method for modeling the spectral shape of the background noise of a voice transmission in accordance with a preferred embodiment of the present invention.

A preferred embodiment of the comfort noise generator generates comfort noise based upon the energy level of the background noise contained within the SID packets and spectral information derived from the previously decoded in active speech frames. The described exemplary embodiment of the CNG includes two primary functions, noise analysis and noise synthesis. In the described exemplary embodiment, there is preferably an extended hangover period during which the decoded voice signal is primarily inactive or noise before the VAD identifies the signal as being inactive, (changing from speech to noise). Linear Prediction Coding (LPC) coefficients may be used to model the spectral shape of the noise during the hangover period just before the SID packet is received from the VAD. Linear prediction coding models each sample of a signal as a linear combination of previous samples, that is, as the output of an all-pole IIR filter. Referring to FIG. 10, a noise analyzer 174 determines the LPC coefficients.

In the described exemplary embodiment, a signal buffer 176 receives and buffers decoded voice samples. An energy estimator 177 analyzes the energy level of the samples buffered in the signal buffer 176. The energy estimator 177 compares the estimated energy level of the samples stored in the signal buffer with the energy level provided in the SID packet. In the described exemplary embodiment, CNG processing is terminated if the energy level estimated for the samples stored in the signal buffer and the energy level provided in the SID packet differ by more than a predetermined threshold, preferably on the order of about 6 dB. In addition, energy estimator 177, analyzes the stability of the energy level of the samples buffered in the signal buffer. The energy estimator 177 preferably divides the samples stored in the signal buffer into two groups, (preferably approximately equal halves) and estimates the energy level for each group. CNG processing is preferably terminated if the estimated energy levels of the two groups differ by more than a predetermined threshold, preferably on the order of about 6 dB. In the described exemplary embodiment, a shaping filter 178 filters the incoming voice samples with a triangular windowing technique. Those of skill in the art will appreciate that alternative shaping filters such as, for example, a Hamming window, may be used to shape the incoming samples. However, the triangular window is currently preferred for balanced system performance and computational intensity, i.e. reduced MIPS.

When a SID packet is received on the decoder side, auto correlation logic 179 calculates the auto-correlation coefficients of the windowed voice samples 178(*a*). In the preferred embodiment the signal buffer 176 should preferably be sized to be smaller than the hangover period, to ensure that the auto correlation logic 179 computes auto correlation coefficients using only samples from the hangover period. In the described exemplary embodiment the signal buffer is sized to store on the order of about two hundred voice samples (25 msec assuming a sample rate of 8000 Hz). Autocorrelation, as is known in the art, involves correlating a signal with itself. A correlation function shows how similar two signals are, and how long the signals remain similar when one is shifted with respect to the other. Random noise is defined to be uncorrelated, that is random noise is only similar to itself with no shift at all. A shift of one sample results in zero correlation, so that the autocorrelation function of random noise is a single sharp spike at shift zero. The autocorrelation coefficients are calculated according to the following equation:

$$r(k) = \sum_{n=k}^{m} s(n) s(n-k)$$

where k=0 . . . p and p is the order of the LPC filter utilized to calculate the LPC filter coefficients.

Filter logic 180 utilizes the auto correlation coefficients to calculate the LPC filter coefficients 180(*a*) using the Levinson-Durbin Recursion method. However, the filter logic 180 first preferably applies a white noise correction factor to r(0) to increase the energy level of r(0) by a predetermined amount. The preferred white noise correction factor is on the order of about (257/256) which corresponds to a white noise level of approximately 24 dB below the average signal power. The white noise correction factor effectively raises the spectral minima so as to reduce the spectral dynamic range of the auto correlation coefficients to alleviate ill-conditioning of the Levinson-Durbin recursion. As is known in the art, the Levinson-Durbin recursion is an algorithm for finding an all-pole IIR filter with a prescribed deterministic autocorrelation sequence. The described exemplary embodiment preferably utilizes a tenth order (i.e. ten tap) LPC filter. However, a lower order filter may be used to realize a reduced complexity CNG.

The signal buffer 176 should preferably be updated each time the voice decoder is invoked during periods of active speech. Therefore, when there is a transition from speech to noise, the buffer 176 contains the voice samples from the most recent hangover period. The CNG should preferably ensure that the LPC filter is determined using only samples of background noise. If the LPC filter coefficients are determined based on the analysis of active speech samples, the filter determined will not give the correct spectrum of the background noise. In the described exemplary embodiment, a hangover period in the range of about 50-250 msec is assumed, and twelve active frames (assuming 5 msec frames) are accumulated before filter logic 180 calculates new LPC coefficients.

In the described preferred embodiment of the CNG, a noise synthesizer utilizes the power level of the background noise retrieved from processed SID packets and the predicted LPC filter coefficients 180(*a*) to generate comfort noise in accordance with the following formula:

$$s[n] = \text{energy} + \text{spectrum} = e[n] + \sum_{i=1}^{M} a_i \oplus s[n-i]$$

Where M is the order (i.e. the number of taps) of the LPC filter, s[n] is the predicted value of the synthesized noise, $a_i$ is the $i^{th}$ LPC filter coefficient, s[n−i] are the previous samples stored in the buffer 176 and e[n] is a Gaussian excitation signal.

Figure 11:
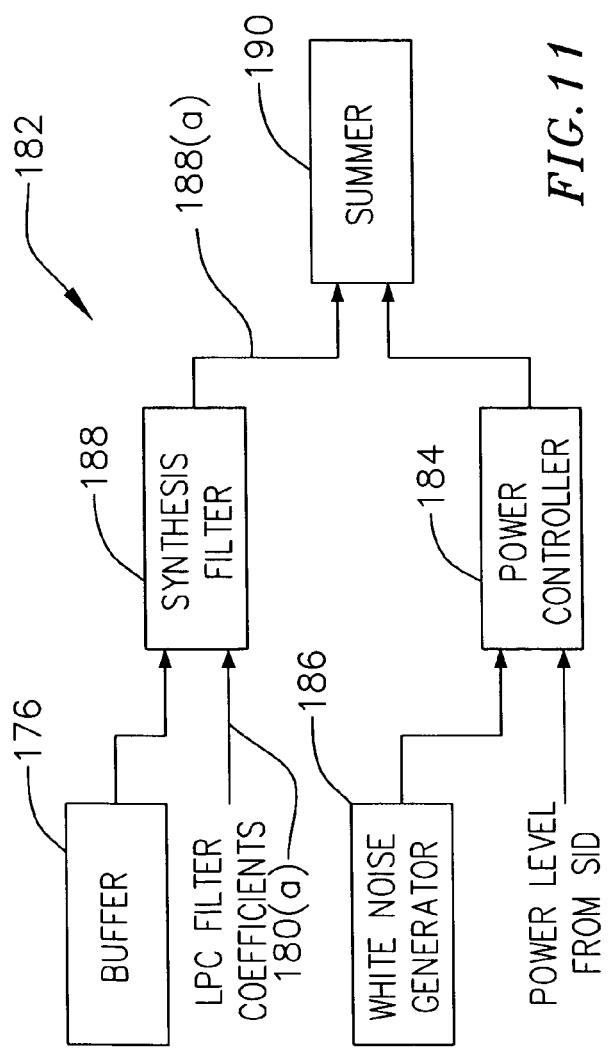
FIG. 11 is a block diagram of a method for generating comfort noise with an energy level and spectral shape that substantially matches the background noise of a voice transmission in accordance with a preferred embodiment of the present invention.

A block diagram of a preferred noise synthesizer 182 is shown in FIG. 11. The CNG processes SID packets to decode the power level of the current background noise. The power level of the background noise is forwarded to a power controller 184. In addition a white noise generator 186 forwards a gaussian signal to the power controller 184. The power controller 184 adjusts the power level of the gaussian signal in accordance with the power level of the background noise. A synthesis filter 188 receives voice samples from the buffer 176 and the LPC filter coefficients calculated by the filter logic 180 (see FIG. 10). The synthesis filter 188 provides the spectral information for the background noise in accordance with the above equation (i.e. sum of the product of the LPC filter coefficients 180(*a*) and the voice samples stored in the buffer 176). A summer 190 combines the outputs 188(*a*) and 184(*a*) of the synthesis filter 188 and the power controller 184 respectively to produce a comfort noise signal that substantially mimics the spectrum and energy level of the background noise.

5. Voice Encoder/Voice Decoder

In an exemplary embodiment, the voice encoder and the voice decoder support one or more voice compression algorithms, including but not limited to, 16 bit PCM (non-standard, and only used for diagnostic purposes); ITU-T standard G.711 at 64 kb/s; G.723.1 at 5.3 kb/s (ACELP) and 6.3 kb/s (MP-MLQ); ITU-T standard G.726 (ADPCM) at 16, 24, 32, and 40 kb/s; ITU-T standard G.727 (Embedded ADPCM) at 16, 24, 32, and 40 kb/s; ITU-T standard G.728 (LD-CELP) at 16 kb/s; and ITU-T standard G.729 Annex A (CS-ACELP) at 8 kb/s.

The packetization interval for 16 bit PCM, G.711, G.726, G.727 and G.728 should be a multiple of 5 msec. The packetization interval is the time duration of the digital voice samples that are encapsulated into a single voice packet. The voice encoder (decoder) interval is the time duration in which the voice encoder (decoder) is enabled. The packetization interval should be an integer multiple of the voice encoder (decoder) interval. By way of example, G.729 encodes frames containing 80 digital voice samples at 8 kHz which is equivalent to a voice encoder (decoder) interval of 10 msec. If two subsequent encoded frames of digital voice sample are collected and transmitted in a single packet, the packetization interval in this case would be 20 msec.

G.711, G.726, and G.727 encodes digital voice samples on a sample by sample basis. Hence, the minimum voice encoder (decoder) interval is 0.125 msec. This is somewhat of a short voice encoder (decoder) interval, especially if the packetization interval is a multiple of 5 msec. Therefore, a single voice packet will contain 40 frames of digital voice samples.

G.728 encodes frames containing 5 digital voice samples (or 0.625 msec). A packetization interval of 5 msec (40 samples) can be supported by 8 frames of digital voice samples.

G.723.1 compresses frames containing 240 digital voice samples. The voice encoder (decoder) interval is 30 msec, and the packetization interval should be a multiple of 30 msec.

Packetization intervals which are not multiples of the voice encoder (or decoder) interval can be supported by a change to the packetization engine or the depacketization engine. This may be acceptable for a voice encoder (or decoder) such as G.711 or 16 bit PCM, but the packetization interval should be a multiple of the voice encoder or decoder frame size.

The G.728 standard may be desirable for some applications. G.728 is used fairly extensively in proprietary voice conferencing situations and it is a good trade-off between bandwidth and quality at a rate of 16 kb/s. Its quality is superior to that of G.729 under many conditions, and it has a much lower rate than G.726 or G.727. However, G.728 is MIPS intensive.

Differentiation of various voice encoders (or decoders) may come at a reduced complexity. By way of example, both G.723.1 and G.729 could be modified to reduce complexity, enhance performance, or reduce possible IPR conflicts. Performance may be enhanced by using the voice encoder (or decoder) as an embedded coder. For example, the "core" voice encoder (or decoder) could be G.723.1 operating at 5.3 kb/s with "enhancement" information added to improve the voice quality. The enhancement information may be discarded at the source or at any point in the network, with the quality reverting to that of the "core" voice encoder (or decoder). Embedded coders can be implemented since they are based on a given core. Embedded coders are rate scalable, and are well suited for packet based networks. If a higher quality 16 kb/s voice encoder (or decoder) is required, one could use G.723.1 or G.729 Annex A at the core, with an extension to scale the rate up to 16 kb/s (or whatever rate was desired).

The configurable parameters for each voice encoder or decoder include the rate at which it operates (if applicable), which companding scheme to use, the packetization interval, and the core rate if the voice encoder (or decoder) is an embedded coder. For G.727, the configuration is in terms of bits/sample. For example EADPCM(5,2) (Embedded ADPCM, G.727) has a bit rate of 40 kb/s (5 bits/sample) with the core information having a rate of 16 kb/s (2 bits/sample).

6. Packetization Engine

In an exemplary embodiment, the packetization engine groups voice frames from the voice encoder, and with information from the VAD, creates voice packets in a format appropriate for the packet based network. The two primary voice packet formats are generic voice packets and SID packets. The format of each voice packet is a function of the voice encoder used, the selected packetization interval, and the protocol.

Those skilled in the art will readily recognize that the packetization engine could be implemented in the host. However, this may unnecessarily burden the host with configuration and protocol details, and therefore, if a complete self contained signal processing system is desired, then the packetization engine should be operated in the network VHD. Furthermore, there is significant interaction between the voice encoder, the VAD, and the packetization engine, which further promotes the desirability of operating the packetization engine in the network VHD.

The packetization engine may generate the entire voice packet or just the voice portion of the voice packet. In particular, a fully packetized system with all the protocol headers may be implemented, or alternatively, only the voice portion of the packet will be delivered to the host. By way of example, for VoIP, it is reasonable to create the RTP encapsulated packet with the packetization engine, but have the remaining TCP/IP stack residing in the host. In the described exemplary embodiment, the voice packetization functions reside in the packetization engine. The voice packet should be formatted according to the particular standard, although not all headers or all components of the header need to be constructed.

7. Voice Depacketizing Engine/Voice Queue

In an exemplary embodiment, voice de-packetization and queuing is a real time task which queues the voice packets with a time stamp indicating the arrival time. The voice queue should accurately identify packet arrival time within one msec resolution. Resolution should preferably not be less than the encoding interval of the far end voice encoder. The depacketizing engine should have the capability to process voice packets that arrive out of order, and to dynamically switch between voice encoding methods (i.e. between, for example, G.723.1 and G.711). Voice packets should be queued such that it is easy to identify the voice frame to be released, and easy to determine when voice packets have been lost or discarded en route.

The voice queue may require significant memory to queue the voice packets. By way of example, if G.711 is used, and the worst case delay variation is 250 msec, the voice queue should be capable of storing up to 500 msec of voice frames. At a data rate of 64 kb/s this translates into 4000 bytes or, or 2K (16 bit) words of storage. Similarly, for 16 bit PCM, 500 msec of voice frames require 4K words. Limiting the amount of memory required may limit the worst case delay variation of 16 bit PCM and possibly G.711 This, however, depends on how the voice frames are queued, and whether dynamic memory allocation is used to allocate the memory for the voice frames. Thus, it is preferable to optimize the memory allocation of the voice queue.

The voice queue transforms the voice packets into frames of digital voice samples. If the voice packets are at the fundamental encoding interval of the voice frames, then the delay jitter problem is simplified. In an exemplary embodiment, a double voice queue is used. The double voice queue includes a secondary queue which time stamps and temporarily holds the voice packets, and a primary queue which holds the voice packets, time stamps, and sequence numbers. The voice packets in the secondary queue are disassembled before transmission to the primary queue. The secondary queue stores packets in a format specific to the particular protocol, whereas the primary queue stores the packets in a format which is largely independent of the particular protocol.

In practice, it is often the case that sequence numbers are included with the voice packets, but not the SID packets, or a sequence number on a SID packet is identical to the sequence number of a previously received voice packet. Similarly, SID packets may or may not contain useful information. For these reasons, it may be useful to have a separate queue may be provided for received SID packets.

The depacketizing engine is preferably configured to support VoIP, VTOA, VoFR and other proprietary protocols. The voice queue should be memory efficient, while providing the ability to dynamically switch between voice encoders (at the far end), allow efficient reordering of voice packets (used for VoIP) and properly identify lost packets.

8. Voice Synchronization

In an exemplary embodiment, the voice synchronizer analyzes the contents of the voice queue and determines when to release voice frames to the voice decoder, when to play comfort noise, when to perform frame repeats (to cope with lost voice packets or to extend the depth of the voice queue), and when to perform frame deletes (in order to decrease the size of the voice queue). The voice synchronizer manages the asynchronous arrival of voice packets. For those embodiments which are not memory limited, a voice queue with sufficient fixed memory to store the largest possible delay variation is used to process voice packets which arrive asynchronously. Such an embodiment includes sequence numbers to identify the relative timings of the voice packets. The voice synchronizer should ensure that the voice frames from the voice queue can be reconstructed into high quality voice, while minimizing the end-to-end delay. These are competing objectives so the voice synchronizer should be configured to provide system trade-off between voice quality and delay.

Preferably, the voice synchronizer is adaptive rather than fixed-based upon the worst case delay variation. This is especially true in cases such as VoIP where the worst case delay variation can be on the order of a few seconds. By way of example, consider a VoIP system with a fixed voice synchronizer based on a worst case delay variation of 300 msec. If the actual delay variation is 280 msec, the signal processing system operates as expected. However, if the actual delay variation is 20 msec, then the end-to-end delay is at least 280 msec greater than required. In this case the voice quality should be acceptable, but the delay would be undesirable. On the other hand, if the delay variation is 330 msec then an underflow condition could exist degrading the voice quality of the signal processing system.

The voice synchronizer performs four primary tasks. First, the voice synchronizer determines when to release the first voice frame of a talk spurt from the far end. Subsequent to the release of the first voice frame, the remaining voice frames are released in an isochronous manner. In an exemplary embodiment, the first voice frame is held for a period of time that is equal or less than the estimated worst case jitter.

Second, the voice synchronizer estimates how long the first voice frame of the talk spurt should be held. If the voice synchronizer underestimates the required "target holding time," jitter buffer underflow will likely result. However, jitter buffer underflow could also occur at the end of a talk spurt, or during a short silence interval. Therefore, SID packets and sequence numbers could be used to identify what caused the jitter buffer underflow, and whether the target holding time should be increased. If the voice synchronizer overestimates the required "target holding time," all voice frames will be held too long causing jitter buffer overflow. In response to jitter buffer overflow, the target holding time should be decreased. In the described exemplary embodiment, the voice synchronizer increases the target holding time rapidly for jitter buffer underflow due to excessive jitter, but decreases the target holding time slowly when holding times are excessive. This approach allows rapid adjustments for voice quality problems while being more forgiving for excess delays of voice packets.

Thirdly, the voice synchronizer provides a methodology by which frame repeats and frame deletes are performed within the voice decoder. Estimated jitter is only utilized to determine when to release the first frame of a talk spurt. Therefore, changes in the delay variation during the transmission of a long talk spurt must be independently monitored. On buffer underflow (an indication that delay variation is increasing), the voice synchronizer instructs the lost frame recovery engine to issue voice frames repeats. In particular, the frame repeat command instructs the lost frame recover engine to utilize the parameters from the previous voice frame to estimate the parameters of the current voice frame. Thus, if frames 1, 2 and 3 are normally transmitted and frame 3 arrives late, frame repeat is issued after frame number 2, and if frame number 3 arrives during this period, it is then transmitted. The sequence would be frames 1,2, a frame repeat and then frame 3. Performing frame repeats causes the delay to increase, which increasing the size of the jitter buffer so as to cope with increasing delay characteristics during long talk spurts. Frame repeats are also issued to replace voice frames that are lost en route.

Conversely, if the holding time is too large due to decreasing delay variation, the speed at which voice frames are released should be increased. Typically, the target holding time can be adjusted, which automatically compresses the following silent interval. However, during a long talk spurt, it may be necessary to decrease the holding time more rapidly to minimize the excessive end to end delay. This can be accomplished by passing two voice frames to the voice decoder in one decoding interval but only one of the voice frames is transferred to the media queue.

The voice synchronizer must also function under conditions of severe buffer overflow, where the physical memory of the signal processing system is insufficient due to excessive delay variation. When subjected to severe buffer overflow, the voice synchronizer could simply discard voice frames.

The voice synchronizer should operate with or without sequence numbers, time stamps, SID packets, voice packets arriving out of order and lost voice packets. In addition, the voice synchronizer preferably provides a variety of configuration parameters which can be specified by the host for optimum performance, including minimum and maximum target holding time. With these two parameters, it is possible to use a fully adaptive jitter buffer by setting the minimum target holding time to zero msec and the maximum target holding time to 500 msec (or the limit imposed due to memory constraints). Although the preferred voice synchronizer is fully adaptive and able to adapt to varying network conditions, those skilled in the art will appreciate that the voice synchronizer can also be maintained at a fixed holding time by setting the minimum and maximum holding times to be equal.

9. Lost Packet Recovery/Frame Deletion

The lost packet recovery engine can be configured to provide frame insertion, and frame deletion capability for all voice decoders under consideration. For G.729 Annex A and G.723.1, the lost frame recovery mechanism can be part of the voice decoder. The same mechanism may be used for frame insertion. Frame deletion can be realized by simply passing two consecutive voice frames to the voice decoder in the same decoding interval, and discarding one of the voice frames. In this manner, the end to end delay will be decreased in time by one decoding interval. The frame deletion mechanism can likewise be fully integrated into both G.723.1 and G.729 Annex A. This reduces the complexity of the frame deletion mechanism and allows voice frames to be discarded over a longer interval to improve the overall quality. However, since the frame deletion is a low probability event, the short term impact on voice quality should be minor. Alternatively, a non-integrated frame deletion mechanism can also be used.

For voice decoders other than G.723.1 and G729 Annex A, it is desirable to have a method to handle lost voice packets and to implement a frame insertion scheme. However, the likelihood of requiring a frame insertion is typically low and the position of the frame insertion can be selected based on decoded voice energy. This allows the frame insertion mechanism to be realized through the use of the lost frame recovery mechanism, whereby the frames from a lost voice packet are simply inserted between consecutive voice frames. In other words, between frame n and n+1, a frame loss is inserted. This effectively increases the end to end delay by one decoding interval.

Similarly, voice packet loss for voice telephony over ATM and voice over FR should also be a low probability event. However, for voice over IP frame losses can be excessive. In fact, in TCP/IP congestion can be mitigated by having routers discard voice packets. When end points detect the voice discarded packets, they typically will reduce their transmission rate. If the network begins to get congested, voice packet losses (which can get quite high) will occur. Thus, an efficient frame loss recovery mechanism is desired to maintain reasonably high quality during voice packet losses.

Figures 12, 13:
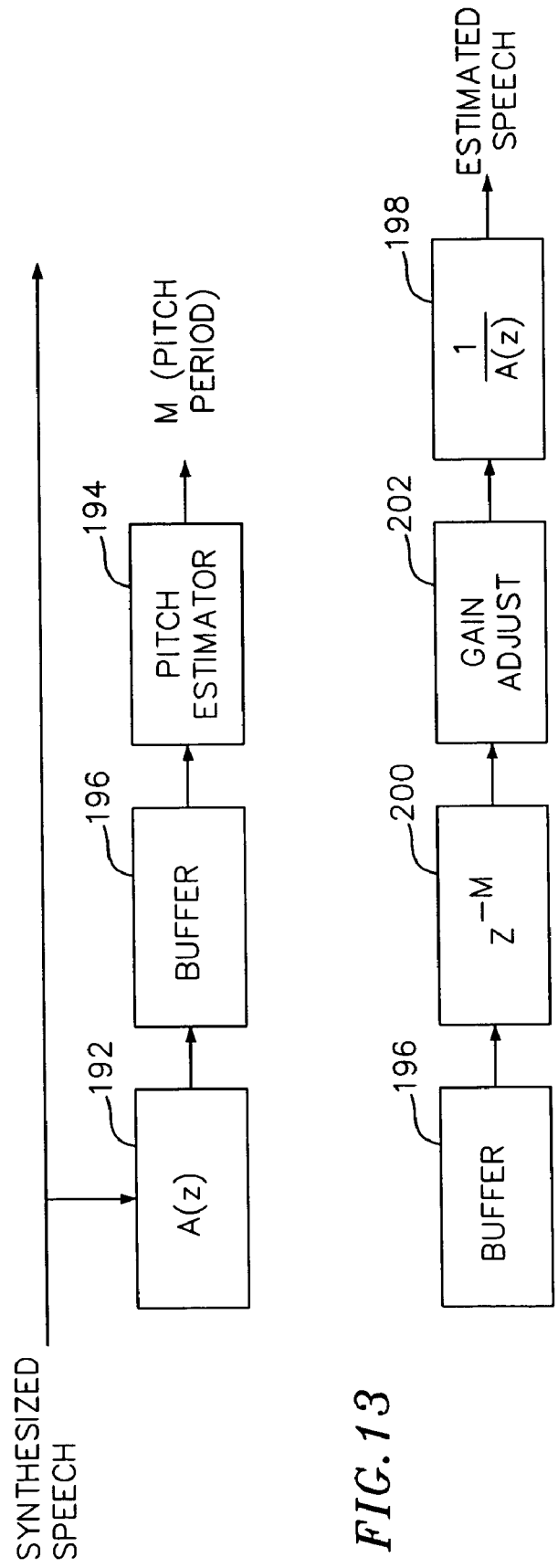
FIG. 12 is a block diagram of a method for obtaining voice parameters for future frame loss conditions in accordance with a preferred embodiment of the present invention.
FIG. 13 is a block diagram of a method for generating estimates of lost speech frames in accordance with a preferred embodiment of the present invention.

Lost voice frames can be estimated by first estimating the pitch period based on digital voice samples contained in the previous frames, and then repeating the previous excitation to an LPC filter delayed by one (or possible more) pitch periods. An exemplary embodiment for estimating the pitch period and excitation during previous good voice frames is shown in FIG. 12. Normally, when a voice frame is available from the voice decoder (or comfort noise generator 92), the LPC is estimated based on a frame of current plus past digital voice samples (over a window length in the range of about 20 to 30 msec). The digital voice samples over the decoding interval is then passed through a LPC inverse filter 192 to obtain the LPC residual. The residual (both current and past) or perhaps a combination of the residual and past digital voice samples is used to obtain a pitch estimate using, for example, a pitch estimator 194 or correlation measurement. In fact, a pitch estimator similar to that used in G.729 Annex A may be used. In this instance, pitch doubling is not a serious problem since this lost frame recovery system is only used in an attempt to recover a lost voice packet. Typically, past residuals should be stored in a buffer 196 of about at least 120 to 160 digital voice samples, and a pitch period range of between (about) 20 and 140 digital voice samples should be analyzed.

During a voice packet loss condition, the residual used to excite the LPC synthesis filter 198 is estimated by selecting a scaled residual from one (or more) pitch periods in the past ($Z^{-M}$) 200. The pitch period is that which was estimated in the previous good voice frame. Referring to FIG. 13, a gain adjuster 202 slowly increases the gain to reduce the output energy during multiple frame loss conditions. If the voice packet loss condition extends for more than 40 or 50 msec, the resulting digital voice samples should be significantly muted, and the signal processing system should switch from issuing frame losses to generating comfort noise. (This control should be placed in the voice synchronizer which controls when the voice decoder, comfort noise generator, and lost packet recovery engine are invoked). During a voice packet loss condition the estimated residual is saved in the past residual buffer 196 to ensure that for multiple frame losses from one or more voice packets a past residual is still available. If a strong pitch component is not identified, rather than repeating past excitation delayed by the estimated (best) pitch period a random (gaussian, for example) excitation can be used to excite the LPC synthesis filter 198. The random excitation should be scaled such that the power is slightly less than that in the last good voice frame.

The capability of the voice decoder should be considered when selecting the lost packet recovery engine 94. For voice decoder's which are less MIPS intensive, such as G.726, G.727 and G.711, the added complexity of the lost packet recovery engine would not increase the complexity to that of say G.729 Annex A or G.723.1. The lost frame recovery engine should preferably be on the order of 1 MIP, or less. For more complex voice decoders such as G.728, the parameters used for lost voice packet recovery (LPC filter and pitch period) are known at the voice decoder. The lost frame recovery mechanism could be integrated directly into G.728. This is a lower complexity solution, and is preferred for G.728.

10. DTMF

DTMF (dual-tone, multi-frequency) tones are signaling tones carried within the audio band. A dual tone signal is represented by two sinusoidal signals whose frequencies are separated in bandwidth and which are uncorrelated to avoid false tone detection. A DTMF signal includes one of four tones, each having a frequency in high frequency band, and one of four tones, each having a frequency in a low frequency band. The frequencies used for DTMF encoding and detection are defined by the international telecommunication union and are widely accepted around the world.

The problem of DTMF signaling and detection is a common telephony problem. DTMF is used in a wide variety of telephony applications, such as, for example, for dialing, interactive voice response systems (IVR), and for PBX to PBX or PBX to central office signaling. In the context of a packet voice system in accordance with an exemplary embodiment of the present invention, telephony devices are coupled to a signal processing system which, for the purposes of explanation, is operating in a network gateway to support the exchange of voice between a traditional circuit switched network and a packet based network. In addition, the signal processing system operating on network gateways also supports the exchange of voice between the packet based network and a number of telephony devices.

There are numerous problems involved with the transmission of DTMF in band over a packet based network. For example, lossy voice compression may distort a valid DTMF tone or sequence into an invalid tone or sequence. Also voice packet losses of digital voice samples may corrupt DTMF sequences and delay variation (jitter) may corrupt the DTMF timing information and lead to lost digits. The severity of the various problems depends on the particular voice decoder, the voice decoder rate, the voice packet loss rate, the delay variation, and the particular implementation of the signal processing system. For applications such as VoIP with potentially significant delay variation, high voice packet loss rates, and low digital voice sample rate (if G.723.1 is used), packet tone exchange is desirable. Packet tone exchange is also desirable for VoFR (FRF-11, class 2). Thus, proper detection and out of band transfer via the packet network is useful.

Although the DTMF detection is described in the context of a signal processing system with the packet tone exchange invoked, those skilled in the art will appreciate that DTMF detection is likewise suitable for various other telephony and telecommunications applications. Accordingly, the described exemplary embodiment for DTMF detection in a signal processing system is by way of example only and not by way of limitation. For example, the present invention may be used in various other applications, including telephone switching and interactive control applications, telephone banking, fax on demand, etc. The DTMF detector of the present invention may also be used as the DTMF detector in a telephone company Central Office, as desired.

The international telecommunications union (ITU) and Bellcore have promulgated various standards for DTMF detectors. The described exemplary DTMF detector preferably complies with ITU-T Standard Q.24 (for DTMF digit reception) and Bellcore GR-506-Core, TR-TSY-000181, TR-TSY-000762 and TR-TSY-000763, the contents of which are hereby incorporated by reference as though set forth in full herein. These standards involve various criteria, such as frequency distortion allowance, twist allowance, noise immunity, guard time, talk-down, talk-off, acceptable signal to noise ratio, and dynamic range, etc. The distortion allowance criteria specifies that a DTMF detector is required to detect a transmitted signal that has a frequency distortion of less than 1.5% and should not detect any DTMF signals that have frequency distortion of more than 3.5%. The term "twist" refers to the difference, in decibels, between the amplitude of the strongest key pad column tone and the amplitude of the strongest key pad row tone. For example, the Bellcore standard requires the twist to be between −8 and +4 decibels. The noise immunity criteria requires that if the signal has a signal to noise ratio (SNR) greater than certain decibels, then the DTMF detector is required to not miss the signal, i.e., is required to detect the signal. Different standards have different SNR requirements, which usually range from 12 to 24 decibels. The guard time check criteria requires that if a tone has a duration greater than 40 milliseconds, the DTMF detector is required to detect the tone, whereas if the tone has a duration less than 20 milliseconds, the DTMF detector is required to not detect the tone. Alternate embodiments of the present invention readily provide for compliance with other telecommunication standards such as EIA-464B, and JJ-20.12.

Figure 14:
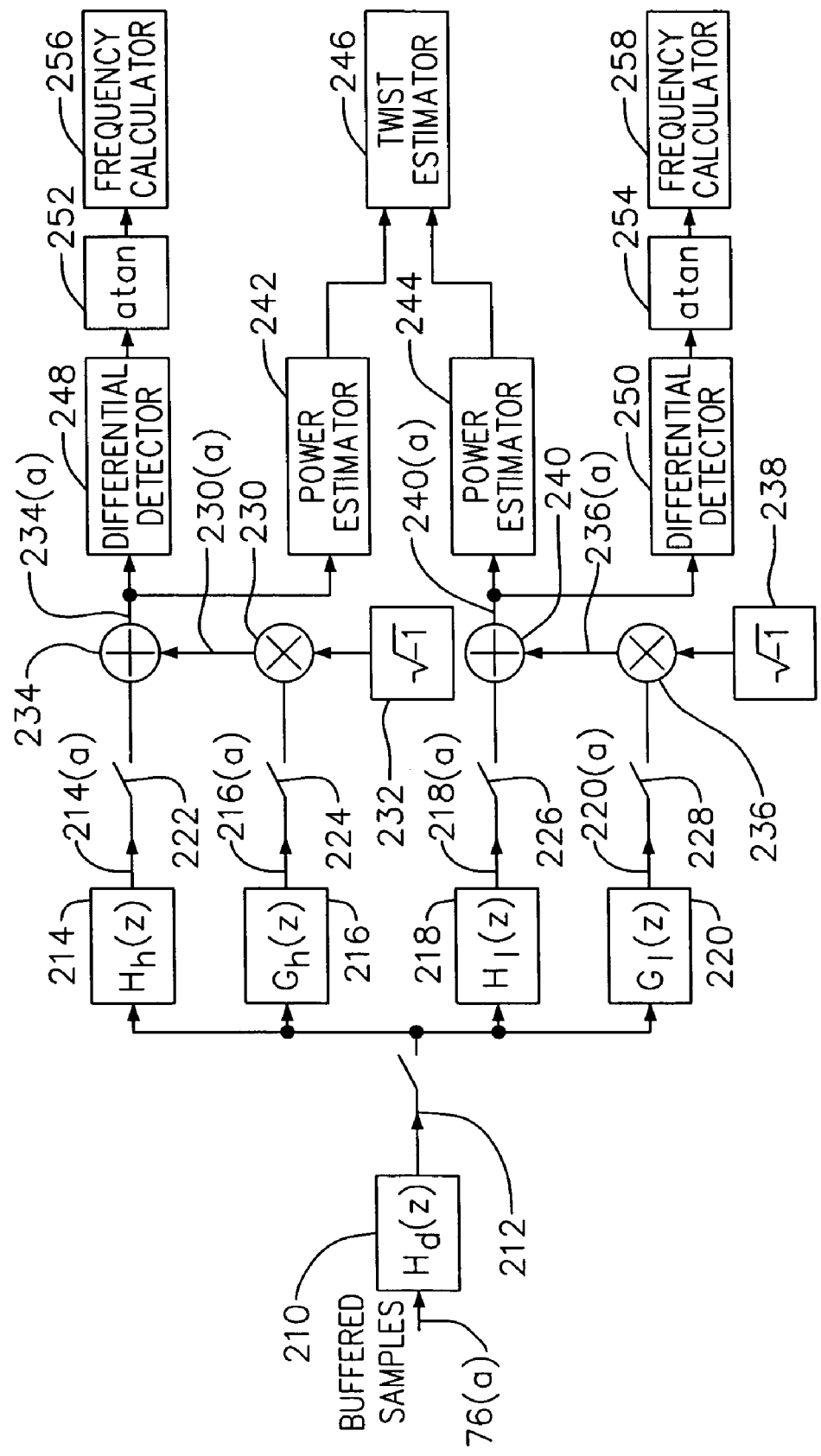
FIG. 14 is a block diagram of a method for detecting dual tone multi frequency tones in accordance with a preferred embodiment of the present invention.

Referring to FIG. 14 the DTMF detector 76 processes the 64 kb/s pulse code modulated (PCM) signal, i.e., digital voice samples 76($a$) buffered in the media queue (not shown). The input to the DTMF detector 76 should preferably be sampled at a rate that is at least higher than approximately 4 kHz or twice the highest frequency of a DTMF tone. If the incoming signal is sampled at a rate that is greater than 4 kHz (i.e. Nyquist for highest frequency DTMF tone) the signal may immediately be downsampled so as to reduce the complexity of subsequent processing. The signal may be downsampled by filtering and discarding samples.

A block diagram of a preferred embodiment of the invention is shown in FIG. 14. The described exemplary embodiment includes a system for processing the upper frequency band tones and a substantially similar system for processing the lower frequency band tones. A filter 210 and sampler 212 may be used to down-sample the incoming signal. In the described exemplary embodiment, the sampling rate is 8 kHz and the front end filter 210 and sampler 212 do not downsample the incoming signal. The output 212($a$) of the sampler 212 is filtered by two bandpass filters ($H_h(z)$ 214 and $G_h(z)$) 216 for the upper frequency band and $H_l(z)$ 218 and $G_l(Z)$ 220 for the lower frequency band) and down-sampled by samplers 222, 224 and 226, 228 respectively. The bandpass filters (214, 216 and 218, 220) are designed using a single prototype lowpass filter which is multiplied by $\cos(2\Pi f_n nT)$ and $\sin(2\Pi f_n nT)$ (where $T=1/f_s$ where $f_s$ is the sampling frequency after the front end down-sampling by the filter 210 and the sampler 212.

In the described exemplary embodiment, the bandpass filters (214, 216 and 218, 220) are executed every eight samples and the outputs (214$a$, 216$a$ and 218$a$, 220$a$) of the bandpass filters (214, 216 and 218, 220) are down-sampled by samplers 222, 224 and 226, 228 at a ratio of eight to one. The combination of down-sampling is selected so as to optimize the performance of a particular DSP in use and preferably provides a sample approximately every msec or a 1 kbs signal. Down-sampled signals in the upper and lower frequency systems respectively are real signals. In the upper frequency system, a multiplier 230 multiplies the output of sampler 224 by the square root of minus one (i.e. j) 232. A summer 234 then adds the output of downsampler 222 with complex signal 230(a). Similarly, in the lower frequency system, a multiplier 236 multiplies the output of downsampler 228 by the square root of minus one (i.e. j) 238. A summer 240 then adds the output of downsampler 226 with complex signal 236(a). Combined signals 234(a) $x_h(t)$ and 240(a) $x_l(t)$ are complex signals. It will be appreciated by one of skill in the art that the function of the bandpass filters can be accomplished by alternative finite impulse response filters or structures such as windowing followed by DFT processing.

If a single frequency is present within the bands defined by the bandpass filters, the combined complex signals $x_h(t)$ and $x_l(t)$ will be constant envelope (complex) signals. Short term power estimator 242 and 244 measure the power of $x_h(t)$ and $x_l(t)$ respectively and compare the estimated power levels of $x_h(t)$ and $x_l(t)$ with the requirements promulgated in ITU-T Q.24. In the described preferred embodiment, the upper system processing is first executed to determine if the power level within the upper band complies with the thresholds set forth in the ITU-T Q.24 recommendations. If the power within the upper band does not comply with the ITU-T recommendations the signal is not a DTMF tone and processing is terminated. If the power within the upper band complies with the ITU-T Q.24 standard, the low group is processed. A twist estimator 246 compares the power in the upper band and the lower band to determine if the twist (defined as the ratio of the power in the lower band and the power in the upper band) is within an acceptable range as defined by the ITU-T recommendations. If the ratio of the power within the upper band and lower band is not within the bounds defined by the standards a DTMF tone is not present and processing is terminated.

If the ratio of the power within the upper band and lower band complies with the thresholds defined by the ITU-T Q.24 and Bellcore GR-506-Core, TR-TSY-000181, TR-TSY-000762 and TR-TSY-000763 standards, the frequency of the upper band signal $x_h(t)$ and the frequency of the lower band signal $x_l(t)$ are estimated. Because of the duration of the input signal (one msec), conventional frequency estimation techniques such as counting zero crossings may not sufficiently resolve the input frequency. Therefore, differential detectors 248 and 250 are used to estimate the frequency of the upper band signal $x_h(t)$ and the lower band signal $x_l(t)$ respectively. The differential detectors 248 and 250 estimate the phase variation of the input signal over a given time range. Advantageously, the accuracy of estimation is substantially insensitive to the period over which the estimation is performed. With respect to upper band input $x_h(n)$, (and assuming $x_h(n)$ is a sinusoid of frequency $f_i$) the differential detector 248 computes:

$$y_h(n) = x_h(n) x_h(n-1)^* e(-j2\Pi f_{mid})$$

where $f_{mid}$ is the mean of the frequencies in the high group or low group and superscript* implies complex conjugation. Then, $$y_h(n) = e(j2\pi f_i n) \, e(-j2\pi f_i(n-1)) \, e(-j2\pi f_{mid})$$
$$= e(j2\pi(f_i - f_{mid}))$$

which is a constant, independent of n. Arctan functions 252 and 254 take two inputs and computes the angle of the above complex value that uniquely identifies the frequency present in the high and low bands. In operation atan $2(\sin(2\Pi(f_i - f_{mid})), \cos(2\Pi(f_i - f_{mid})))$ returns to within a scaling factor the frequency difference $f_i - f_{mid}$. Those skilled in the art will appreciate that various algorithms, such as a frequency discriminator, could be use to estimate the frequency of the DTMF tone by calculating the phase variation of the input signal over a given time period.

Having estimated the frequency components of the upper band and lower band, the DTMF detector analyzes the upper band and lower band signals to determine whether a DTMF digit is present in the incoming signals and if so which digit. Frequency calculators 256 and 258 compute a mean and variance of the frequency deviation over the entire window of frequency estimates to identify valid DTMF tones in the presence of background noise or speech that resembles a DTMF tone. In the described exemplary embodiment, if the mean of the frequency estimates over the window is within acceptable limits, preferably less than +/−2.8% for the lowband and +/−2.5% for the highband the variance is computed. If the variance is less than a predetermined threshold, preferably on the order of about 1464 Hz$^2$ (i.e. standard deviation of 38.2 Hz) the digit identified is passed to a state machine (not shown) which considers the time sequence of events and whether a single DTMF is present. In the described exemplary embodiment the total window size is preferably 5 msec so that a DTMF detection decision is performed every 5 msec.

In the context of an exemplary embodiment of the voice mode, the DTMF detector is operating in the packet tone exchange along with a voice coder operating under the packet voice exchange, which allows for simplification of DTMF detection processing. Most voice coders operate at a particular frame size (the number of samples or time in msec over which the speech is block compressed). For example, the frame size for ITU-T standard G.723.1 is 30 msec. For ITU-T standard G.729 the frame size is 10 msec. In addition, many packet voice systems group multiple output frames from a particular voice coder into a network cell or packet. To prevent leakage through the audio channel, the described exemplary embodiment delays DTMF detection until the last frame of speech is processed before a full packet is constructed. Therefore, for transmissions in accordance with the G.723.1 standard and a single output frame placed into a packet, DTMF detection may be invoked every 30 msec (synchronous with the end of the frame). Under the G.729 standard with two voice coder frames placed into a single packet, DTMF detection or decision may be delayed until the end of the second voice frame within a packet is processed.

In the described exemplary embodiment, the DTMF detector is inherently stateless, so that detection of DTMF tones within the second five msec DTMF block of a voice coder frame doesn't depend on DTMF detector processing of the first five msec block of that frame. If the delay in DTMF detection is greater than or equal to twice the DTMF detector block size, the processing required for DTMF detection can be further simplified. For example, the instructions required to perform DTMF detection may be reduced by 50% for a voice coder frame size of 10 msec and a DTMF detector block size of 5 msec. The ITU-T Q.24 standard requires DTMF tones to have a minimum duration of 23 msec. Therefore, a valid DTMF tone may be detected within a given 10 msec frame by only analyzing the second 5 msec interval of that frame. For example, if a DTMF tone was not detected in the previous frame and the DTMF detector initially detects a DTMF tone in the first 5 msec interval of the next frame, the DTMF tone must still be present in the next 5 msec interval of that frame. Similarly, if DTMF is not present in the second 5 msec interval, the first 5 msec block need not be processed so that DTMF detection processing is reduced by 50%. Similar savings may result if the previous frame did contain a DTMF (if the DTMF is still present in the second 5 msec portion it is most likely it was on in the first 5 msec portion). This method is easily extended to the case of longer delays (30 msec for G.723.1 or 20-40 msec for G.729 and packetization intervals from 2-4 or more). It may be necessary to search more than one 5 msec period out of the longer interval, but only a subset is necessary.

DTMF events are preferably reported to the host. This allows the host, for example, to convert the DTMF sequence of keys to a destination address. It will, therefore, allow the host to support call routing via DTMF.

Depending on the protocol, the packet tone exchange may support muting of the received digital voice samples, or discarding voice frames when DTMF is detected. In addition, to avoid DTMF leakage into the audio path, the voice packets may be queued (but not released) in the encoder system when DTMF is pre-detected. DTMF is pre-detected through a combination of DTMF decisions and state machine processing. The DTMF detector will make a decision (i.e. is there DTMF present) every five msec. The state machine analyzes the history of a given DTMF tone to determine the current duration of a given tone so as to estimate how long the tone will likely continue. If the detection was false (invalid), the voice packets are ultimately released, otherwise they are discarded. This will manifest itself as occasional jitter when DTMF is falsely detected. It will be appreciated by one of skill in the art that tone packetization can alternatively be accomplished through compliance with various industry standards such as for example, the Frame Relay Forum (FRF-11) standard, the voice over atm standard ITU-T I.363.2, and IETF-draft-avt-tone-04, RTP Payload for DTMF Digits for Telephony Tones and Telephony Signals, the contents of which are hereby incorporated by reference as though set forth in full.

Software to route calls via DTMF can be resident on the host or within the signal processing system. Essentially, the packet tone exchange traps DTMF tones and reports them to the host or a higher layer. In an exemplary embodiment, the packet tone exchange will generate dial tone when an off-hook condition is detected. Once a DTMF digit is detected, the dial tone is terminated. The packet tone exchange may also have to play ringing tone back to the near end user (when the far end phone is being rung), and a busy tone if the far end phone is unavailable. Other tones may also need to be supported to indicate all circuits are busy, or an invalid sequence of DTMF digits were entered.

11. Precise Tone Detection

Telephone systems provide users with feedback about what they are doing in order to simplify operation and reduce calling errors. This information can be in the form of lights, displays, or ringing, but is most often audible tones heard on the phone line. These tones are generally referred to as call progress tones, as they indicate what is happening to dialed phone calls. Conditions like busy line, ringing called party, bad number, and others each have distinctive tone frequencies and cadences assigned them for which some standards have been established. A precise tone signal includes one of four tones. The frequencies used for precise tone encoding and detection, namely 350, 440, 480, and 660 Hz, are defined by the international telecommunication union and are widely accepted around the world. The relatively narrow frequency separation between tones, 40 Hz in one instance complicates the detection of individual tones. In addition, the duration or cadence of a given tone is used to identify alternate conditions.

The described exemplary embodiment preferably includes a precise tone detector that operates in accordance with industry standards. The precise tone detector interfaces with the media queue to detect incoming precise tone signals such as dial tone, re-order tone, audible ringing and line busy or hook status. The problem of precise tone signaling and detection is a common telephony problem. In the context of packet voice systems in accordance with an exemplary embodiment of the present invention, telephony devices are coupled to a signal processing system which, for the purposes of explanation, is operating in a network gateway to support the exchange of voice between a traditional circuit switched network and a packet based network. In addition, the signal processing system operating on network gateways also supports the exchange of voice between the packet based network and a number of telephony devices.

A preferred embodiment of the precise tone detector analyzes the spectral (frequency) and temporal (time) characteristics of an incoming telephony audioband signal to detect precise tone signals. The precise tone detector then forwards the precise tone signal to the packetization engine to be packetized and transmitted across the packet based network. Although the precise tone detector is described in the context of a signal processing system operating on a network gateway to support the exchange of voice and or fax/modem data between a traditional circuit switched network and a packet based network, those skilled in the art will appreciate that precise tone detection is likewise suitable for various other telephony and telecommunications applications. Accordingly, the described exemplary embodiment of the precise tone detector in a signal processing system is by way of example only and not by way of limitation. For example, the present invention may be used in various other applications, including telephone switching and interactive control applications, telephone banking, fax on demand, etc.

Figure 15:
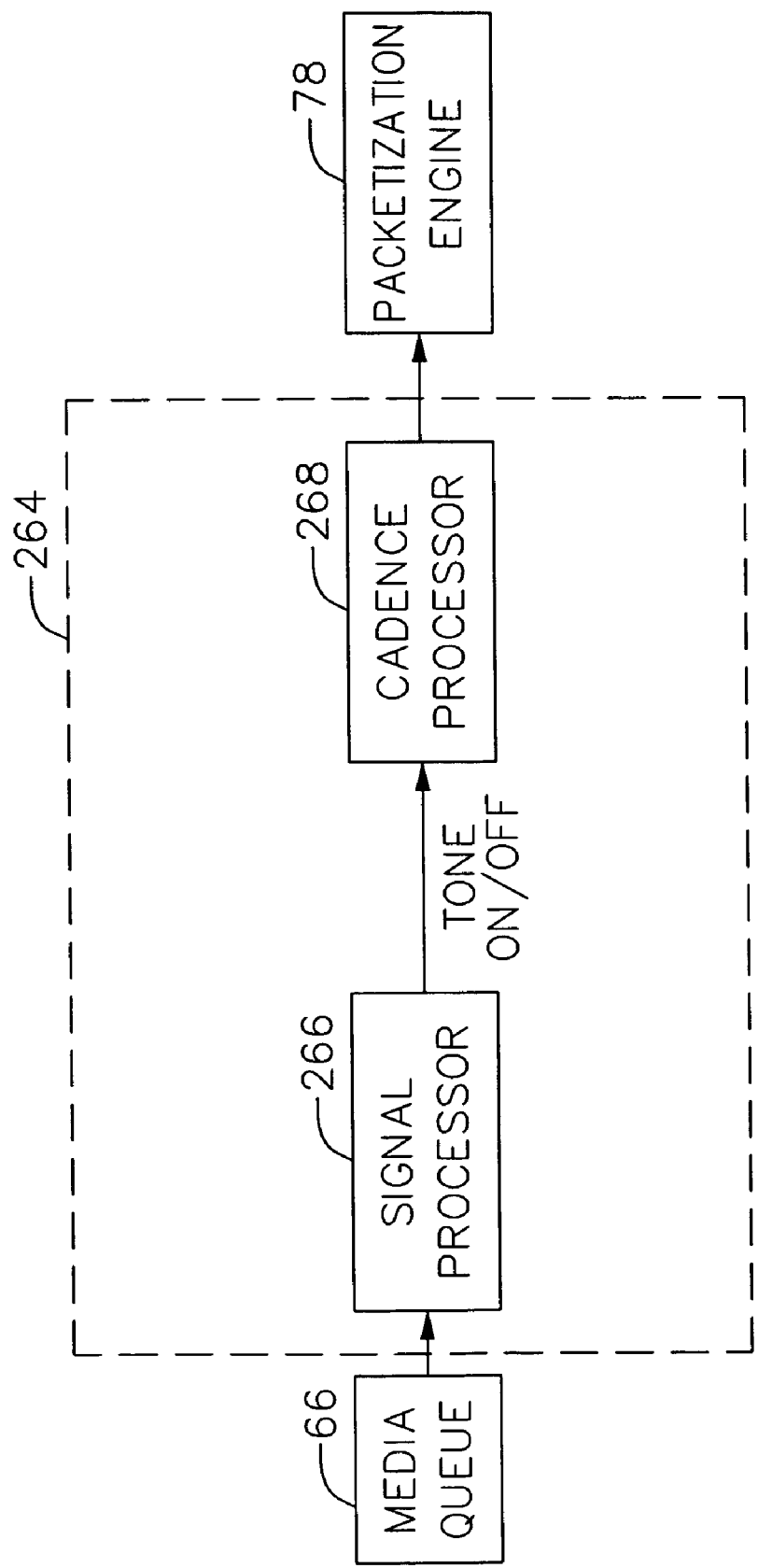
FIG. 15 is a block diagram of a signaling service for detecting precise tones in accordance with a preferred embodiment of the present invention.

Referring to FIG. 15 the precise tone detector 264 continuously monitors the media queue 66 of the voice encoder system. Typically the precise tone detector 264 is invoked every ten msec. Thus, for an incoming signal sampled at a rate of 8 kHz, the preferred precise tone detector operates on blocks of eighty samples. The precise tone detector 264 includes a signal processor 266 which analyzes the spectral characteristics of the samples buffered in the media queue 66. The signal processor 266 performs anti-aliasing, decimation, bandpass filtering, and frequency calculations to determine if a tone of a given frequency is present. A cadence processor 268 analyzes the temporal characteristics of the processed tones. The cadence processor 268 computes the on and off periods of the processed tones. If the cadence processor 268 detects a precise tone for an acceptable on and off period in accordance with the ITU-T standard, a Tone Detection Event will be generated.

Figure 16:
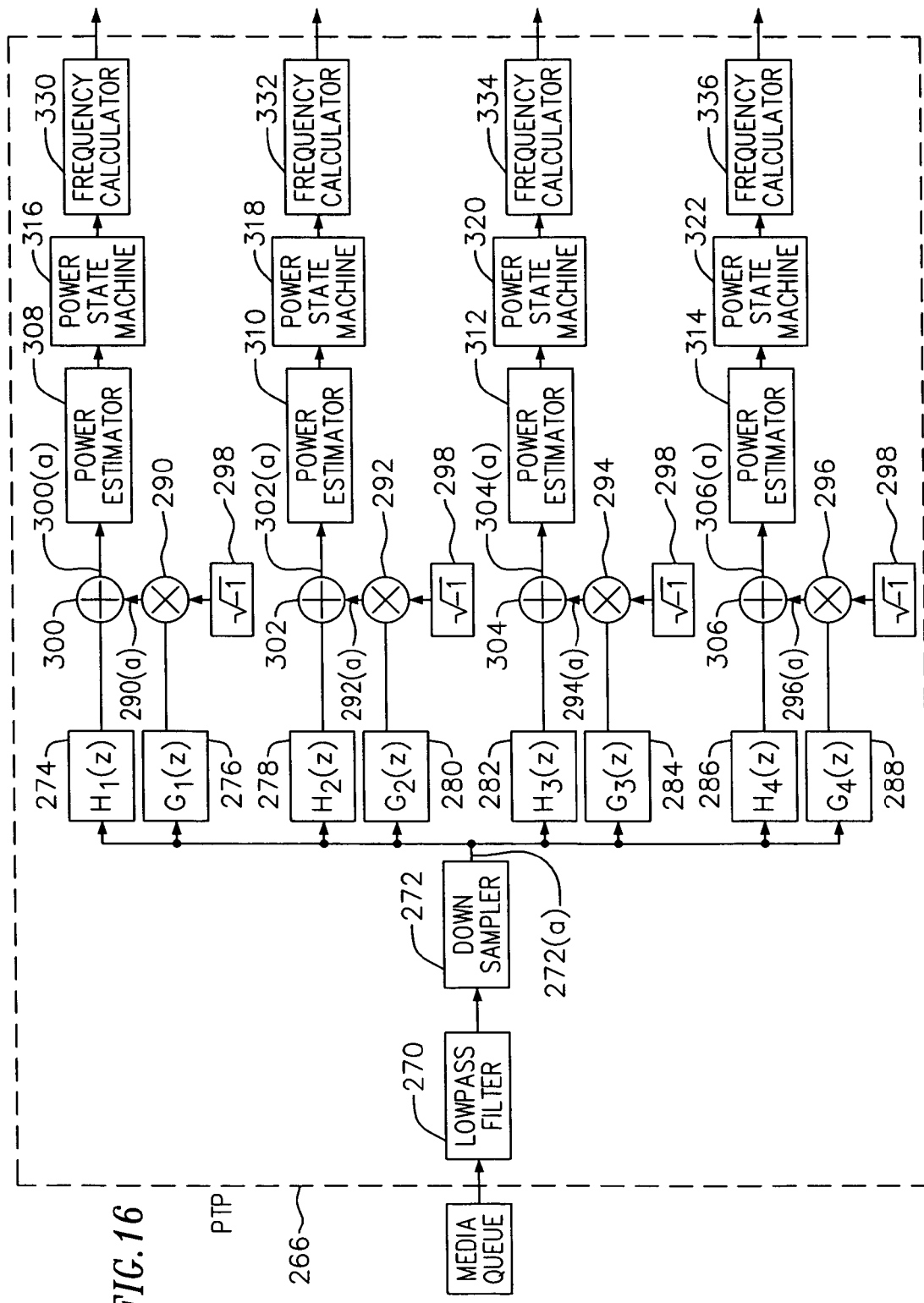
FIG. 16 is a block diagram of a method for detecting the frequency of a precise tone in accordance with a preferred embodiment of the present invention.

A block diagram for a preferred embodiment of the signal processor 266 is shown in FIG. 16. An anti-aliasing low pass filter 270, with a cutoff frequency of preferably about 666 Hz, filters the samples buffered in the media queue so as to remove frequency components above the highest precise tone frequency, i.e. 660 Hz. A down sampler 272 is coupled to the output of the low pass filter 270. Assuming an 8 kHz input signal the down sampler 272 preferably decimates the low pass filtered signal at a ratio of six:one (which avoids aliasing due to under sampling). The output 272(a) of down sampler 272 is filtered by eight bandpass filters (274, 276, 278, 280, 282, 284, 286 and 288), (i.e. two filters for each precise tone frequency). The decimation effectively increases the separation between tones, so as to relax the roll-off requirements (i.e. reduce the number of filter coefficients) of the bandpass filters 274-288 which simplifies the identification of individual tones. In the described preferred embodiment, the bandpass filters 274-288 are designed using a single prototype lowpass filter which is multiplied by $\cos(2\Pi f_h nT)$ and $\sin(2\Pi f_h nT)$ (where $T=1/f_s$ where $f_s$ is the sampling frequency after the decimation by the down sampler 272. The outputs of the band pass filters are real signals. Multipliers (290, 292, 294 and 296) multiply the outputs of filters (276, 280, 284 and 288) respectively by the square root of minus one (i.e. j) 298. Summers (300, 302, 304 and 306) then add the outputs of filters (274, 278, 282 and 286) with complex signals (290a, 292a, 294a and 296a) respectively. The combined signals are complex signals. It will be appreciated by one of skill in the art that the function of the bandpass filters (274-288) can be accomplished by alternative finite impulse response filters or structures such as windowing followed by DFT processing.

Figure 17:
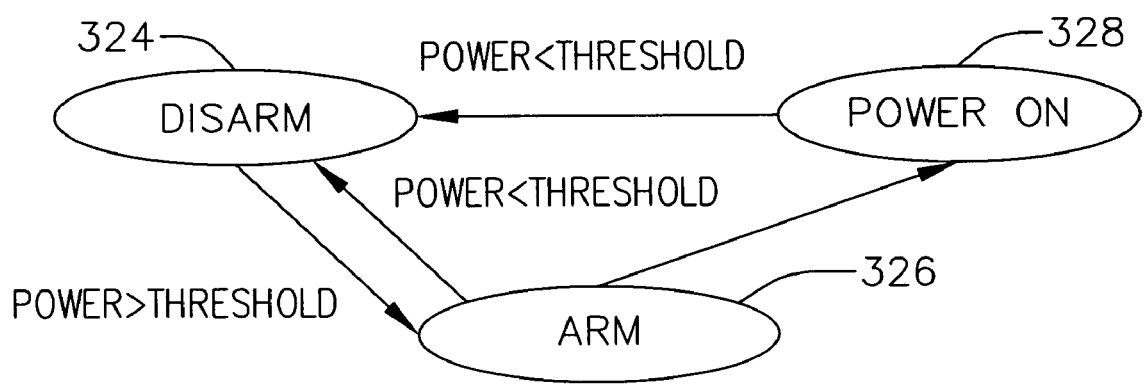
FIG. 17 is state machine diagram of a power state machine which monitors the estimated power level within each of the precise tone frequency bands in accordance with a preferred embodiment of the present invention.

Power estimators (308, 310, 312 and 314) estimates the short term average power of the combined complex signals (300a, 302a, 304a and 306a) for comparison to power thresholds determined in accordance with the (ITU_T STANDARD). The power estimators 308-312 forward an indication to power state machines (316, 318, 320 and 322) respectively which monitor the estimated power levels within each of the precise tone frequency bands. Referring to FIG. 17, the power state machine is a three state device, including a disarm state 324, an arm state 326, and a power on state 328. As is known in the art, the state of a power state machine depend on the previous state and the new input. For example, if an incoming signal is initially silent, the power estimator 308 would forward an indication to the power state machine 316 that the power level is less than the predetermined threshold. The power state machine would be off, and disarmed. If the power estimator 308 next detects an incoming signal whose power level is greater than the predetermined threshold, the power estimator forwards an indication to the power state machine 316 indicating that the power level is greater than the predetermined threshold for the given incoming signal. The power state machine 316 switches to the off but armed state. If the next input is again above the predetermined threshold, the power estimator 308 forwards an indication to the power state machine 316 indicating that the power level is greater than the predetermined threshold for the given incoming signal. The power state machine 316 now toggles to the on and armed state. The power state machine 316 substantially reduces or eliminates false detections due to glitches, white noise or other signal anomalies.

When the power state machine is set to the on state, frequency calculators (330, 332, 334 and 336) estimate the frequency of the combined complex signals. The frequency calculators (330-336), utilize a differential detection algorithm to estimate the frequency with each of the four precise tone bands. The frequency calculators (330-336) estimate the phase variation of the input signal over a given time range. Advantageously, the accuracy of the estimation is substantially insensitive to the period over which the estimation is performed. Assuming a sinusoidal input x(n) of frequency $f_i$ the frequency calculator computes:

$$y(n) = x(n)x(n-1)^* e(-j2\Pi f_{mid})$$

where $f_{mid}$ is the mean of the frequencies within the given precise tone group and superscript* implies complex conjugation. Then, $$y(n) = e(j2\pi f_i n) e(-j2\pi f_i(n-1)) e(-j2\pi f_{mid})$$
$$= e(j2\pi(f_i - f_{mid}))$$

which is a constant, independent of n. The frequency calculators (330-336) then invoke an arctan function that takes two inputs and computes the angle of the above complex value that identifies the frequency present within precise tone band. In operation atan $2(\sin(2\Pi(f_i-f_{mid})), \cos(2\Pi(f_i-f_{mid})))$ returns to within a scaling factor the frequency difference $f_i-f_{mid}$. Those skilled in the art will appreciate that various algorithms, such as a frequency discriminator, could be use to estimate the frequency of the precise tone by calculating the phase variation of the input signal over a given time period.

The frequency calculators (330-336) compute the variance and mean over the entire 10 msec window of frequency estimates to identify valid precise tones in the presence of background noise or speech that resembles a precise tone. If the mean of the frequency estimates over the window is within acceptable limits, and the variance is within an acceptable threshold, a tone on flag is forwarded to the cadence processor. The frequency calculators (330-336) are preferably only invoked if the power state machine is in the on state thereby reducing the processor loading (i.e. fewer MIPS) when a precise tone signal is not present.

Figure 18:
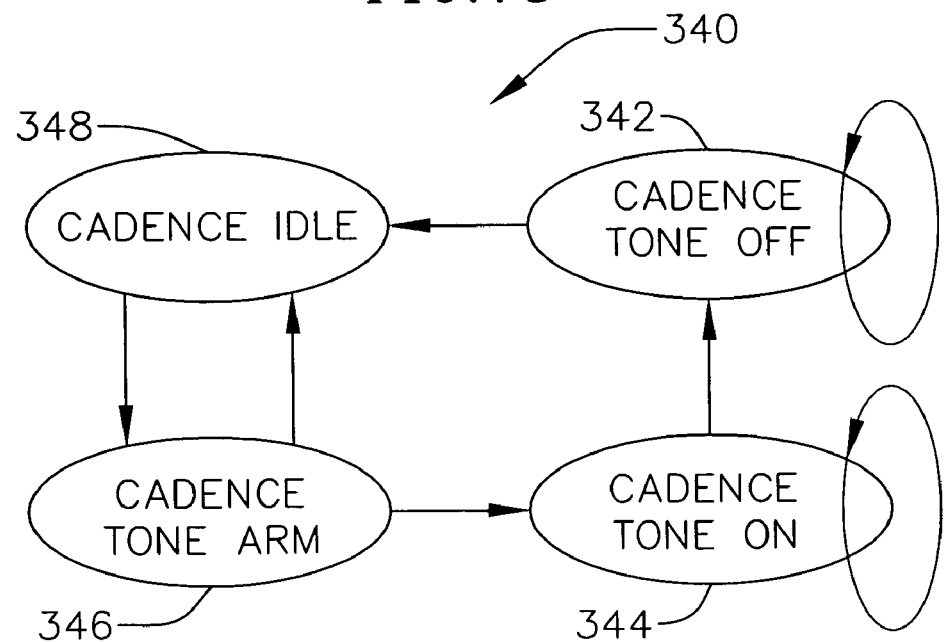
FIG. 18 is state machine diagram of a cadence state machine for monitoring the cadence (on/off times) of a precise tone in a voice signal in accordance with a preferred embodiment of the present invention.
Figure 18A:
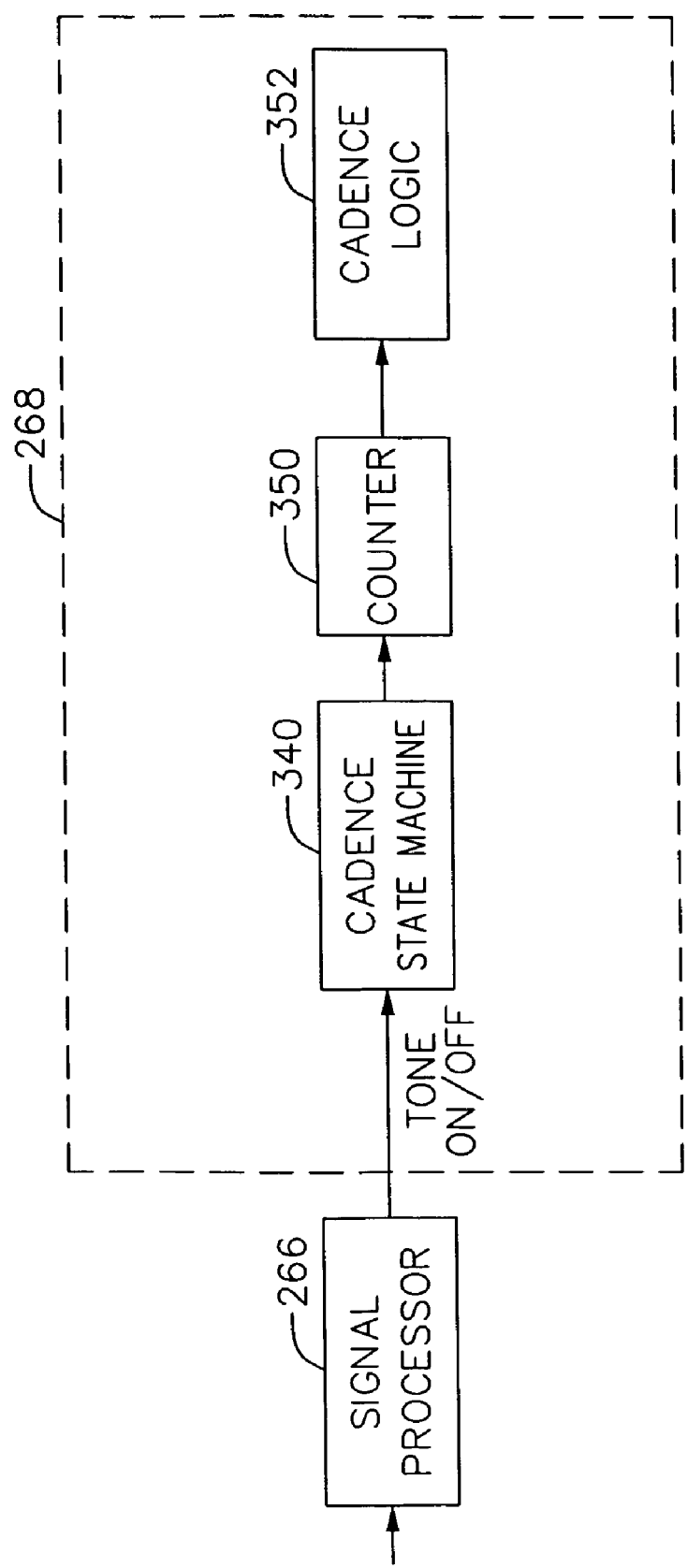
FIG. 18A is a block diagram of a cadence processor for detecting precise tones in accordance with a preferred embodiment of the present invention.

Referring to FIG. 18A, the signal processor 266 forwards a tone on/tone off indication to the cadence processor 268 which considers the time sequence of events to determine whether a precise tone is present. Referring to FIG. 18, in the described exemplary embodiment, the cadence processor 268 is preferably a four state, cadence state machine 340, including a cadence tone off state 342, a cadence tone on state 344, a cadence tone arm state 346 and an idle state 348. As is known in the art, the state of the cadence state machine 340 depends on the previous state and the new input. For example, if an incoming signal is initially silent, the signal processor would forward a tone off indication to the cadence state machine 340. The cadence state machine 340 would be set to a cadence tone off and disarmed state. If the signal processor next detects a valid tone, the signal processor forwards a tone on indication to the cadence state machine 340. The cadence state machine 340 switches to a cadence off but armed state. Referring to FIG. 18A, the cadence state machine 340 invokes a counter 350 that monitors the duration of the tone indication. If the next input is again a valid precise tone, the signal processor forwards a tone on indication to the cadence state machine 340. The cadence state machine 340 now toggles to the cadence tone on and cadence tone armed state. The cadence state machine 340 would remain in the cadence tone on state until receiving two consecutive tone off indications from the signal processor. The cadence state machine 340 sends a tone off indication to the counter 350. The counter 350, resets and forwards the duration of the on tone to cadence logic 352. The cadence processor 268 similarly estimates the duration of the off tone, which the cadence logic 352 utilizes to determine whether a particular tone is present by comparing the duration of the on tone, off tone signal pair at a given tone frequency to the tone plan recommended in industry standard.

12. Processor Resource Management

In a preferred embodiment of the present invention, a signal processing system is employed to interface telephony devices with packet based networks. The described preferred embodiment of the signal processing system may be implemented with a variety of technologies including, by way of example, embedded communications software that enables transmission of voice, fax and modem over packet based networks. The embedded communications software is preferably run on programmable digital signal processors (DSPs) and is used in gateways, cable modems, remote access servers, PBXs, and other packet based network appliances. The signal processing system is a real-time system, so that each service operating on a DSP along with it's associated PXDs should be optimized to minimize peak system resource requirements in terms of memory and/or computational complexity. The worst case system loading is simply the sum of the worst case (peak) loading of each service invoked by the network VHD and its associated PXDs.

However, the statistical nature of processor loading is such that it is extremely unlikely that the worst case processor loading for each PXD and/or service will occur simultaneously, so that system resources may be over subscribed (peak loading exceeds peak system resources). It would therefore be desirable to control the various voice mode PXDs and associated services to ensure that peak processing (or system resources) are managed effectively A processor resource manager can be used for this purpose. Although the resource manager is described in the context of a signal processing system with the packet voice exchange invoked, those skilled in the art will appreciate that the resource manager is likewise suitable for various other telephony and telecommunications applications. Accordingly, the described exemplary embodiment of the resource manager in a signal processing system is by way of example only and not by way of limitation.

The PXDs for the voice mode provide echo cancellation, gain, and automatic gain control. The network VHD invokes numerous services in the voice mode including call discrimination, packet voice exchange, and packet tone exchange. These network VHD services operate together to provide: (1) an encoder system with DTMF detection, voice activity detection, voice compression, and comfort noise estimation, and (2) a decoder system with delay compensation, voice decoding, DTMF generation, comfort noise generation and lost frame recovery. In addition, multiple network VHDs may be operating on a particular processor. For example, within a network gateway system there may be four (or more) network VHDs operating simultaneously. The transmission/signal processing of voice is inherently dynamic, so that the system resources required for various stages of a conversation are time varying. For example, when the near end talker is actively speaking, the voice encoder consumes significant resources, but the far end is probably silent so that the echo canceller is probably not adapting and may not be executing the transversal filter. When the far end is active, the near end is most likely inactive, which implies the echo canceller is both canceling far end echo and adapting. However, when the far end is active the near end is probably inactive, which implies that the VAD is probably detecting silence and the voice encoder consumes minimal system resources. Thus, it is unlikely that the voice encoder and echo canceller resource utilization peak simultaneously. Furthermore, if processors are taxed, echo canceller adaptation may be disabled if the echo canceller is adequately adapted or interleaved (adaptation enabled on alternating echo canceller blocks).

The described exemplary embodiment may reduce the complexity of certain voice mode service and associated PXDs so as to reduce the computational/memory requirements placed upon the system. Various modifications to the voice coders may be included to reduce the load placed upon the system resources. For example, the complexity of a G.723.1 voice coder may be reduced by disabling the post filter in accordance with the ITU-T G.723.1 standard. Also the voicing decision may be modified so as to be based on the open loop normalized pitch correlation. This entails a modification to the ITU-T G.723.1 C language routine Estim_Pitch( ). The voicing decision is based on the open loop normalized pitch correlation for the best pitch lag chosen in the Estim_Pitch( ) function. If d(n) is the input to the pitch estimation function, the normalized open loop pitch correlation at lag L is:

$$X(L) = \frac{\left(\sum_{n=0}^{N-1}(d(n)(dn-L))\right)^2}{\left(\sum_{n=o}^{N-1}d(n)\right)^2\left(\sum_{n=0}^{N-1}d(n-L)\right)^2}$$

where N is equal to a duration of 2 subframes (or 120 samples).

Also, an ability to bypass the adaptive codebook based on a threshold computed from a combination of the open loop voicing strength and speech/residual energy may be included. In the standard coder, the search through the adaptive codebook gain codebook begins at index zero and may be terminated before the entire codebook is searched (less than the total size of the adaptive codebook gain codebook which is either 85 or 170 entries) depending on the accumulation of potential error. A preferred complexity reduction truncates the adaptive codebook gain search procedure by searching entries from:

the upper bound (computed in the standard coder) less HALF the adaptive codebook size (or index zero, whichever is greater) for voiced speech; and from index zero up to half the size of the adaptive code gain codebook (85/2 or 170/2).

The voicing decision is considered to be voiced if the normalized pitch correlation is greater than one-half. The adaptive codebook may also be completely bypassed under some conditions by setting the adaptive codebook gain index to zero, which selects an all zero adaptive codebook gain setting.

The excitation in the standard encoder may have a voiced repetition. In the standard encoder, if the open loop pitch lag is less than the subframe length minus two, then a low level excitation search function (the function call Find_Best( ) in the ITU-T G.723.1 C language simulation) is invoked twice. To reduce system complexity, the excitation search procedure may be modified (at 6.3 kb/s) such that the lower level excitation search function is invoked once per invocation of the excitation search procedure (routine Find_Fcbk( )). If the open loop pitch period is less than the sub-frame length minus two then a periodic repetition is forced, otherwise there is no periodic repetition (as per the standard encoder for that range of open loop pitch periods). In the described complexity reduction modification, the decision on which manner to invoke it is based on the open loop pitch period and the voicing strength.

Similarly, the excitation search procedure can be modified (at 5.3 kb/s) such that a higher threshold is chosen for the low complexity version. In the standard coder, a threshold (variable named "threshold" in the ITU-T G.723.1) is set to 0.5. In a modification to reduce the complexity of this function, the threshold may be set to 0.75. This greatly reduces the complexity of the excitation search procedure while maintaining good voice quality.

Similar modifications may be made to reduce the complexity of a G.729 Annex A voice coder. For example, the complexity of a G.729 Annex A voice coder may be reduced by disabling the post filter in accordance with the G.729 Annex A standard. Also, the complexity of a G.729 Annex A voice coder may be further reduced by including the ability to bypass the adaptive codebook or reduce the complexity of the adaptive codebook search significantly. The adaptive codebook may be bypassed by using the open loop pitch lag. The adaptive codebook bypass simply chooses the minimum pitch period for the pitch lag. The complexity of the adaptive codebook search may be reduced by truncating the closed loop adaptive codebook search such that fractional pitch periods are not considered within the search (not searching the non-integer lags). These modifications are made to the ITU-T G.729 Annex A C language routine Pitch_fr3_fast( ). The complexity of a G.729 Annex A voice coder may be further reduced by substantially reducing the complexity of the excitation search. The search complexity may be reduced by bypassing the depth first search 4, phase A: track 3 and 0 search and the depth first search 4, phase B: track 1 and 2 search.

Each modification reduces the computational complexity but also minimally reduces the resultant voice quality. However, since the voice coders are externally managed by the system resource manager, the voice encoder should predominately operate in the "standard mode". The preferred embedded software embodiment should include the standard code as well as the modifications required to reduce the system complexity. The resource manager should preferably minimize power consumption and computational cycles by invoking complexity reductions which have substantially no impact on voice quality. The different complexity reductions schemes should be selected dynamically based on the processing requirements for the current frame (over all voice channels) and the statistics of the voice signals on each channel (speech level, voicing, etc).

Although complexity reductions are rare, the appropriate PXDs and associated services should preferably incorporate numerous functional features to accommodate such complexity reductions. For example, the appropriate voice mode PXDs and associated services should preferably include a main routine which executes the presumed functionality with a variety of complexity levels. For example, various complexity levels may be mandated by setting various complexity reduction flags. In addition, PXDs and service with fixed resource requirements (i.e. complexity is not controllable), should preferably be measured accurately for peak complexity and average complexity. Also, a function that returns the estimated complexity in cycles according to the desired complexity reduction level should preferably be included.

The described exemplary embodiment preferably includes four complexity reduction levels. In the first level all complexity reductions are disabled so that the complexity of the PXDs and services is not reduced. The second level provides minimal or transparent complexity reductions (reductions which should preferably have substantially no observable impact on performance under most conditions. In the transparent mode the voice coders (G.729, G.723.1) preferably use voluntary reductions and the echo canceller uses hearing bypass and toggles adaptation. Voluntary reductions for G.723.1 coder are preferably selected as follows. First, if the input frame energy is less than −55 dBm0, then the adaptive codebook is bypassed and the excitation searches are reduced, as per above. If the input frame energy is less than −45 dBm0 but greater than −55 dBm0, then the partial adaptive codebook is searched and the excitation searches are reduced as per above; In addition, if the open loop normalized pitch correlation is less than 0.305 then the adaptive codebook is partially searched. Otherwise, no complexity reductions are done. Similarly voluntary reductions for the G.729 coder preferably proceed as follows: first, if the input frame energy is less than −55 dBm0, then the adaptive codebook is bypassed and the excitation search is reduced per above. Next if the input frame energy is less than −45 dBm0 but greater than −55 dBm0, then the reduced complexity adaptive codebook is used and the excitation search complexity is reduced. Otherwise, no complexity reduction is used.

The third level provides minor complexity reductions (reductions which may result in a slight quality or performance degradation. For example, in the third level the voice coders preferably use voluntary reductions, "find_best" reduction (G.723.1), fixed codebook threshold change (5.3 kbps G.723.1), open loop pitch search reduction (G.723.1 only), and minimal adaptive codebook reduction (G.729 and G.723.1). In addition, the echo canceller uses hearing bypass and toggles adaptation. In the fourth level major complexity reductions occur that is reductions which should noticeably effect the performance quality. For example, in the fourth level of complexity reductions the voice coders use the same complexity reductions as those used for level three reductions, as well as adding a bypass adaptive codebook reduction (G.729 and G.723.1). In addition. the echo canceller uses hearing bypass and disables adaptation completely. The processor resource manager preferably limits the invocation of fourth level major reductions to extreme circumstances, such as, for example when there is double talk on all active channels.

The described exemplary resource manager monitors system resource utilization. Under normal system operating conditions, complexity reductions are not mandated on the echo canceller or voice compression engines. Voice/FAX and data traffic is packetized and transferred in packets. The echo canceller removes echos, the DTMF detector detects the presence of keypad signals, the voice activity detector detects the presence of voice, and the voice encoders compress the voice traffic into packets. However, when system resources are overtaxed and complexity reductions are required there are at least two methods for controlling the voice coder. In the first method, the complexity level for the current frame is estimated from the information contained within previous speech coding frames and from the information gained from the echo canceller on the current frame of data. The resource manager then mandates complexity reductions for the processing of frames in the current frame interval in accordance with these estimations.

Alternatively, the voice coders may be divided into a "front end" and a "back end". The front end performs voice activity detection and open loop pitch detection (in the case of G.723.1 and G.729 Annex A). Subsequent to the execution of the front end function for all channels of a particular voice coder, the system complexity may be estimated based on the known information. Complexity reductions may then be mandated to ensure that the current processing cycle can satisfy the processing requirements of the voice encoders and decoders. This alternative method is preferred because the state of the voice activity detector is known whereas in the previously described method the state of the voice activity detector (VAD) is estimated.

In the alternate method once the front end processing is complete so that the state of the VAD and the voicing state for all channels is known, the system complexity may be estimated based on the known statistics for the current frame. In the first method, the state of the VAD and the voicing state may be estimated based on available known information. For example, the echo canceller processes an incoming encoder system input signal to remove line echos prior to the activation of the voice encoder. In addition, the echo canceller may estimate the state of the VAD based on the power level of a reference signal and an voice encoder input signal so that the complexity level of all controllable PXDs and services may be updated to determine the estimated complexity level of each assuming no complexity reductions have been invoked. If the sum of all the various complexity estimates is less than the complexity budget, no complexity reductions are required. Otherwise, the complexity level of all system components are estimated assuming the invocation of the transparent complexity reduction method to determine the estimated complexity resources required for the current processing frame. If the sum of the complexity estimates with transparent complexity reductions in place is less than the complexity budget, then the transparent complexity reduction is used for that frame. In a similar manner, more and more severe complexity reduction is considered until it fits within the prescribed budget.

The operating system should preferably allow processing to exceed the real-time constraint, i.e. maximum processing capability for the underlying DSP, in the short term. Thus data that should normally be processed within a given time frame may be buffered and processed in the next sequence. However, the overall complexity or processor loading must remain (on average) within the real-time constraint. This is a tradeoff between delay/jitter and channel density. Since packets may be delayed (due to processing overruns) overall end to end delay may increase slightly to account for the processing jitter.

Referring to FIG. 7, a preferred echo canceller has been modified to include an echo canceller bypass switch that invokes an echo suppressor in lieu of echo cancellation under certain system conditions so as to reduce processor loading. In addition, in the described exemplary embodiment the resource manager may instruct the adaptation logic 136 to disable filter adapter 134 so as to reduce processor loading under real-time constraints. The system will preferably limit adaptation on a fair and equitable basis when processing overruns occur. For example, if four echo cancellers are adapting when a processing over run occurs, the resource manager may disable the adaption of echo cancellers one and two. If the processing over run continues, the resource manger should preferably enable adaption of echo cancellers one and two, and reduce system complexity by disabling the adaptation of echo cancellers three and four. This limitation should preferably be adjusted such that channels which are fully adapted have adaptation disabled first. In the described exemplary embodiment, the operating systems should preferably control the subfunctions to limit peak system complexity. The subfunctions should be co-operative and include modifications to the echo canceller and the speech encoders.

B. The Fax Relay Mode

Figure 19:
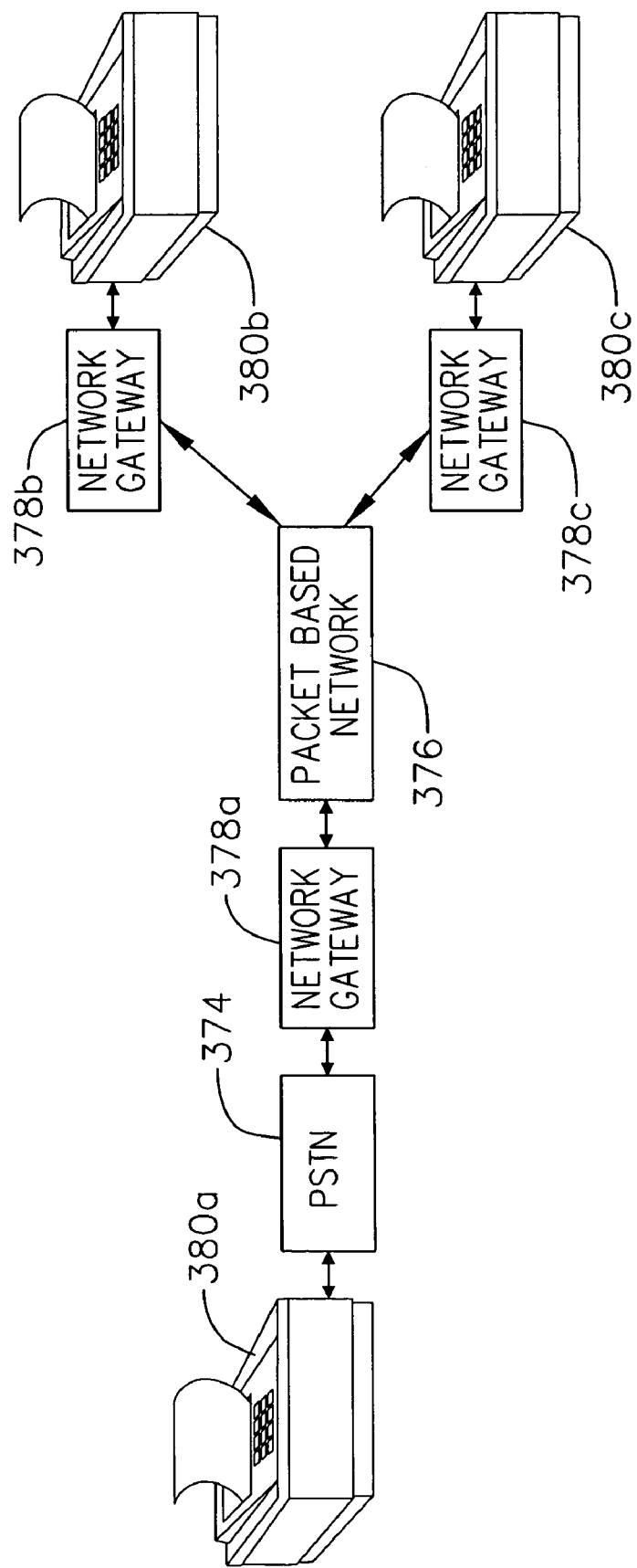
FIG. 19 is a block diagram of several signal processing systems in the fax relay mode for interfacing between a switched circuit network and a packet based network in accordance with a preferred embodiment of the present invention.

Fax relay mode provides signal processing of fax signals. As shown in FIG. 19, fax relay mode enables the transmission of fax signals over a packet based system such as VoIP, VoFR, FRF-11, VTOA, or any other proprietary network. The fax relay mode should also permit data signals to be carried over traditional media such as TDM. Network gateways 378*a*, 378*b*, 378*c*, the operating platform for the signal processing system in the described exemplary embodiment, support the exchange of fax signals between a packet based network 376 and various fax machines 380*a*, 380*b*, 380*c*. For the purposes of explanation, the first fax machine is a sending fax 380*a*. The sending fax 380*a* is connected to the sending network gateway 378*a* through a PSTN line 130. The sending network gateway 378*a* is connected to a packet based network 376. Additional fax machines 380*b*, 380*c* are at the other end of the packet based network 376 and include receiving fax machines 380*b*, 380*c* and receiving network gateways 378*b*, 378*c*. The receiving network gateways 378*b*, 378*b* provide a direct interface between their respective fax machines 380*b*, 380*c* and the packet based network 376.

The transfer of fax data signals over packet based networks can be accomplished by three alternative methods. In the first method, fax data signals are exchanged in real time. Typically, the sending and receiving fax machines are spoofed to allow transmission delays plus jitter of up to about 1.2 seconds. The second, store and forward mode, is a non real time method of transferring fax data signals. Typically, the fax communication is transacted locally, stored into memory and transmitted to the destination fax machine at a subsequent time. The third mode is a combination of store and forward mode with minimal spoofing to provide an approximate emulation of a typical fax connection.

In the fax relay mode, the network VHD invokes the packet fax data exchange in the fax relay mode. The packet fax data exchange provides demodulation and re-modulation of fax data signals. This approach results in considerable bandwidth savings since only the underlying unmodulated data signals are transmitted across the packet based network. The packet fax data exchange also provides compensation for network jitter with a jitter buffer similar to that invoked in the packet voice exchange. Additionally, the packet fax data exchange compensates for lost data packets with error correction processing. Spoofing may also be provided during various stages of the procedure between the fax machines to keep the connection alive.

The packet fax data exchange is divided into two basic functional units, a demodulation system and a re-modulation system. In the demodulation system, the network VHD exchanges fax data signals from a circuit switched network, or a fax machine, to the packet based network. In the re-modulation system, the network VHD exchanges fax data signals from the packet network to the switched circuit network to a circuit switched network, or a fax machine directly.

Figure 20:
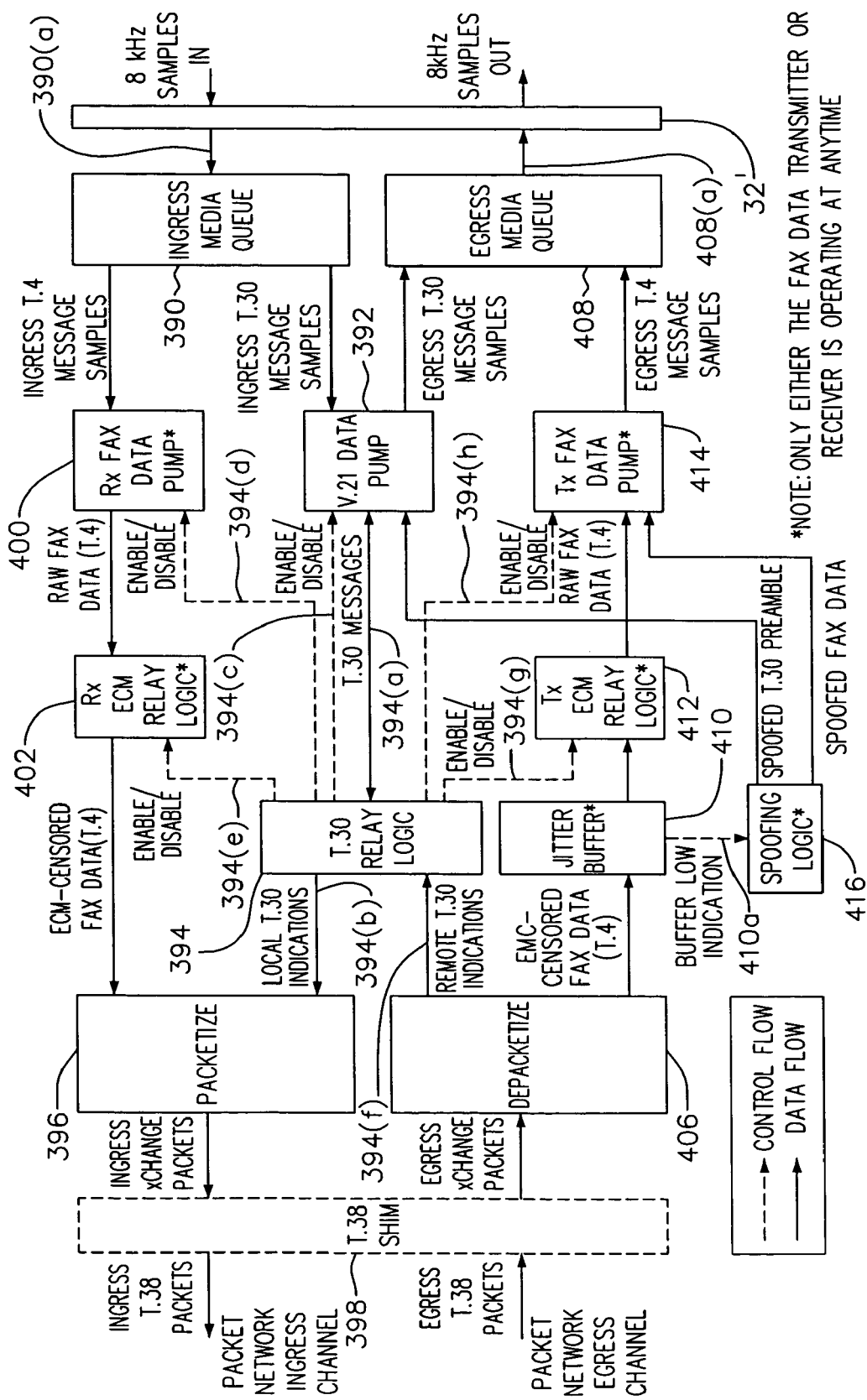
FIG. 20 is a system block diagram of a signal processing system operating in a real time fax relay mode in accordance with a preferred embodiment of the present invention.

During real time relay of fax data signals over a packet based network, the sending and receiving fax machines are spoofed to accommodate network delays plus jitter. Typically, the packet fax data exchange can accommodate a total delay of up to about 1.2 seconds. Preferably, the packet fax data exchange supports error correction mode (ECM) relay functionality, although a full ECM implementation is typically not required. In addition, the packet fax data exchange should preferably preserve the typical call duration required for a fax session over a GSTN/ISDN when exchanging fax data signals over a network The packet fax data exchange for the real time exchange of fax data signals between a circuit switched network and a packet based network is shown schematically in FIG. 20. In this exemplary embodiment, a connecting PXD (not shown) connecting the fax machine to the switch board 32' is transparent, although those skilled in the art will appreciate that various signal conditioning algorithms could be programmed into PXD such as echo cancellation and gain.

After the PXD (not shown), the incoming fax data signal 390a is coupled to the demodulation system of the packet fax data exchange operating in the network VHD via the switchboard 32'. The incoming fax data signal 390a is received and buffered in an ingress media queue 390. A V.21 data pump 392 demodulates incoming T.30 message so that T.30 relay logic 394 can decode the received T.30 messages 394a. Local T.30 indications 394b are packetized by a packetization engine 396 and if required, translated into T.38 packets via a T.38 shim 398 for transmission to a T.38 compliant remote network gateway (not shown) across the packet based network. The V.21 data pump 392 is selectively enabled/disabled 394c by the T.30 relay logic 394 in accordance with the reception/transmission of the T.30 messages or fax data signals. The V.21 data pump 392 is common to the demodulation and re-modulation system, and the packet fax data exchange includes the ability to transmit called station tone (CED) and calling station tone (CNG) to support fax setup.

The demodulation system further includes a receive fax data pump 400 which demodulates the fax data signals during the data transfer phase. The receive fax data pump 400 supports the V.27ter standard for fax data signal transfer at 2400/4800 bps, the V.29 standard for fax data signal transfer at 7200/9600 bps, as well as the V.17 standard for fax data signal transfer at 7200/9600/12000/14400 bps. The V.34 fax standard, once approved, may also be supported. The T.30 relay logic 394 enables/disables 394d the receive fax data pump 400 in accordance with the reception of the fax data signals or the T.30 messages.

If error correction mode (ECM) is required, receive ECM relay logic 402 performs high level data link control (HDLC) de-framing, including bit de-stuffing and preamble removal on ECM frames contained in the data packets. The resulting fax data signals are then packetized by the packetization engine 396 and communicated across the packet based network. The T.30 relay logic 394 selectively enable/disables 394e the receive ECM relay logic 402 in accordance with the error correction mode of operation.

In the re-modulation system, if required, incoming data packets are first translated from a T.38 packet format to a protocol independent format by the T.38 packet shim 398. The data packets are then de-packetized by a depacketizing engine 406. The data packets may contain T.30 messages or fax data signals. The T.30 relay logic 394 reformats the remote T.30 indications 394f and forwards the resulting T.30 indications to the local fax machine (not shown) via the V.21 data pump 392. The modulated output of the V.21 data pump 392 is forwarded to an egress media queue 408 for transmission in either analog format or after suitable conversion, as 64 kbps PCM samples to the local fax device over a circuit switched network, such as for example a PSTN line.

De-packetized fax data signals are transferred from the depacketizing engine 406 to a jitter buffer 410. If error correction mode (ECM) is required, transmitting ECM relay logic 412 performs HDLC de-framing, including bit stuffing and preamble addition on ECM frames. The transmitting ECM relay logic 412 forwards the fax data signals, (in the appropriate format) to a transmit fax data pump 414 which modulates the fax data signals and outputs 8 KHz digital samples to the egress media queue 408. The T.30 relay logic selectively enables/disables (394g) the transmit ECM relay logic 412 in accordance with the error correction mode of operation.

The transmit fax data pump 414 supports the V.27ter standard for fax data signal transfer at 2400/4800 bps, the V.29 standard for fax data signal transfer at 7200/9600 bps, as well as the V.17 standard for fax data signal transfer at 7200/9600/12000/14400 bps. The T.30 relay logic selectively enables/disables (394h) the transmit fax data pump 414 in accordance with the transmission of the fax data signals or the T.30 message samples.

If the jitter buffer 410 underflows, a buffer low indication 410a is coupled to spoofing logic 416. Upon receipt of a buffer low indication during the fax data signal transmission, the spoofing logic 416 inserts "spoofed data" at the appropriate place in the fax data signals via the transmit fax data pump 414 until the jitter buffer 410 is filled to a pre-determined level, at which time the fax data signals are transferred out of the jitter buffer 410. Similarly, during the transmission of the T.30 message indications, the spoofing logic 416 can insert "spoofed data" at the appropriate place in the T.30 message samples via the V.21 data pump 392.

1. Data Rate Management

An exemplary embodiment of the packet fax data exchange complies with the T.38 recommendations for real-time Group 3 facsimile communication over IP networks. In accordance with the T.38 standard, the preferred system should therefore, provide packet fax data exchange support at both the T.30 level (see ITU Recommendation T.30—"Procedures for Document Facsimile Transmission in the General Switched Telephone Network", 1988) and the T4 level (see ITU Recommendation T.4—"Standardization of Group 3 Facsimile Apparatus For Document Transmission", 1998), the contents of each of these ITU recommendations being incorporated herein by reference as if set forth in full. One function of the packet fax data exchange is to relay the set up (capabilities) parameters in a timely fashion. Spoofing may be needed at either or both the T.30 and T.4 levels to maintain the fax session while set up parameters are negotiated at each of the network gateways and relayed in the presence of network delays and jitters.

In accordance with the industry T.38 recommendations for real time Group 3 communication over Internet Protocol (IP) networks, the described exemplary embodiment relays all information including; T.30 preamble indications (flags), T.30 message data, as well as T.30 image data between the network gateways. The T.30 relay logic 394 in the sending and receiving network gateways then negotiate parameters as if connected via a PSTN line. The T.30 relay logic 394 interfaces with the V.21 data pump 392 and the transmit and receive data pumps 400 and 414 as well as the packetization engine 396 and the depacketizing engine 406 to ensure that the sending and the receiving fax machines 130 and 380 successfully and reliably communicate. The T.30 relay logic 394 provides local spoofing, using command repeats (CRP), and automatic repeat request (ARQ) mechanisms, incorporated into the T.30 protocol, to handle delays associated with the packet based network. In addition, the T.30 relay logic 394 intercepts control messages to ensure compatibility of the rate negotiation between the near end and far end machines including HDLC processing, as well as lost packet recovery according to the T.30 ECM standard.

Figure 21:
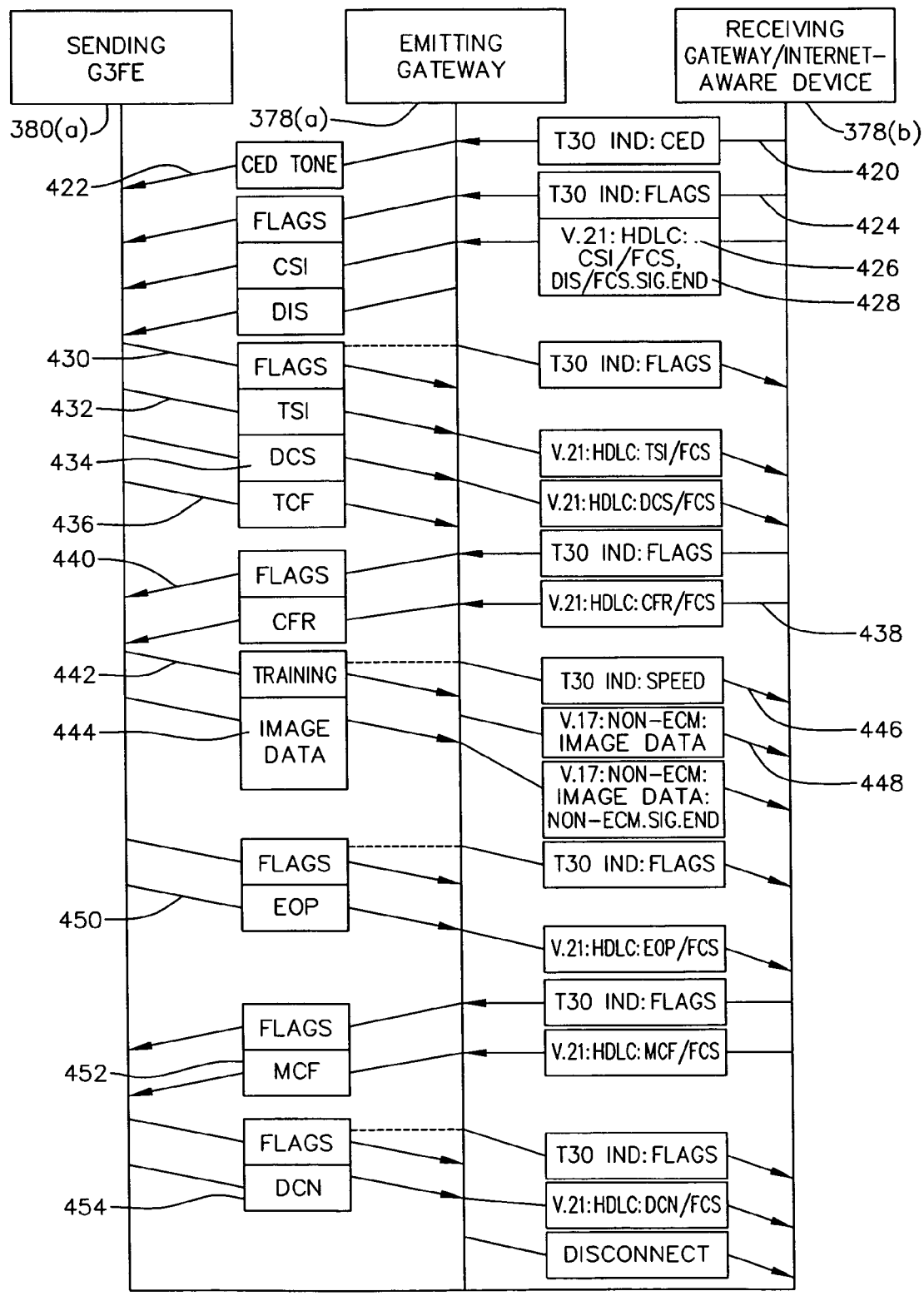
FIG. 21 is a diagram of the message flow for a fax relay in non error control mode in accordance with a preferred embodiment of the present invention.

FIG. 21 demonstrates message flow over a packet based network between a sending fax machine 380a (see FIG. 19) and the receiving fax device 380b (see FIG. 19) in non-ECM mode. The sending fax machine dials the sending network gateway 378a(see FIG. 19) which forwards calling tone (CNG) (not shown) to the receiving network gateway 378b (see FIG. 19). The receiving network gateway responds by alerting the receiving fax machine. The receiving fax machine answers the call and sends called station (CED) tones 420. The CED tones are detected by the V.21 data pump 392 of the receiving network gateway which issues an event 422 indicating the receipt of CED which is then relayed to the emitting network gateway. In addition, the V.21 data pump of the receiving network gateway invokes the packet fax data exchange.

The receiving network gateway now transmits T.30 preamble (HDLC flags) 424 followed by called subscriber identification (CSI) 426 and digital identification signals (DSI) 428. The emitting network gateway, receives a command 430 to begin transmitting CED. Upon receipt of CSI and DSI, the emitting network gateway begins sending subscriber identification (TSI) 432, digital command signal (DCS) 434 followed by training check (TCF) 436. The TCF 436 can be managed by one of two methods. The first method, referred to as the data rate management method one in T.38, generates TCF locally by the receiving gateway. CFR is returned to the sending fax machine 380(*a*), when the emitting network gateway receives a confirmation to receive (CFR) 438 from the receiving fax machine via the receiving network gateway, and the TCF training 436 from the sending fax machine is received successfully. In the event that the receiving fax machine receives a CFR and the TCF training 436 from the sending fax machine subsequently fails, then DCS 434 from the sending fax machine is again relayed to the receiving fax machine. The TCF training 436 is repeated until an appropriate rate is established which provides successful TCF training 436 at both ends of the network.

In a second method to synchronize the data rate, referred to as the data rate management method 2 in the T.38 standard, the TCF data sequence received by the emitting network gateway are forwarded from the sending fax machine to the receiving fax machine via the receiving network gateway. The sending and receiving fax machines and then perform speed selection as if connected via a regular PSTN.

Upon receipt of confirmation to receive (CFR) 440, the sending fax machine, transmits image data 444 along with its training preamble 442. The emitting network gateway receives the image data and forwards the image data 444 to the receiving network gateway. The receiving network gateway then sends its own training preamble 446 followed by the image data 448 to the receiving fax machine.

After each image page end of page (EOP), an EOP 450 and message confirmation (MCF) 452 messages are relayed between the sending and receiving fax machines. At the end of the final page, the receiving fax machine sends a message confirmation (MCF) 452, which prompts the sending fax machine to transmit a disconnect (DCN) signal 454. The call is then terminated at both ends of the network.

ECM fax relay message flow is similar to that described above. All preambles, messages and phase C HDLC data are relayed through the packet based network. Phase C HDLC data is de-stuffed and, along with the preamble and frame checking sequences (FCS), removed before being relayed so that only fax image data itself is relayed over the packet based network. The receiving network gateway performs bit stuffing and reinserts the preamble and FCS.

2. Spoofing Techniques

Spoofing refers to the process by which a facsimile transmission is maintained in the presence of packet under-run due to severe network jitter or delay. An exemplary embodiment of the packet fax data exchange complies with the T.38 recommendations for real-time Group 3 facsimile communication over IP networks. In accordance with the T.38 recommendations, a local and remote T.30 fax device communicate across a packet based network via signal processing systems, which for the purposes of explanation are operating in network gateways. In operation, each fax device establishes a facsimile connection with its respective network gateway in accordance with the ITU-T.30 standards and the signal processing systems operating in the network gateways relay data signals across a packet based network.

Figure 22:
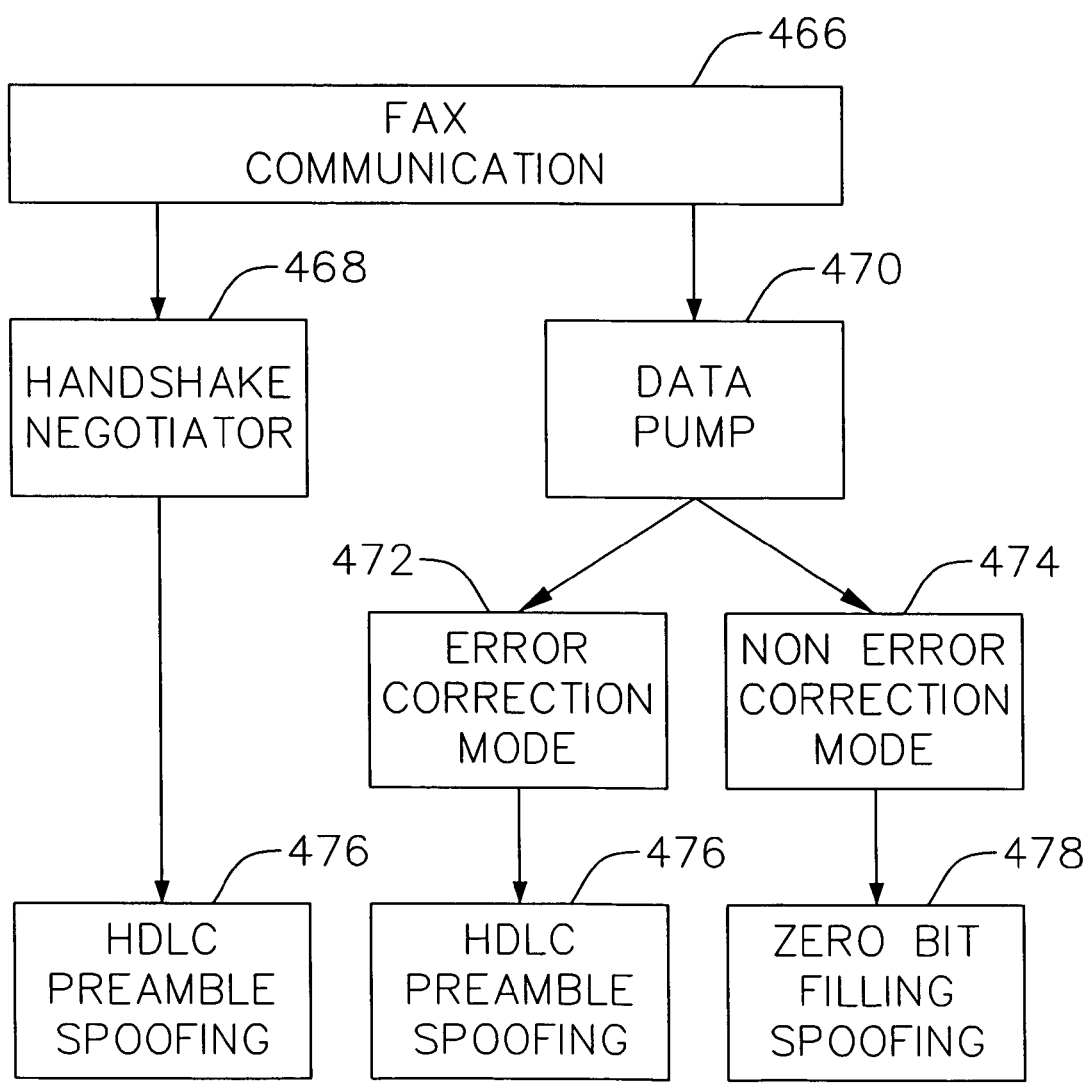
FIG. 22 is a flow diagram of a method for fax mode spoofing in accordance with a preferred embodiment of the present invention.

In accordance with the T.30 protocol, there are certain time constraints on the handshaking and image data transmission for the facsimile connection between the T.30 fax device and its respective network gateway. The problem that arises is that the T.30 facsimile protocol is not designed to accommodate the significant jitter and packet delay that is common to communications across packet based networks. To prevent termination of the fax connection due to severe network jitter or delay, it is, therefore, desirable to ensure that both T.30 fax devices can be spoofed during periods of data packet under-run. FIG. 22 demonstrates fax communication 466 under the T.30 protocol, wherein a handshake negotiator 468, typically a low speed modem such as V.21, performs handshake negotiation and fax image data is communicated via a high speed data pump 470 such as V.27, V.29 or V.17. In addition, fax image data can be transmitted in an error correction mode (ECM) 472 or non error correction mode (non-ECM) 474, each of which uses a different data format.

In the described exemplary embodiment, HDLC preamble 476 is used to spoof the T.30 fax devices during V.21 handshaking and during transmission of fax image data in the error correction mode. However, zero-bit filling 478 is used to spoof the T.30 fax devices during fax image data transfer in the non error correction mode. Although fax relay spoofing is described in the context of a signal processing system with the packet data fax exchange invoked, those skilled in the art will appreciate that the fax relay spoofing is likewise suitable for various other telephony and telecommunications application. Accordingly, the described exemplary embodiment of fax relay spoofing in a signal processing system is by way of example only and not by way of limitation.

a. V.21 HDLC Preamble Spoofing

In the described exemplary embodiment, spoofing techniques are utilized at the T.30 and T.4 levels to manage extended network delays and jitter. Turning back to FIG. 20, the T.30 relay logic 394 waits for a response to any transmitted message or command before continuing to the next state or phase. The T.30 relay logic 394 packages each message or command into a HDLC frame which includes preamble flags. An HDLC frame structure is utilized for all binary-coded V.21 facsimile control procedures. The basic HDLC structure consists of a number of frames, each of which is subdivided into a number of fields. The HDLC frame structure provides for frame labeling and error checking. When a new facsimile transmission is initiated, HDLC preamble in the form of synchronization sequences are transmitted prior to the binary coded information. The HDLC preamble is V.21 modulated bit streams of "01111110 (0x7e)".

In accordance with an exemplary spoofing technique, the sending and receiving network gateways 378a, 378b (See FIG. 19) spoof their respective fax machines 380a, 380b by locally transmitting HDLC preamble flags if a response to a transmitted message is not received from the packet based network within approximately 1.8 seconds. In addition, the maximum length of the preamble is limited to about four seconds. If a response from the packet based network arrives before the spoofing time out, each network gateway should preferably transmit a response message to its respective fax machine following the preamble flags. Otherwise, if the network response to a transmitted message is not received prior to the spoofing time out (about 5.8 seconds), the response is assumed to be lost. In this case, when the network gateway times out and terminates preamble spoofing, the local fax device transmits the message command again. Each network gateway repeats the spoofing technique until a successful handshake is completed or its respective fax machine disconnects b. ECM HDLC Preamble Spoofing The packet fax data exchange utilizes an HDLC frame structure for ECM high-speed data transmission. Preferably, the frame image data is divided by one or more HDLC preamble flags. If the network under-runs due to jitter or packet delay, the network gateways spoof their respective fax devices at the T.4 level by adding extra HDLC flags between frames. This spoofing technique increases the sending time to compensate for packet under-run due to network jitter and delay. Returning to FIG. 20 if the jitter buffer 410 underflows, a buffer low indication 410a is coupled to the spoofing logic 416. Upon receipt of a buffer low indication during the fax data signal transmission, the spoofing logic 416 inserts HDLC preamble flags at the frame boundary via the transmit fax data pump 414. When the jitter buffer 410 is filled to a pre-determined level, the fax image data is transferred out of the jitter buffer 410.

In the described exemplary embodiment, the jitter buffer 410 must be sized to store at least one HDLC frame so that a frame boundary may be located. The length of the largest T.4 ECM HDLC frame is 260 octets or 130 16-bit words. Again, spoofing is activated when the number of packets stored in the jitter buffer 410 drops to a predetermined threshold level. When spoofing is required, the spoofing logic 416 adds HDLC flags at the frame boundary as a complete frame is being reassembled and forwarded to the transmit fax data pump 414. This continues until the number of data packets in the jitter buffer 410 exceeds the threshold level. The maximum time the network gateways will spoof their respective local fax devices is about ten seconds.

c. Non-ECM Spoofing with Zero Bit Filling

T.4 spoofing handles delay impairments during phase C signal reception. For those systems that do not utilize ECM, phase C signals comprise a series of coded image data followed by fill bits and end-of-line (EOL) sequences. Typically, fill bits are zeros inserted between the fax data signals and the EOL sequences, "000000000001". Fill bits ensure that a fax machine has time to perform the various mechanical overhead functions associated with any line it receives. Fill bits can also be utilized to spoof the jitter buffer to ensure compliance with the minimum transmission time of the total coded scan line established in the pre-message V.21 control procedure. The number of the bits of coded image contained in the data signals associated with the scan line and transmission speed limit the number of fill bits that can be added to the data signals. Preferably, the maximum transmission of any coded scan line is limited to less than about 5 sec. Thus, if the coded image for a given scan line contains 1000 bits and the transmission rate is 2400 bps, then the maximum duration of fill time is (5−(1000+12)/2400)=4.57 sec.

Generally, the packet fax data exchange utilizes spoofing if the network jitter delay exceeds the delay capability of the jitter buffer 410. In accordance with the EOL spoofing method, fill bits can only be inserted immediately before an EOL sequence, so that by necessity, the jitter buffer 410 must store at least one EOL sequence. Thus the jitter buffer 410 must be sized to hold at least one entire scan line of data to ensure the presence of at least one EOL sequence within the jitter buffer 410. Thus, depending upon transmission rate, the size of the jitter buffer 410 can become prohibitively large. The table below summarizes the required jitter buffer data space to perform EOL spoofing for various scan line lengths. The table assumes that each pixel is represented by a single bit. The values represent an approximate upper limit on the required data space, but not the absolute upper limit, because in theory at least, the longest scan line can consist of alternating black and white pixels which would require an average of 4.5 bits to represent each pixel rather than the one to one ratio summarized in the table.

| Scan Line Length | Number of words | sec to print out at 2400 | sec to print out at 4800 | sec to print out at 9600 | sec to print out at 14400 |
|---|---|---|---|---|---|
| 1728 | 108 | 0.72 | 0.36 | 0.18 | 0.12 |
| 2048 | 128 | 0.853 | 0.427 | 0.213 | 0.14 |
| 2432 | 152 | 1.01 | 0.507 | 0.253 | 0.17 |
| 3456 | 216 | 1.44 | 0.72 | 0.36 | 0.24 |
| 4096 | 256 | 2 | 0.853 | 0.43 | 0.28 |
| 4864 | 304 | 2.375 | 1.013 | 0.51 | 0.34 |

To ensure the jitter buffer 410 stores an EOL sequence the spoofing logic 416 is activated when the number of data packets stored in the jitter buffer 410 drops to a threshold level. Typically, a threshold value of about 200 msec is used to support the most commonly used fax setting, namely a fax speed of 9600 bps and scan line length of 1728. An alternate spoofing method should be used if an EOL sequence is not contained within the jitter buffer 410, otherwise the call will have to be terminated. An alternate spoofing method uses zero run length code words. This method requires real time image data decoding so that the word boundary is known. Advantageously, this alternate method reduces the required size of the jitter buffer 410.

Simply increasing the storage capacity of the jitter buffer 410 can minimize the need for spoofing. However, overall network delay increases when the size of the jitter buffer 410 is increased. This delay may complicate the T.30 negotiation at the end of page or end of document, because of susceptibility to time out. Such a situation arises when the sending fax machine completes the transmission of high speed data, and switches to an HDLC phase and sends the first V.21 packet in phase D. The sending fax machine must be kept alive until the response to the V.21 data packet is received. The receiving fax device requires more time to flush a large jitter buffer and then respond, hence complicating the T.30 negotiation.

In addition, the length of time a fax machine can be spoofed is limited, so that the jitter buffer 410 can not be arbitrarily large. A pipelined store and forward relay is a combination of store and forward and spoofing techniques to approximate the performance of a typical Group 3 fax connection when the network delay is large (on the order of seconds or more). One approach is to store and forward a single page at a time. However, this approach requires a significant amount of memory (10 Kwords or more). One approach to reduce the amount of memory required entails discarding scan lines on the sending network gateway and performing line repetition on the receiving network gateway so as to maintain image aspect ratio and quality. Alternatively, a partial page can be stored and forwarded thereby reducing the required amount of memory.

The sending and receiving fax machines will have some minimal differences in clock frequency. ITU standards recommends a data pump data rate of ±100 ppm, so that the clock frequencies between the receiving and sending fax machines could differ by up to 200 ppm. Therefore, the data rate at the receiving network gateway (jitter buffer 410) can build up or deplete at a rate of 1 word for every 5000 words received. Typically a fax page is less than 1000 words so that end to end clock synchronization is not required.

C. Data Relay Mode

Figure 23:
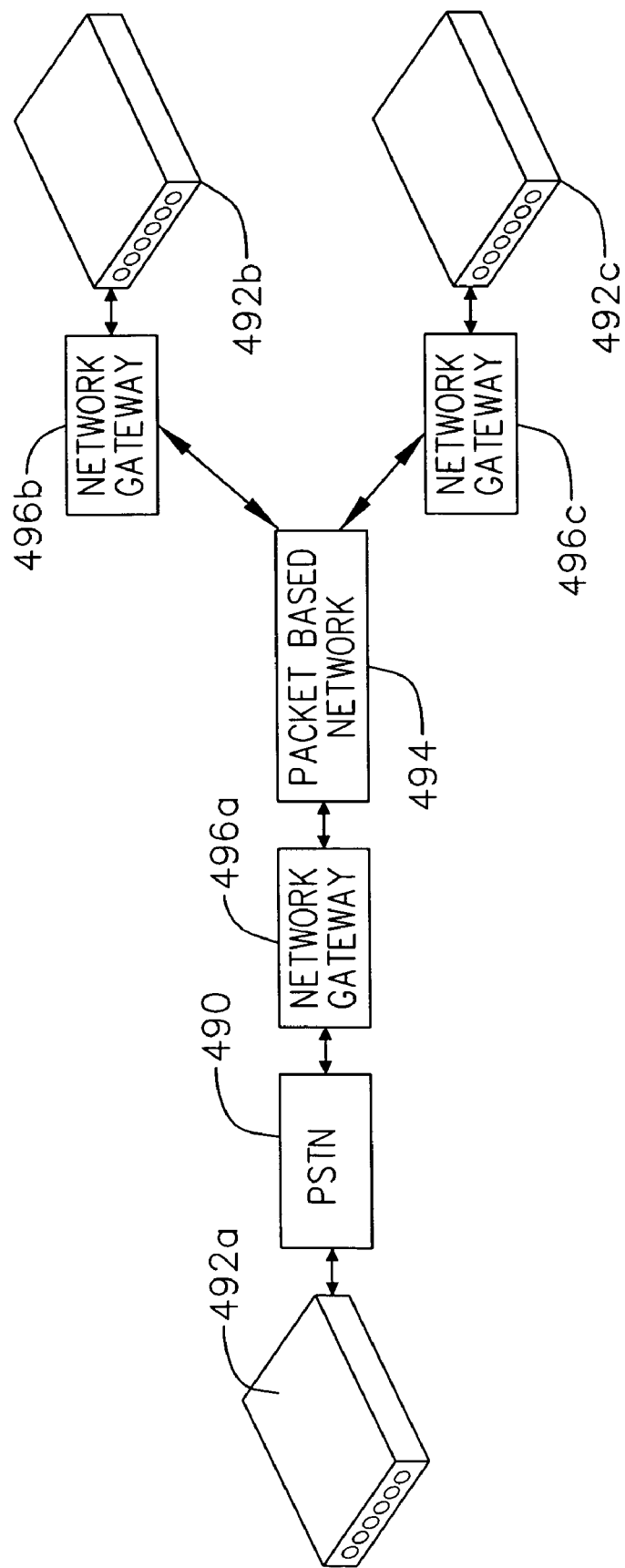
FIG. 23 is a block diagram of several signal processing systems in the modem relay mode for interfacing between a switched circuit network and a packet based network in accordance with a preferred embodiment of the present invention.

Data relay mode provides full duplex signal processing of data signals. As shown in FIG. 23, data relay mode enables the transmission of data signals over a packet based system such as VoIP, VoFR, FRF-11, VTOA, or any other proprietary network. The data relay mode should also permit data signals to be carried over traditional media such as TDM. Network gateways 496a, 496b, 496c, support the exchange of data signals between a packet based network 494 and various data modems 492a, 492b, 492c. For the purposes of explanation, the first modem is referred to as a call modem 492a. The call modem 492a is connected to the call network gateway 496a through a PSTN line. The call network gateway 496a is connected to a packet based network 494. Additional modems 492b, 492c are at the other end of the packet based network 494 and include answer modems 492b, 492c and answer network gateways 496b, 496c. The answer network gateways 496b, 496c provide a direct interface between their respective modems 492b, 492c and the packet based network 494.

In data relay mode, a local modem connection is established on each end of the packet based network 494. That is, the call modem 492a and the call network gateway 496a establish a local modem connection, as does the destination answer modem 492b and its respective answer network gateway 496b. Next, data signals are relayed across the packet based network 494. The call network gateway 496a demodulates the data signal and formats the demodulated data signal for the particular packet based network 494. The answer network gateway 496b compensates for network impairments and remodulates the encoded data in a format suitable for the destination answer modem 492b. This approach results in considerable bandwidth savings since only the underlying demodulated data signals are transmitted across the packet based network.

In the data relay mode, the packet data modem exchange provides demodulation and modulation of data signals. With full duplex capability, both modulation and demodulation of data signals can be performed simultaneously. The packet data modem exchange also provides compensation for network jitter with a jitter buffer similar to that invoked in the packet voice exchange. Additionally, the packet data modem exchange compensates for system clock jitter between modems with a dynamic phase adjustment and resampling mechanism. Spoofing may also be provided during various stages of the call negotiation procedure between the modems to keep the connection alive.

Figure 24:
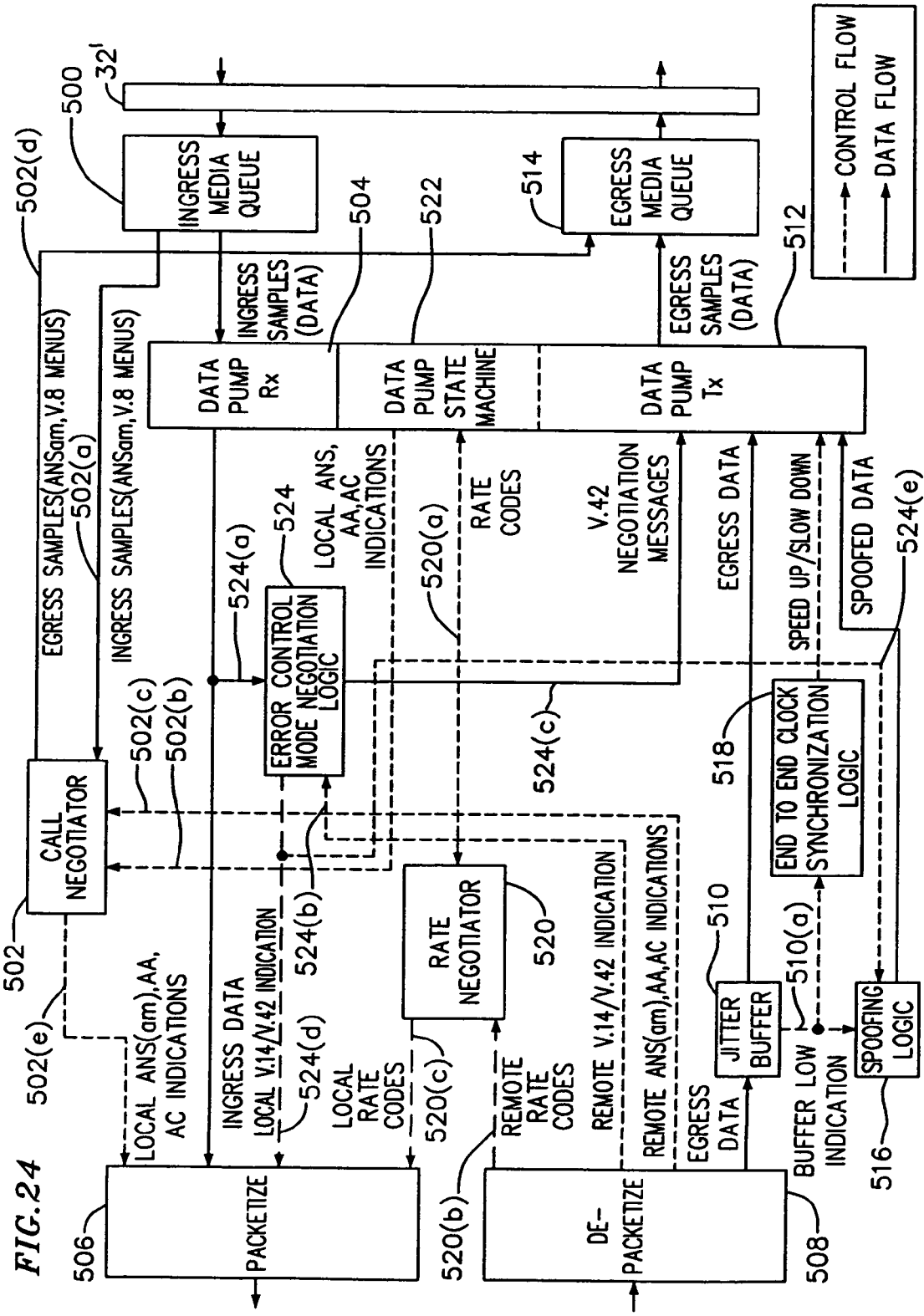
FIG. 24 is a system block diagram of a signal processing system operating in a modem relay mode in accordance with a preferred embodiment of the present invention.

The packet data modem exchange invoked by the network VHD in the data relay mode is shown schematically in FIG. 24. In the described exemplary embodiment, a connecting PXD (not shown) connecting a modem to the switch board 32' is transparent, although those skilled in the art will appreciate that various signal conditioning algorithms could be programmed into the PXD such as filtering, echo cancellation and gain.

After the PXD, the data signals are coupled to the network VHD via the switchboard 32'. The packet data modem exchange provides two way communication between a circuit switched network and packet based network with two basic functional units, a demodulation system and a remodulation system. In the demodulation system, the network VHD exchanges data signals from a circuit switched network, or a telephony device directly, to a packet based network. In the remodulation system, the network VHD exchanges data signals from the packet based network to the PSTN line, or the telephony device.

In the demodulation system, the data signals are received and buffered in an ingress media queue 500. A data pump receiver 504 demodulates the data signals from the ingress media queue 500. The data pump receiver 504 supports the V.22bis standard for the demodulation of data signals at 1200/2400 bps; the V.32bis standard for the demodulation of data signals at 4800/7200/9600/12000/14400 bps, as well as the V.34 standard for the demodulation of data signals up to 33600 bps. Moreover, the V.90 standard may also be supported. The demodulated data signals are then packetized by the packetization engine 506 and transmitted across the packet based network.

In the remodulation system, packets of data signals from the packet based network are first depacketized by a depacketizing engine 508 and stored in a jitter buffer 510. A data pump transmitter 512 modulates the buffered data signals with a voiceband carrier. The modulated data signals are in turn stored in the egress media queue 514 before being output to the PXD (not shown) via the switchboard 32'. The data pump transmitter 512 supports the V.22bis standard for the transfer of data signals at 1200/2400 bps; the V.32bis standard for the transfer of data signals at 4800/7200/9600/12000/14400 bps, as well as the V.34 standard for the transfer of data signal up to 33600 bps. Moreover, the V.90 standard may also be supported.

During jitter buffer underflow, the jitter buffer 510 sends a buffer low indication 510a to spoofing logic 516. When the spoofing logic 516 receives the buffer low signal indicating that the jitter buffer 510 is operating below a predetermined threshold level, it inserts spoofed data at the appropriate place in the data signal via the data pump transmitter 512. Spoofing continues until the jitter buffer 510 is filled to the predetermined threshold level, at which time data signals are again transferred from the jitter buffer 510 to the data pump transmitter 512.

End to end clock logic 518 also monitors the state of the jitter buffer 510. The clock logic 518 controls the data transmission rate of the data pump transmitter 512 in correspondence to the state of the jitter buffer 510. When the jitter buffer 510 is below a predetermined threshold level, the clock logic 518 reduces the transmission rate of the data pump transmitter 512. Likewise, when the jitter buffer 510 is above a predetermined threshold level, the clock logic 518 increases the transmission rate of the data pump transmitter 512.

Before the transmission of data signals across the packet based network, the connection between the two modems must first be negotiated through a handshaking sequence. This entails a two-step process. First, a call negotiator 502 determines the type of modem (i.e., V.22, V.32bis, V.34, V.90, etc.) connected to each end of the packet based network. Second, a rate negotiator 520 negotiates the data signal transmission rate between the two modems.

The call negotiator 502 determines the type of modem connected locally, as well as the type of modem connected remotely via the packet based network. The call negotiator 502 utilizes V.25 automatic answering procedures and V.8 auto-baud software to automatically detect modem capability. The call negotiator 502 receives protocol indication signals 502a (ANSam and V.8 menus) from the ingress media queue 500, as well as AA, AC and other message indications 502b from the local modem via a data pump state machine 522, to determine the type of modem in use locally. The call negotiator 502 relays the ANSam answer tones and other indications 502e from the data pump state machine 522 to the remote modem via a packetization engine 506. The call negotiator also receives ANSam, AA, AC and other indications 502c from a remote modem (not shown) located on the opposite end of the packet based network via a depacketizing engine 508. The call negotiator 502 relays ANSam answer tones and other indications 502d to a local modem (not shown) via an egress media queue 514 of the modulation system. With the ANSam, AA, AC and other indications from the local and remote modems, the call negotiator 502 can then determine the particular standard (i.e., V.22, V.32bis, V.34, V.90, etc.) in which the data pumps must communicate with the local modem and the remote modem. For example, the call negotiator 502 may determine that the data pump receiver 504 must receive data signals from the local modem via the ingress media queue 500 using one standard and transmit data signals across the packet based network via the packetizing engine 506 using a different standard. In this case, the data pump transmitter 512 would also have to operate in a similar function using the one standard to communicate with the local modem via the egress media queue 514 and the other standard to communicate with the remote modem across the packet base network via the packetizing engine 508.

The packet data modem exchange preferably utilizes indication packets as a means for communicating answer tones, AA, AC and other indication signals across the packet based network However, the packet data modem exchange supports data pumps such as V.22bis and V.32bis which do not include a well defined error recovery mechanism, so that the modem connection may be terminated whenever indication packets are lost. Therefore, either the packet data modem exchange or the application layer should ensure proper delivery of indication packets when operating in a network environment that does not guarantee packet delivery.

The packet data modem exchange can ensure delivery of the indication packets by periodically retransmitting the indication packet until some expected packets are received. For example, in V.32bis relay, the call negotiator operating under the packet data modem exchange on the answer network gateway periodically retransmits ANSam answer tones from the answer modem to the call modem, until the calling modem connects to the line and transmits carrier state AA.

Alternatively, the packetization engine can embed the indication information directly into the packet header. In this approach, the indication information is included in all packets transmitted across the packet based network, so that the system does not rely on the successful transmission of individual indication packets. Rather, if a given packet is lost, the next arriving packet contains the indication information in the packet header. Both methods increase the traffic across the network. However, it is preferable to periodically retransmit the indication packets because it has less of a detrimental impact on network traffic.

A rate negotiator 520 synchronizes the connection rates at the network gateways 496a, 496b, 496c (see FIG. 23). The rate negotiator receives rate control codes 520a from the local modem via the data pump state machine 522 and rate control codes 520b from the remote modem via the depacketizing engine 508. The rate negotiator 520 also forwards the remote rate control codes 520a received from the remote modem to the local modem via commands sent to the data pump state machine 522. The rate negotiator 520 forwards the local rate control codes 520c received from the local modem to the remote modem via the packetization engine 506. Based on the exchanged rate codes the rate negotiator 520 establishes a common data rate between the calling and answering modems. During the data rate exchange procedure, the jitter buffer 510 should be disabled by the rate negotiator 520 to prevent data transmission between the call and answer modems until the data rates are successfully negotiated.

Error control (V.42) and data compression (V.42bis) modes should be synchronized at each end of the packet based network. Error control logic 524 processes local error control messages 524a from the data pump receiver 504 in addition to remote V.14/V.42 indications 524b from the depacketizing engine 508 to ensure that the network gateways utilize a common error protocol. In addition, error control logic 524 forwards V.14/V.42 negotiation messages 524c from the depacketization engine 508 to the local modem via the data pump transmitter 512. The error control logic 524 also forwards V.14/V.42 indications 524d from the local modem to the remote modem via the packetization engine 506.

V.42 is a standard error correction technique using advanced cyclical redundancy checks and the principle of automatic repeat requests (ARQ). In accordance with the V.42 standard, transmitted data signals are grouped into blocks and cyclical redundancy calculations add error checking words to the transmitted data signal stream. The receiving modem calculates new error check information for the data signal block and compares the calculated information to the received error check information. If the codes match, the received data signals are valid and another transfer takes place. If the codes do not match, a transmission error has occurred and the receiving modem requests a repeat of the last data block. This repeat cycle continues until the entire data block has been received without error.

Various voiceband data modem standards exist for error correction and data compression. V.42bis and MNP5 are examples of data compression standards. The handshaking sequence for every modem standard is different so that the packet data modem exchange should support numerous data transmission standards as well as numerous error correction and data compression techniques.

1. End to End Clock Logic

Slight differences in the clock frequency of the call modem and the answer modem are expected, since the baud rate tolerance for a typical modem data pump is ±100 ppm. This tolerance corresponds to a relatively low depletion or build up rate of 1 in 5000 words. However, the length of a modem session can be very long, so that uncorrected difference in clock frequency can result in jitter buffer underflow or overflow.

In the described exemplary embodiment, the clock logic synchronizes the transmit clock of the data pump transmitter 512 to the average rate at which data packets arrive at the jitter buffer 510. The data pump transmitter 512 packages the data signals from the jitter buffer 510 in frames of data signals for demodulation and transmission to the egress media queue 514. At the beginning of each frame of data signals, the data pump transmitter 512 examines the egress media queue 514 to determine the remaining buffer space, and in accordance therewith, the data pump transmitter 512 modulates that number of digital data signal samples required to produce a total of slightly more or slightly less than 80 samples per frame, assuming that the data pump transmitter 512 is invoked once every 10 msec. The data pump transmitter 512 gradually adjusts the number of samples per frame to allow the receiving modem to adjust to the timing change. Typically, the data pump transmitter 512 uses an adjustment rate of about one ppm per frame. The maximum adjustment should be less than about 200 ppm.

In the described exemplary embodiment, end to end clock logic 518 monitors the space available within the jitter buffer 510 and utilizes water marks to determine whether the data rate of the data pump transmitter 512 should be adjusted. Network jitter may cause timing adjustments to be made. However, this should not adversely affect the data pump receiver of the answering modem as these timing adjustments are made very gradually.

2. Modem Connection Handshaking Sequence a. Call Negotiation

A single industry standard for the transmission of modem data over a packet based network does not exist. However, numerous common standards exist for transmission of modem data at various data rates over the PSTN. For example, V.22 is a common standard used to define operation of 1200 bps modems. Data rates as high as 2400 bps can be implemented with the V.22bis standard (the suffix "bis" indicates that the standard is an adaptation of an existing standard). The V.22bis standard groups data signals into four bit words which are transmitted at 600 baud. The V.32 standard supports full duplex, data rates of up to 9600 bps over the PSTN. A V.32 modem groups data signals into four bit words and transmits at 2400 baud. The V.32bis standard supports duplex modems operating at data rates up to 14,400 bps on the PSTN. In addition, the V.34 standard supports data rates up to 33,600 bps on the general switched telephone network. In the described exemplary embodiment, these standards can be used for data signal transmission over the packet based network with a call negotiator that supports each standard.

b. Rate Negotiation

Rate negotiation refers to the process by which two telephony devices are connected at the same data rate prior to data transmission. In the context of a modem connection in accordance with an exemplary embodiment of the present invention, each modem is coupled to a signal processing system, which for the purposes of explanation is operating in a network gateway, either directly or through a PSTN line. In operation, each modem establishes a modem connection with its respective network gateway, at which point, the modems begin relaying data signals across a packet based network. The problem that arises is that each modem may negotiate a different data rate with its respective network gateway, depending on the line conditions and user settings. In this instance, the data signals transmitted from one of the modems will enter the packet based network faster than it can be extracted at the other end by the other modem. The resulting overflow of data signals may result in a lost connection between the two modems. To prevent data signal overflow, it is, therefore, desirable to ensure that both modems negotiate to the same data rate. A rate negotiator can be used for this purpose. Although the rate negotiator is described in the context of a signal processing system with the packet data modem exchange invoked, those skilled in the art will appreciate that the rate negotiator is likewise suitable for various other telephony and telecommunications application. Accordingly, the described exemplary embodiment of the rate negotiator in a signal processing system is by way of example only and not by way of limitation.

In an exemplary embodiment, data rate negotiation is achieved through a data rate negotiation procedure, wherein a call modem independently negotiates a data rate with a call network gateway, and an answer modem independently negotiates a data rate with an answer network gateway. The calling and. answer network gateways, each having a signal processing system running a packet exchange, then exchange data packets containing information on the independently negotiated data rates. If the independently negotiated data rates are the same, then each rate negotiator will enable its respective network gateway and data transmission between the call and answer modems will commence. Conversely, if the independently negotiated data rates are different, the rate negotiator will renegotiate the data rate by adopting the lowest of the two data rates. The call and answer modems will then undergo retraining or rate renegotiation procedures by their respective network gateways to establish a new connection at the renegotiated data rate. The advantage of this approach is that the data rate negotiation procedure takes advantage of existing modem functionality, namely, the retraining and rate renegotiation mechanism, and puts it to alternative usage. Moreover, by retraining both the call and answer modem (one modem will already be set to the renegotiated rate) both modems are automatically prevented from sending data.

Alternatively, the calling and answer modems can directly negotiate the data rate. This method is not preferred for modems with time constrained handshaking sequences such as, for example, modems operating in accordance with the V.22bis or the V.32bis standards. The round trip delay accommodated by these standards could cause the modem connection to be lost due to timeout. Instead, retrain or rate renegotiation should be used for data signals transferred in accordance with the V.22bis and V.32bis standards, whereas direct negotiation of the data rate by the local and remote modems can be used for data exchange in accordance with the V.34 and V.90 (a digital modem and analog modem pair for use on PSTN lines at data rates up to 56,000 bps downstream and 33,600 upstream) standards.

c. Exemplary Handshaking Sequences (V.22 Handshaking Sequence)

The call negotiator, operating under the packet data modem exchange on the answer network gateway, differentiates between modem types and relays the ANSam answer tone. The answer modem transmits unscrambled binary ones signal (USB1) indications to the answer mode gateway. The answer network gateway forwards USB1 signal indications to the call network gateway. The call negotiator in the call network gateway assumes operation in accordance with the V.22bis standard as a result of the USB1 signal indication and terminates the call negotiator. The packet data modem exchange, in the answer network gateway then invokes operation in accordance with the V.22bis standard after an answer tone timeout period and terminates its call negotiator 502.

V.22bis handshaking does not utilize rate messages or signaling to indicate the selected bit rate as with most high data rate pumps. Rather, the inclusion of a fixed duration signal (S1) indicates that 2400 bps operation is to be used. The absence of the S1 signal indicates that 1200 bps should be selected. The duration of the S1 signal is typically about 100 msec, making it likely that the call modem will perform rate determination (assuming that it selects 2400 bps) before rate indication from the answer modem arrives. Therefore, the rate negotiator in the call network gateway should select 2400 bps operation and proceed with the handshaking procedure. If the answer modem is limited to a 1200 bps connection, rate renegotiation is typically used to change the operational data rate of the call modem to 1200 bps. Alternatively, if the call modem selects 1200 bps, rate renegotiation would not be required.

(V.32bis Handshaking Sequence)

Figure 25:
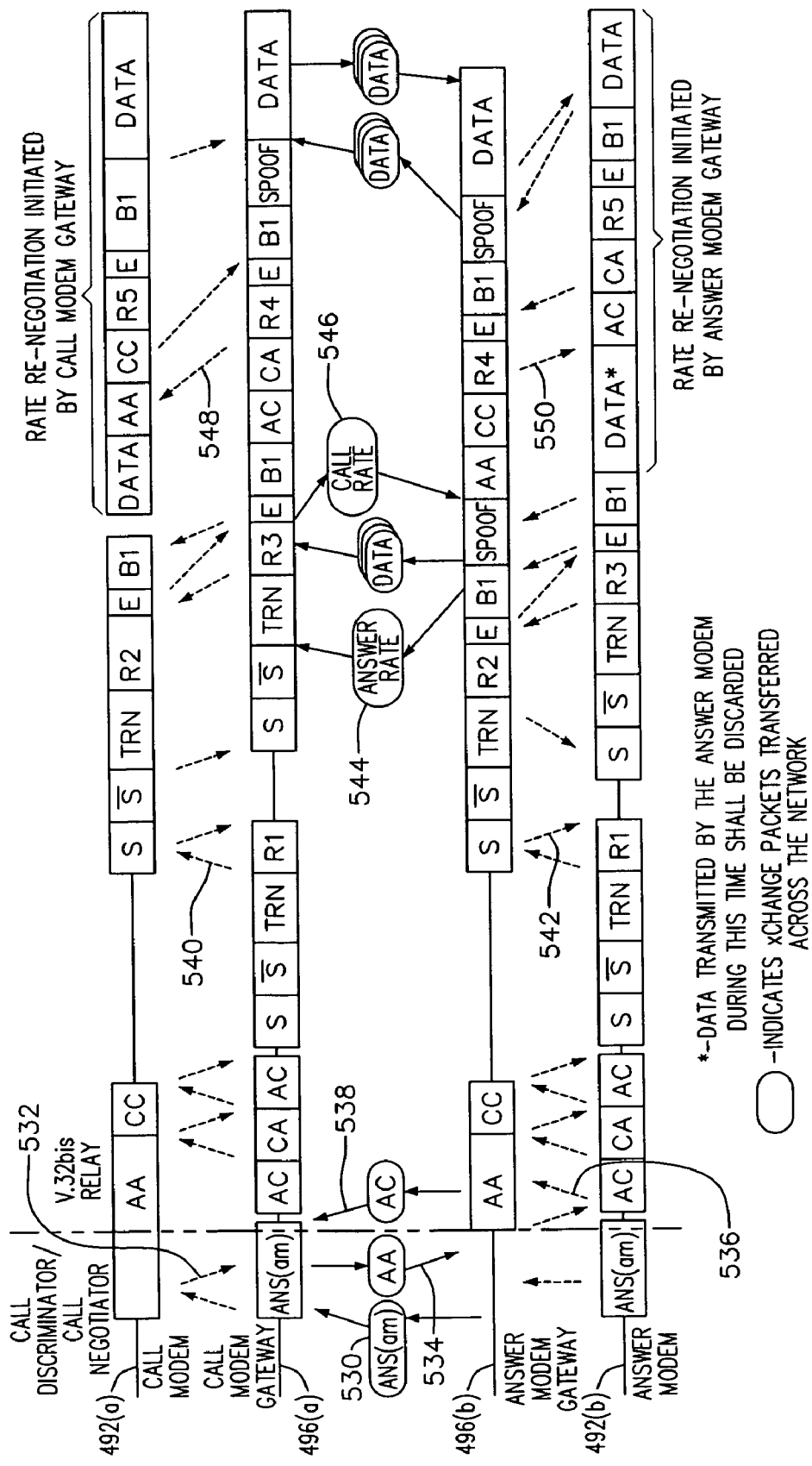
FIG. 25 is a diagram of a relay sequence for V.32bis rate synchronization using rate re-negotiation in accordance with a preferred embodiment of the present invention.

V32bis handshaking utilizes rate signals (messages) to specify the bit rate. A relay sequence in accordance with the V.32bis standard is shown in FIG. 25 and begins with the call negotiator in the answer network gateway relaying ANSam 530 answer tone from the answer modem to the call modem. After receiving the answer tone for a period of at least one second, the call modem connects to the line and repetitively transmits carrier state A 532. When the call network gateway detects the repeated transmission of carrier state A ("AA"), the call network gateway relays this information 534 to the answer network gateway. In response the answer network gateway forwards the AA indication to the answer modem and invokes operation in accordance with the V.32bis standard. The answer modem then transmits alternating carrier states A and C 536 to the answer network gateway. If answer network gateway receives AC from the answer modem, the answer network gateway relays AC 538 to the call network gateway, thereby establishing operation in accordance with the V.32bis standard, allowing call negotiator in the call network gateway to be terminated. Next, data rate alignment is achieved by either of two methods.

In the first method for data rate alignment of a V.32bis relay connection, the call modem and the answer modem independently negotiate a data rate with their respective network gateways at each end of the network 540 and 542. Next, each network gateway forwards a connection data rate indication 544 and 546 to the other network gateway. Each network gateway compares the far end data rate to its own data rate. The preferred rate is the minimum of the two rates. Rate renegotiation 548 and 550 is invoked if the connection rate of either network gateway to its respective modem differs from the preferred rate.

Figure 26:
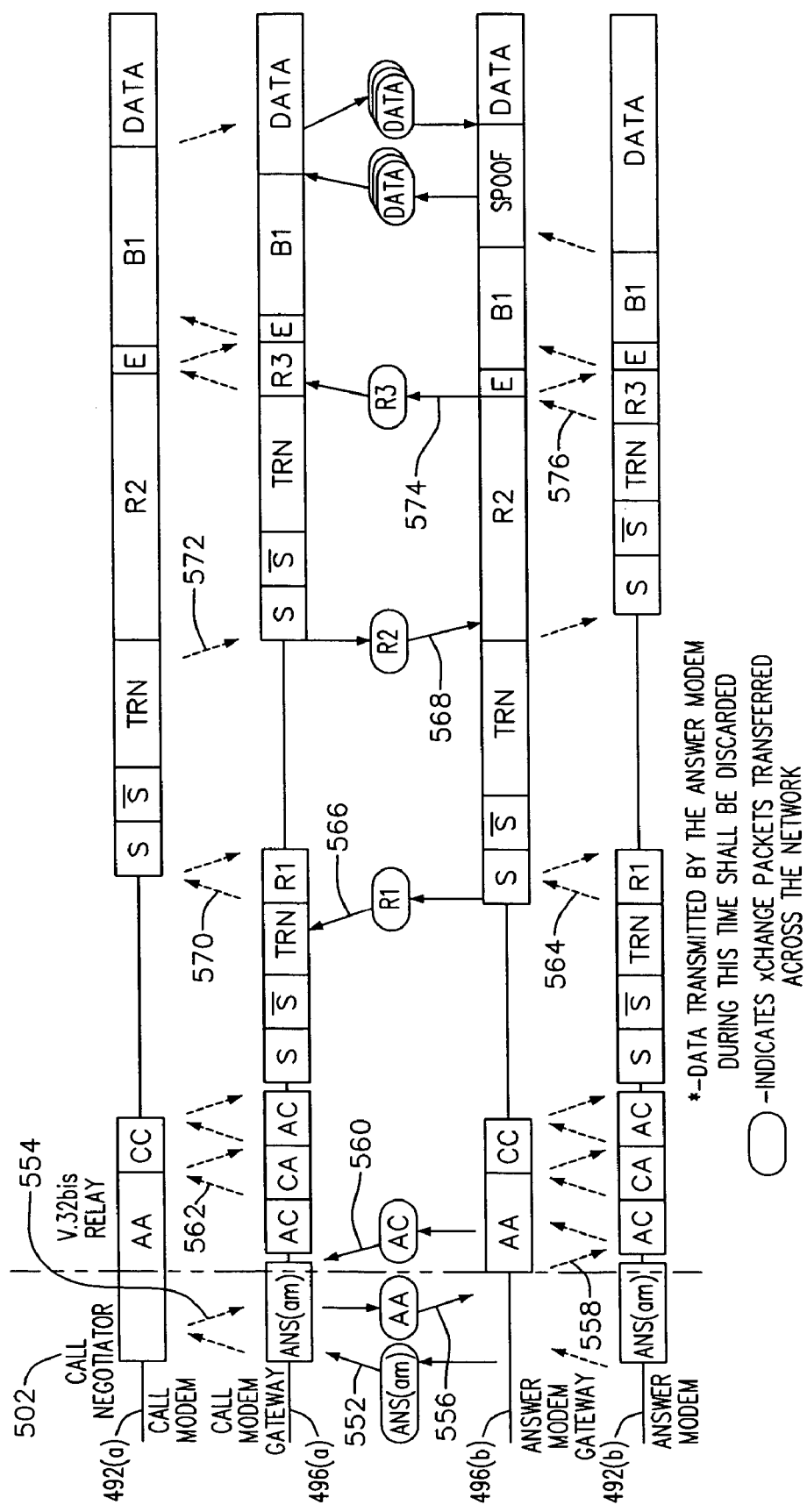
FIG. 26 is a diagram of an alternate relay sequence for V.32bis rate synchronization whereby rate signals are used to align the connection rates at the two ends of the network without rate re-negotiation in accordance with a preferred embodiment of the present invention.

In the second method, rate signals R1, R2 and R3, are relayed to achieve data rate negotiation. FIG. 26 shows a relay sequence in accordance with the V.32bis standard for this alternate method of rate negotiation. The call negotiator relays the answer tone (ANSam) 552 from the answer modem to the call modem. When the call modem detects answer tone, it repetitively transmits carrier state A 554 to the call network gateway. The call network gateway relays this information (AA) 556 to the answer network gateway. The answer network gateway sends the AA 558 to the answer modem and initiates normal range tone exchange with the answer modem. The answer network gateway then forwards AC 560 to call network gateway which in turn relays this information 562 to the call modem to initiate normal range tone exchange between the call network gateway and the call modem.

The answer modem sends its first training sequence 564 followed by R1 (the data rates currently available in the answer modem) to the rate negotiator in the answer network gateway. When the answer network gateway receives an R1 indication, it forwards R1 566 to the call network gateway. The answer network gateway then repetitively sends training sequences to the answer modem. The call network gateway forwards the R1 indication 570 of the answer modem to the call modem. The call modem sends training sequences to call network gateway 572. The call network gateway determines the data rate capability of the call modem, and forwards the data rate capabilities of the call modem to the answer network gateway in a data rate signal format. The call modem also sends an R2 indication 568 (data rate capability of the call modem, preferably excluding rates not included in the previously received R1 signal, i.e. not supported by the answer modem) to the call network gateway which forwards it to the answer network gateway. The call network gateway then repetitively sends training sequences to the call modem until receiving an R3 signal 574 from the answer modem via the answer network gateway.

The answer network gateway performs a logical AND operation on the R1 signal from the answer modem (data rate capability of the answer modem), the R2 signal from the call modem (data rate capability of the call modem, excluding rates not supported by the answer modem) and the training sequences of the call network gateway (data rate capability of the call modem) to create a second rate signal R2 576, which is forwarded to the answer modem. The answer modem sends its second training sequence followed an R3 signal, which indicates the data rate to be used by both modems. The answer network gateway relays R3 574 to the call network gateway which forwards it to the call modem and begins operating at the R3 specified bit rate. However, this method of rate synchronization is not preferred for V.32bis due to time constrained handshaking.

(V.34 Handshaking Sequence)

Data transmission in accordance with the V.34 standard utilizes a modulation parameter (MP) sequence to exchange information pertaining to data rate capability. The MP sequences can be exchanged end to end to achieve data rate synchronization. Initially, the call negotiator in the answer network gateway relays the answer tone (ANSam) from the answer modem to the call modem. When the call modem receives answer tone, it generates a CM indication and forwards it to the call network gateway. When the call network gateway receives a CM indication, it forwards it to the answer network gateway which then communicates the CM indication with the answer modem. The answer modem then responds by transmitting a JM sequence to the answer network gateway, which is relayed by the answer network gateway to the call modem via the call network gateway. If the call network gateway then receives a CJ sequence from the call modem, the call negotiator in the call network gateway, initiates operation in accordance with the V.34 standard, and forwards a CJ sequence to the answer network gateway. If the JM menu calls for V.34, the call negotiator in the answer network gateway initiates operation in accordance with the V.34 standard and the call negotiator is terminated. If a standard other than V.34 is called for, the appropriate procedure is invoked, such as those described previously for V.22 or V.32bis.

After a V.34 relay connection is established, the call modem and the answer modem freely negotiate a data rate at each end of the network with their respective network gateways. Each network gateway forwards a connection rate indication to the other gateway. Each gateway compares the far end bit rate to the rate transmitted by each gateway. For example, the call network gateway compares the data rate indication received from the answer modem gateway to that which it negotiated freely negotiated to with the call modem. The preferred rate is the minimum of the two rates. Rate renegotiation is invoked if the connection rate at the calling or receiving end differs from the preferred rate, to force the connection to the desired rate.

In an alternate method for V.34 rate synchronization, MP sequences are utilized to achieve rate synchronization without rate renegotiation. The call modem and the answer modem independently negotiate with the call network gateway and the answer network gateway respectively until phase IV of the negotiations is reached. The call network gateway and the answer network gateway exchange training results in the form of MP sequences when Phase IV of the independent negotiations is reached to establish the primary and auxiliary data rates. However, the call network gateway and the answer network gateway are prevented from relaying MP sequences to the call modem and the answer modem respectively until the training results for both network gateways and the MP sequences for both modems are available. If symmetric rate is enforced, the maximum answer data rate and the maximum call data rate of the four MP sequences are compared. The lower data rate of the two maximum rates is the preferred data rate. Each network gateway sends the MP sequence with the preferred rate to its respective modem so that the calling and answer modems operate at the preferred data rate.

If asymmetric rates are supported, then the preferred call-answer data rate is the lesser of the two highest call-answer rates of the four MP sequences. Similarly, the preferred answer-call data rate is the lesser of the two highest answer-call rates of the four MP sequences. Data rate capabilities may also need to be modified when the MP sequence are formed so as to be sent to the calling and answer modems. The MP sequence sent to the calling and answer modems, is the logical AND of the data rate capabilities from the four MP sequences.

(V.90 Handshaking Sequence)

The V.90 standard utilizes a digital and analog modem pair to transmit modem data over the PSTN line. The V.90 standard utilizes MP sequences to convey training results from a digital to an analog modem, and a similar sequence, using constellation parameters (CP) to convey training results from an analog to a digital modem. Under the V.90 standard, the timeout period is 15 seconds compared to a timeout period of 30 seconds under the V.34 standard. In addition, the analog modems control the handshake timing during training. In an exemplary embodiment, the call modem and the answer modem are the V.90 analog modems. As such the call modem and the answer modem are beyond the control of the network gateways during training. The digital modems only control the timing during transmission of TRN1$d$, which the digital modem in the network gateway uses to train its echo canceller.

When operating in accordance with the V.90 standard, the call negotiator utilizes the V.8 recommendations for initial negotiation. Thus, the initial negotiation of the V.90 relay session is substantially the same as the relay sequence described for V.34 rate synchronization method one and method two with asymmetric rate operation. There are two configurations where V.90 relay may be used. The first configuration is data relay between two V.90 analog modems, i.e. each of the network gateways are configured as V.90 digital modems. The upstream rate between two V.90 analog modems, according to the V.90 standard, is limited to 33,600 bps. Thus, the maximum data rate for an analog to analog relay is 33,600 bps. In accordance with the V.90 standard, the minimum data rate a V.90 digital modem will support is 28,800 bps. Therefore, the connection must be terminated if the maximum data rate for one or both of the upstream directions is less than 28,800 bps, and one or both the downstream direction is in V.90 digital mode. Therefore, the V.34 relay is preferred over V.90 analog to analog data relay.

A second configuration is a connection between a V.90 analog modem and a V.90 digital modem. A typical example of such a configuration is when a user within a packet based PABX system dials out into a remote access server (RAS) or an Internet service provider (ISP) that uses a central site modem for physical access that is V.90 capable. The connection from PABX to the central site modem may be either through PSTN or directly through an ISDN, T1 or E1 interface. Thus the V.90 embodiment should preferably support an analog modem interfacing directly to ISDN, T1 or E1.

For an analog to digital modem connection, the connections at both ends of the packet based network should be either digital or analog to achieve proper rate synchronization. The analog modem decides whether to select digital mode as specified in INFO1$a$, so that INFO1$a$ should be relayed between the calling and answer modem via their respective network gateways before operation mode is synchronized.

Upon receipt of an INFO1$a$ signal from the answer modem, the answer network gateway performs line probe processing on the signal received from the answer modem to determine whether digital mode can be used. The call network gateway receives an INFO1$a$ signal from the call modem. The call network gateway sends a mode indication to the answer network gateway indicating whether digital or analog will be used and initiates operation in the mode specified in INFO1$a$. Upon receipt of an analog mode indication signal from the call network gateway, the answer network gateway sends an INFO1$a$ sequence to the answer modem. The answer network gateway then proceeds with analog mode operation. Similarly, if digital mode is indicated and digital mode can be supported by the answer modem, the answer network gateway sends an INFO1$a$ sequence to the answer modem indicating that digital mode is desired and proceeds with digital mode operation.

Alternatively, if digital mode is indicated and digital mode can not be supported by the answer modem, the call modem should preferably be forced into analog mode by one of three alternate methods. First, some commercially available V.90 analog modems may revert to analog mode after several retrains. Thus, one method to force the call modem into analog mode is to force retrains until the call modem selects analog mode operation. In an alternate method, the call network gateway modifies its line probe so as to force the call modem to select analog mode. In a third method, the call modem and the answer modem operate in different modes. Under this method if the answer modem can not support a 28,800 bps data rate the connection is terminated.

3. Data Mode Spoofing

The jitter buffer 510 may underflow during long delays of data signal packets. Jitter buffer 510 underflow can cause the data pump transmitter 512 to run out of data, and therefore, it is desirable that the jitter buffer 510 be spoofed with bit sequences. Preferably the bit sequences are benign. In the described exemplary embodiment, the specific spoofing methodology is dependent upon the common error mode protocol negotiated by the error control logic of each network gateway.

In accordance with V.14 recommendations, the spoofing logic 516 checks for character format and boundary (number of data bits, start bits and stop bits) within the jitter buffer 510. As specified in the V.14 recommendation the spoofing logic 516 must account for stop bits omitted due to asynchronous-to-synchronous conversion. Once the spoofing logic 516 locates the character boundary, ones can be added to spoof the local modem and keep the connection alive. The length of time a modem can be spoofed with ones depends only upon the application program driving the local modem.

In accordance with the V.42 recommendations, the spoofing logic 516 checks for HDLC flag (HDLC frame boundary) within the jitter buffer 510. The basic HDLC structure consists of a number of frames, each of which is subdivided into a number of fields. The HDLC frame structure provides for frame labeling and error checking. When a new data transmission is initiated, HDLC preamble in the form of synchronization sequences are transmitted prior to the binary coded information. The HDLC preamble is modulated bit streams of "01111110 (0x7e)". The jitter buffer 510 should be sufficiently large to guarantee that at least one complete HDLC frame is contained within the jitter buffer 510. The default length of an HDLC frame is 132 octets. The V.42 recommendations for error correction of data circuit terminating equipment (DCE) using asynchronous-to-synchronous conversion does not specify a maximum length for an HDLC frame. However, because the length of the frame affects the overall memory required to implement the protocol, a information frame length larger than 260 octets is unlikely.

The spoofing logic 516 stores a threshold water mark (with a value set to be approximately equal to the maximum length of the HDLC frame). The spoofing logic 516 searches for HDLC flags (0111110 bit sequence) within the jitter buffer 510 when the amount of data stored within the jitter buffer 510 falls below the threshold level. When the HDLC is about to be sent, the spoofing logic 516 begins to insert HDLC flags into the jitter buffer 510, and continues until the amount of data signal within the jitter buffer 510 is greater than the threshold level.

4. Retrain and Rate Renegotiation

In the described exemplary embodiment, if data rates independently negotiated between the modems and their respective network gateways are different, the rate negotiator will renegotiate the data rate by adopting the lowest of the two data rates. The call and answer modems will then undergo retraining or rate renegotiation procedures by their respective network gateways to establish a new connection at the renegotiated data rate. In addition, rate synchronization may be lost during a modem communication due to drift or change in the conditions of the communication channel. When a retrain occurs, an indication should be forwarded to the network gateway at the end of the packet based network. The network gateway receiving a retrain indication should initiate retrain with the connected modem to keep data flow in synchronism between the two connections. Rate synchronization procedures as previously described should be used to maintain data rate alignment after retrains.

Similarly, rate renegotiation causes both the calling and answer network gateways and to perform rate renegotiation. However, rate signals or MP (CP) sequences should be exchanged per method two of the data rate alignment as previously discussed for a V.32bis or V.34 rate synchronization whichever is appropriate.

5. Error Correcting Mode Synchronization

Error control (V.42) and data compression (V.42bis) modes should be synchronized at each end of the packet based network. In a first method, the call modem and the answer modem independently negotiate an error correction mode with each other on their own, transparent to the network gateways. This method is preferred for connections wherein the network delay plus jitter is relatively small, as characterized by an overall round trip delay of less than 700 msec. Data compression mode is negotiated within V.42 so that the appropriate mode indication can be relayed when the calling and answer modems have entered into V.42 mode.

An alternative method is to allow modems at both ends to freely negotiate the error control mode with their respective network gateways. The network gateways must fully support all error correction modes when using this method. Also, this method cannot support the scenario where one modem selects V.14 while the other modem selects a mode other than V.14.

For the case where V.14 is negotiated at both sides of the packet based network, an 8-bit no parity format is assumed by each respective network gateway and the raw demodulated data bits are transported there between. With all other cases, each gateway shall extract de-framed (error corrected) data bits and forward them to its counterpart at the opposite end of the network. Flow control procedures within the error control protocol may be used to handle network delay. The advantage of this method over the first method is its ability to handle large network delays and also the scenario where the local connection rates at the network gateways are different. However, packets transported over the network in accordance with this method must be guaranteed to be error free. This may be achieved by establishing a connection between the network gateways in accordance with the link access protocol connection for modems (LAPM)

6. Data Pump

Preferably, the data exchange includes a modem relay having a data pump for demodulating modem data signals from a modem for transmission on the packet based network, and remodulating modem data signal packets from the packet based network for transmission to a local modem. Similarly, the data exchange also preferably includes a fax relay with a data pump for demodulating fax data signals from a fax for transmission on the packet based network, and remodulating fax data signal packets from the packet based network for transmission to a local fax device. The utilization of a data pump in the fax and modem relays to demodulate and remodulate data signals for transmission across a packet based network provides considerable bandwidth savings. First, only the underlying unmodulated data signals are transmitted across the packet based network. Second, data transmission rates of digital signals across the packet based network, typically 64 kbps is greater than the maximum rate available (typically 33,600 bps) for communication over a circuit switched network.

Figure 27:
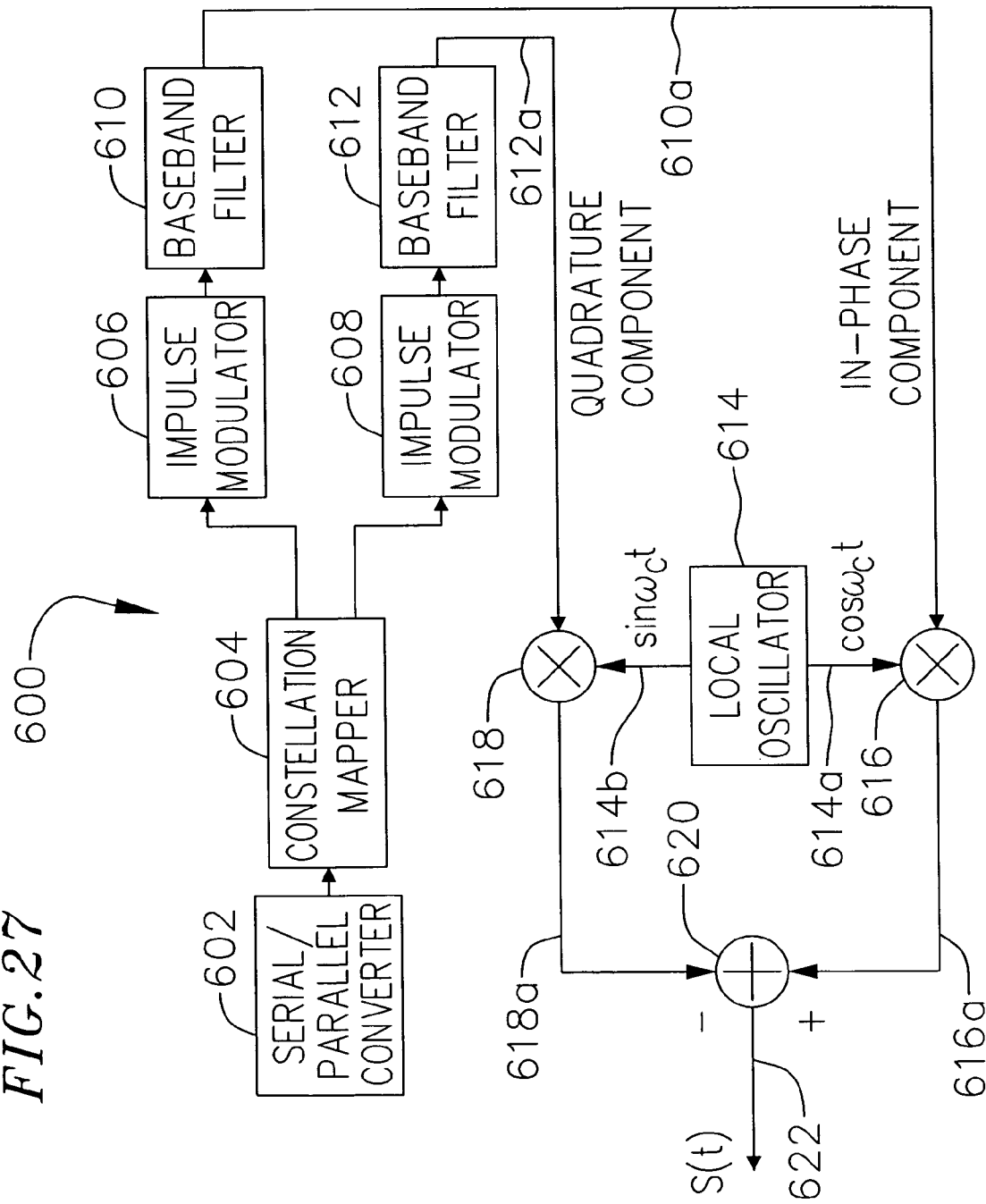
FIG. 27 is a system block diagram of a QAM data pump transmitter in accordance with a preferred embodiment of the present invention.

Telephone line data pumps operating in accordance with ITU V series recommendations for transmission rates of 2400 bps or more typically utilize quadrature amplitude modulation (QAM). A typical QAM data pump transmitter 600 is shown schematically in FIG. 27. The transmitter input is a serial binary data stream $d_n$ arriving at a rate of $R_d$ bps. A serial to parallel converter 602 groups the input bits into J-bit binary words. A constellation mapper 604 maps each J-bit binary word to a channel symbol from a $2^J$ element alphabet resulting in a channel symbol rate of $f_s=R_d/J$ baud. The alphabet consists of a pair of real numbers representing points in a two-dimensional space, called the signal constellation. Customarily the signal constellation can be thought of as a complex plane so that the channel symbol sequence may be represented as a sequence of complex numbers $c_n=a_n+jb_n$. Typically the real part $a_n$ is called the in-phase or I component and the imaginary $b_n$ is called the quadrature or Q component. A nonlinear encoder 605 may be used to expand the constellation points in order to combat the negative effects of companding in accordance with ITU-T G.711 standard. The I & Q components may be modulated by impulse modulators 606 and 608 respectively and filtered by transmit shaping filters 610 and 612 each with impulse response $g_T(t)$. The outputs of the shaping filters 610 and 612 are called in-phase 610(a) and quadrature 612(a) components of the continuous-time transmitted signal.

The shaping filters 610 and 612 are typically lowpass filters approximating the raised cosine or square root of raised cosine response, having a cutoff frequency on the order of at least about $f_s/2$. The outputs 610(a) and 612(a) of the lowpass filters 610 and 612 respectively are lowpass signals with a frequency domain extending down to approximately zero hertz. A local oscillator 614 generates quadrature carriers $\cos(\omega_c t)$ 614(*a*) and $\sin(\omega_c t)$ 614(*b*). Multipliers 616 and 618 multiply the filter outputs 610(*a*) and 612(*a*) by quadrature carriers $\cos(\omega_c t)$ and $\sin(\omega_c t)$ respectively to amplitude modulate the in-phase and quadrature signals up to the passband of a bandpass channel. The modulated output signals 616(*a*) and 618(*a*) are then subtracted in a difference operator 620 to form a transmit output signal 622. The carrier frequency should be greater than the shaping filter cutoff frequency to prevent spectral fold-over.

Figure 28:
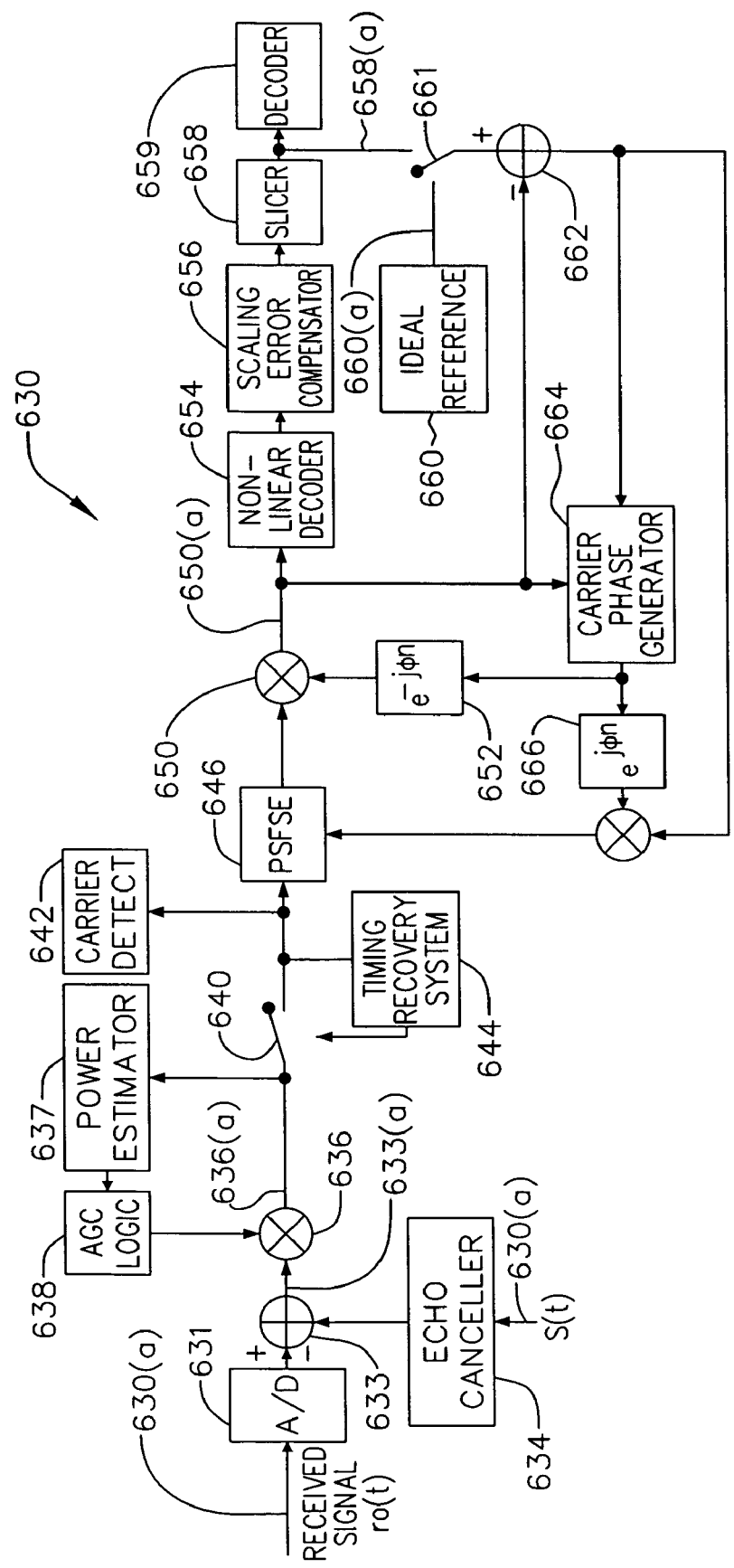
FIG. 28 is a system block diagram of a QAM data pump receiver in accordance with a preferred embodiment of the present invention.

A data pump receiver 630 is shown schematically in FIG. 28. The data pump receiver 630 is generally configured to process a received signal 630(*a*) distorted by the non-ideal frequency response of the channel and additive noise in a transmit data pump (not shown) in the local modem. An analog to digital converter (A/D) 631 converts the received signal 630(*a*) from an analog to a digital format. The A/D converter 631 samples the received signal 630(*a*) at a rate of $f_o = 1/T_o = n_o/T$ which is $n_o$ times the symbol rate $f_s = 1/T$ and is at least twice the highest frequency component of the received signal 630(*a*) to satisfy nyquist sampling theory.

An echo canceller 634 substantially removes the line echos on the received signal 630(*a*). Echo cancellation permits a modem to operate in a full duplex transmission mode on a two-line circuit, such as a PSTN. With echo cancellation, a modem can establish two high-speed channels in opposite directions. Through the use of digital-signal-processing circuitry, the modem's receiver can use the shape of the modem's transmitter signal to cancel out the effect of its own transmitted signal by subtracting reference signal 630(*a*) and the receive signal 630(*a*) in a difference operator 633.

Multiplier 636 scales the amplitude of echo cancelled signal 633(*a*). A power estimator 637 estimates the power level of the gain adjusted signal 636(*a*). Automatic gain control logic 638 compares the estimated power level to a set of predetermined thresholds and inputs a scaling factor into the multiplier 636 that adjusts the amplitude of the echo canceled signal 634(*a*) to a level that is within the desired amplitude range. A carrier detector 642 processes the output of a digital resampler 640 to determine when a data signal is actually present at the input to receiver 630. Many of the receiver functions are preferably not invoked until an input signal is detected.

A timing recovery system 644 synchronizes the transmit clock of the remote data pump transmitter (not shown) and the receiver clock. The timing recovery system 644 extracts timing information from the received signal, and adjusts the digital resampler 640 to ensure that the frequency and phase of the transmit clock and receiver clock are synchronized. A phase splitting fractionally spaced equalizer (PSFSE) 646 filters the received signal at the symbol rate. The PSFSE 646 compensates for the amplitude response and envelope delay of the channel so as to minimize inter-symbol interference in the received signal. The frequency response of a typical channel is inexact so that an adaptive filter is preferable. The PSFSE 646 is preferably an adaptive FIR filter that operates on data signal samples spaced by $T/n_0$ and generates digital signal output samples spaced by the period T. In the described exemplary embodiment $n_0 = 3$.

The PSFSE 646 outputs a complex signal which multiplier 650 multiplies by a locally generated carrier reference 652 to demodulate the PSFSE output to the baseband signal 650(*a*). The received signal 630(*a*) is typically encoded with a non-linear operation so as to reduce the quantization noise introduced by companding in accordance with ITU-T G.711. The baseband signal 650(*a*) is therefore processed by a non-linear decoder 654 which reverses the non-linear encoding or warping. The gain of the baseband signal will typically vary upon transition from a training phase to a data phase because modem manufacturers utilize different methods to compute a scale factor. The problem that arises is that digital modulation techniques such as quadrature amplitude modulation (QAM) and pulse amplitude modulation (PAM) rely on precise gain (or scaling) in order to achieve satisfactory performance. Therefore, a scaling error compensator 656 adjusts the gain of the receiver to compensate for variations in scaling. Further, a slicer 658 then quantizes the scaled baseband symbols to the nearest ideal constellation points, which are the estimates of the symbols from the remote data pump transmitter (not shown). A decoder 659 converts the output of slicer 658 into a digital binary stream.

During data pump training, known transmitted training sequences are transmitted by a data pump transmitter in accordance with the applicable ITU-T standard. An ideal reference generator 660, generates a local replica of the constellation point 660(*a*). During the training phase a switch 661 is toggled to connect the output 660(*a*) of the ideal reference generator 660 to a difference operator 662 that generates a baseband error signal 662(*a*) by subtracting the ideal constellation sequence 660(*a*) and the baseband equalizer output signal 650(*a*). A carrier phase generator 664 uses the baseband error signal 662(*a*) and the baseband equalizer output signal 650(*a*) to synchronize local carrier reference 666 with the carrier of the received signal 630(*a*) During the data phase the switch 661 connects the output 658(*a*) of the slicer to the input of difference operator 662 that generates a baseband error signal 662(*a*) in the data phase by subtracting the estimated symbol output by the slicer 658 and the baseband equalizer output signal 650(*a*). It will be appreciated by one of skill that the described receiver is one of several approaches. Alternate approaches in accordance with ITU-T recommendations may be readily substituted for the described data pump. Accordingly, the described exemplary embodiment of the data pump is by way of example only and not by way of limitation.

a. Timing Recovery System

Timing recovery refers to the process in a synchronous communication system whereby timing information is extracted from the data being received. In the context of a modem connection in accordance with an exemplary embodiment of the present invention, each modem is coupled to a signal processing system, which for the purposes of explanation is operating in a network gateway, either directly or through a PSTN line. In operation, each modem establishes a modem connection with its respective network gateway, at which point, the modems begin relaying data signals across a packet based network. The problem that arises is that the clock frequencies of the modems are not identical to the clock frequencies of the data pumps operating in their respective network gateways. By design, the data pump receiver in the network gateway should be capable of adjusting its clock to the modem clock.

A timing recovery system can be used for this purpose. Although the timing recovery system is described in the context of a data pump within a signal processing system with the packet data modem exchange invoked, those skilled in the art will appreciate that the timing recovery system is likewise suitable for various other applications in various other telephony and telecommunications applications, including fax data pumps. Accordingly, the described exemplary embodiment of the timing recovery system in a signal processing system is by way of example only and not by way of limitation.

Figure 29:
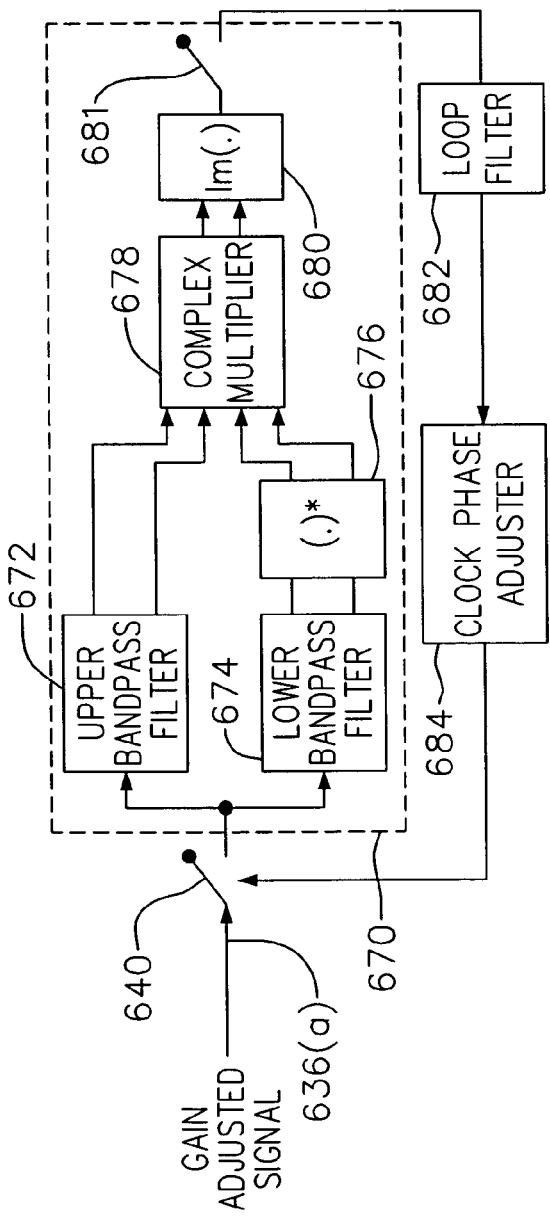
FIG. 29 is a block diagram of a method for sampling a signal of symbols received in a data pump receiver in synchronism with the transmitter clock of a data pump transmitter in accordance with a preferred embodiment of the present invention.

A block diagram of a timing recovery system is shown in FIG. 29. In the described exemplary embodiment, the digital resampler 640 resamples the gain adjusted signal 636(a) output by the AGC (see FIG. 28). A timing error estimator 670 provides an indication of whether the local timing or clock of the data pump receiver is leading or lagging the timing or clock of the data pump transmitter in the local modem. As is known in the art, the timing error estimator 670 may be implemented by a variety of techniques including that proposed by Godard. The A/D converter 631 of the data pump receiver (see FIG. 28) samples the received signal 630(a) at a rate of fo which is an integer multiple of the symbol rate fs=1/T and is at least twice the highest frequency component of the received signal 630(a) to satisfy nyquist sampling theory. The samples are applied to an upper bandpass filter 672 and a lower bandpass filter 674. The upper bandpass filter 672 is tuned to the upper band edge frequency fu=fc+0.5 fs and the lower bandpass filter 674 is tuned to the lower band-edge frequency f1=fc−0.5 fs where fc is the carrier frequency of the QAM signal. The bandwidth of the filters 672 and 674 should be reasonably narrow, preferably on the order of 100 Hz for a fs=2400 baud modem. Conjugate logic 676 takes the complex conjugate of complex output of the lower bandpass filter. Multiplier 678 multiplies the complex output of the upper bandpass filter 672(a) by the complex conjugate of the lower bandpass filter to form a cross-correlation between the output of the two filters (672 and 674). The real part of the correlated symbol is discarded by processing logic 680, and a sampler 681 samples the imaginary part of the resulting cross-correlation at the symbol rate to provide an indication of whether the timing phase error is leading or lagging.

In operation, a transmitted signal from a remote data pump transmitter (not shown) g(t) is made to correspond to each data character. The signal element has a bandwidth approximately equal to the signaling rate fs. The modulation used to transmit this signal element consists of multiplying the signal by a sinusoidal carrier of frequency fc which causes the spectrum to be translated to a band around frequency fc. Thus, the corresponding spectrum is bounded by frequencies f1=fc−0.5 fs and f2=fc+0.5 fs, which are known as the band-edge frequencies. Reference for more detailed information may be made to "Principles of Data Communication" by R. W. Lucky, J. Salz and E. J. Weldon, Jr., McGraw-Hill Book Company, pages 50-51.

In practice it has been found that additional filtering is required to reduce symbol clock jitter, particularly when the signal constellation contains many points. Conventionally a loop filter 682 filters the timing recovery signal to reduce the symbol clock jitter. Traditionally the loop filter 682 is a second order infinite impulse response (IIR) type filter, whereby the second order portion tracks the offset in clock frequency and the first order portion tracks the offset in phase. The output of the loop filter drives clock phase adjuster 684. The clock phase adjuster controls the digital sampling rate of digital resampler 640 so as to sample the received symbols in synchronism with the transmitter clock of the modem connected locally to that gateway. Typically, the clock phase adjuster 684 utilizes a poly-phase interpolation algorithm to digitally adjust the timing phase. The timing recovery system may be implemented in either analog or digital form. Although digital implementations are more prevalent in current modem design an analog embodiment may be realized by replacing the clock phase adjuster with a VCO.

Figure 30:
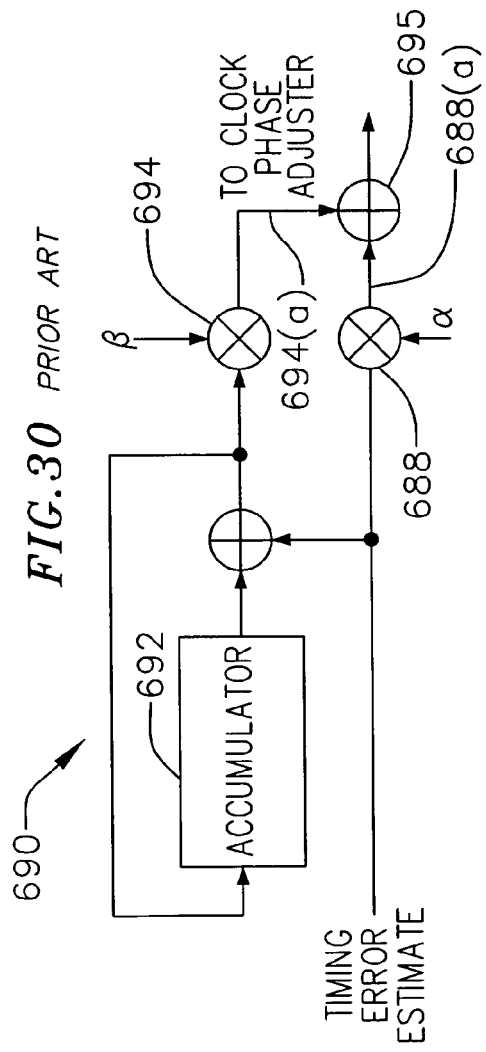
FIG. 30 is a block diagram of a second order loop filter for reducing symbol clock jitter in the timing recovery system of data pump receiver in accordance with a preferred embodiment of the present invention.

The loop filter 682 is typically implemented as shown in FIG. 30. The first order portion of the filter controls the adjustments made to the phase of the clock (not shown) A multiplier 688 applies a first order adjustment constant a to advance or retard the clock phase adjustment. Typically the constant a is empirically derived via computer simulation or a series of simple experiments with a telephone network simulator. Generally α is dependent upon the gain and the bandwidth of the upper and lower filters in the timing error estimator, and is generally optimized to reduce symbol clock jitter and control the speed at which the phase is adjusted. The structure of the loop filter 682 may include a second order component 690 that estimates the offset in clock frequency. The second order portion utilizes an accumulator 692 in a feedback loop to accumulate the timing error estimates. A multiplier 694 is used to scale the accumulated timing error estimate by a constant β. Typically, the constant β is empirically derived based on the amount of feedback that will cause the system to remain stable. Summer 695 sums the scaled accumulated frequency adjustment 694(a) with the scaled phase adjustment 688(a). A disadvantage of conventional designs which include a second order component 690 in the loop filter 682 is that such second order components 690 are prone to instability with large constellation modulations under certain channel conditions.

Figure 31:
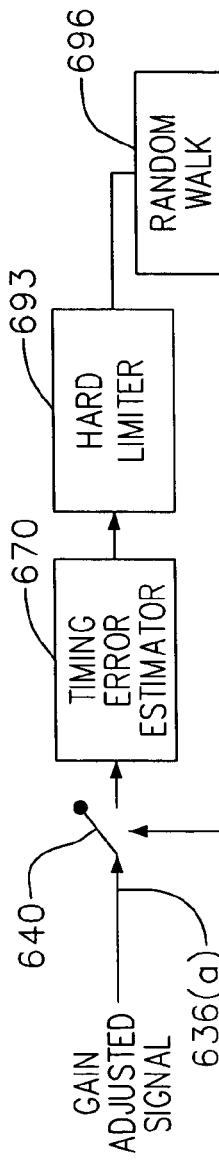
FIG. 31 is a block diagram of an alternate method for sampling a signal of symbols received in a data pump receiver in synchronism with the transmitter clock of a data pump transmitter in accordance with a preferred embodiment of the present invention.

An alternative digital implementation eliminates the loop filter. Referring to FIG. 31 a hard limiter 693 and a random walk filter 696 are coupled to the output of the timing error estimator 670 to reduce timing jitter. In this alternate digital embodiment, a resampler or clock phase adjuster 698 is coupled to the output of the random walk filter 696 replacing the VCO 684 in the analog embodiment shown in FIG. 29. The hard limiter 693 provides a simple automatic gain control action that keeps the loop gain constant independent of the amplitude level of the input signal. The hard limiter 693 assures that timing adjustments are proportional to the timing of the data pump transmitter of the local modem and not the amplitude of the received signal. The random walk filter 696 reduces the timing jitter induced into the system as disclosed in "Communication System Design Using DSP Algorithms", S. Tretter, p. 132, Plenum Press, NY., 1995, the contents of which is hereby incorporated by reference as through set forth in full herein. The random walk filter 696 acts as an accumulator, summing a random number of adjustments over time. The random walk filter 696 is reset when the accumulated value exceeds a positive or negative threshold. Typically, the sampling phase is not adjusted so long as the accumulator output remains between the thresholds, thereby substantially reducing or eliminating incremental positive adjustments followed by negative adjustments that otherwise tend to not accumulate.

Figure 32:
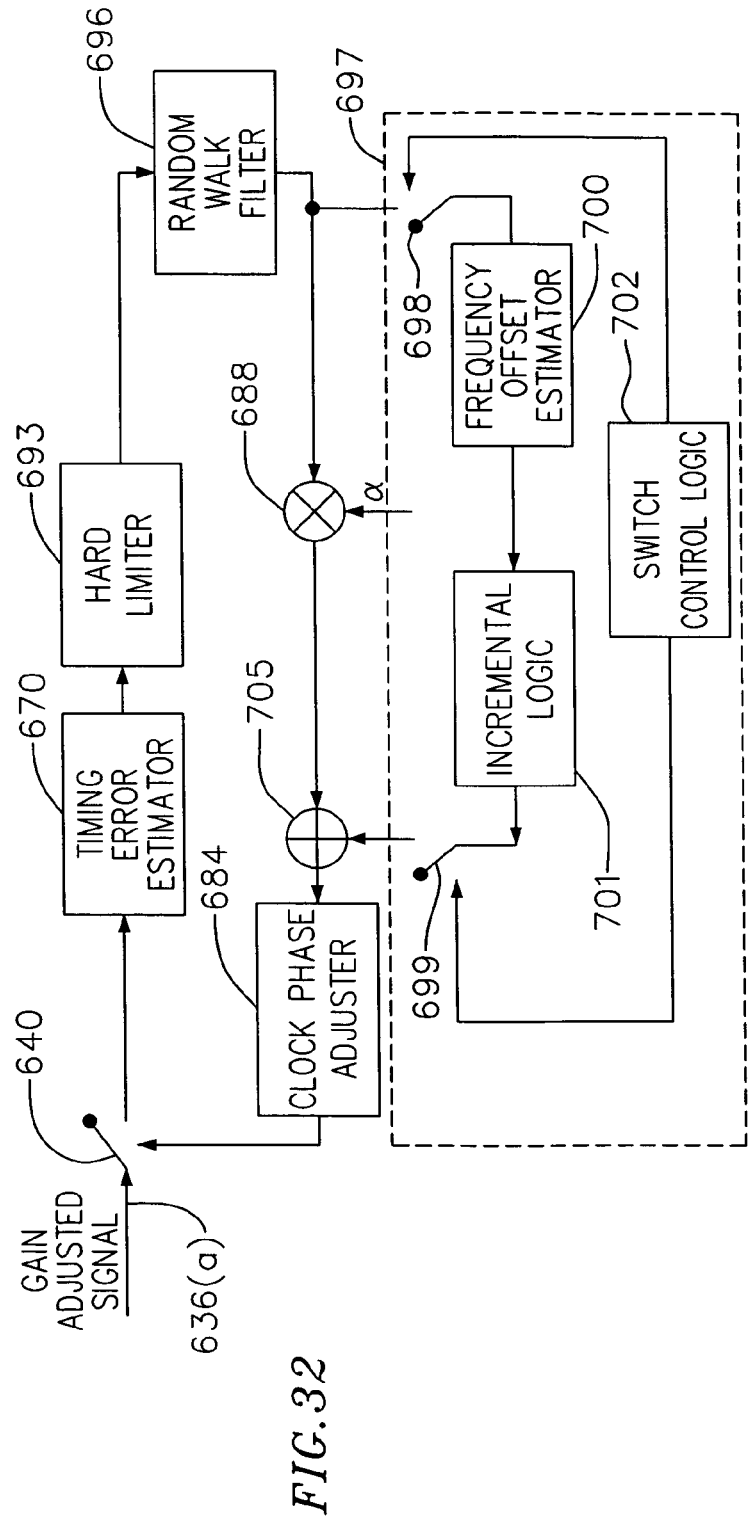
FIG. 32 is a block diagram of an alternate method for sampling a signal of symbols received in a data pump receiver in synchronism with the transmitter clock of a data pump transmitter wherein a timing frequency offset compensator provides a fixed dc component to compensate for clock frequency offset present in the received signal in accordance with a preferred embodiment of the present invention.

Referring to FIG. 32 in an exemplary embodiment of the present invention, the multiplier 688 applies the first order adjustment constant a to the output of the random walk filter to advance or retard the estimated clock phase adjustment. In addition, a timing frequency offset compensator 697 is coupled to the timing recovery system via switches 698 and 699 to preferably provide a fixed dc component to compensate for clock frequency offset present in the received signal. The exemplary timing frequency offset compensator preferably operates in phases. A frequency offset estimator 700 computes the total frequency offset to apply during an estimation phase and incremental logic 701, incrementally applies the offset estimate in linear steps during the application phase. Switch control logic 702 controls the toggling of switches 698 and 699 during the estimation and application phases of compensation adjustment. Unlike the second order component 690 of the conventional timing recovery loop filter disclosed in FIG. 30, the described exemplary timing frequency offset compensator 697 is an open loop design such that the second order compensation is fixed during steady state. Therefore, switches 698 and 699 work in opposite cooperation when the timing compensation is being estimated and when it is being applied.

Figure 33:
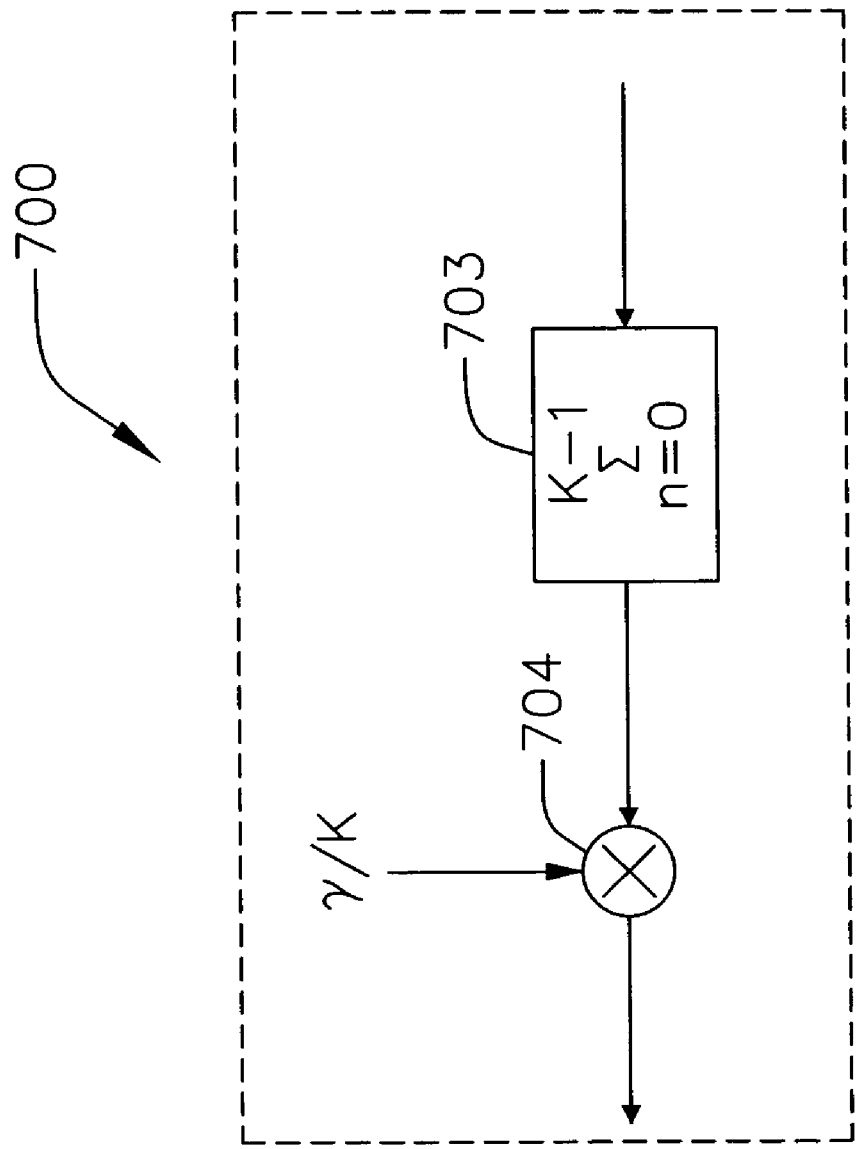
FIG. 33 is a block diagram of a method for estimating the timing frequency offset required to sample a signal of symbols received in a data pump receiver in synchronism with the transmitter clock of a data pump transmitter in accordance with a preferred embodiment of the present invention.

During the estimation phase, switch control logic 702 closes switch 698 thereby coupling the timing frequency offset compensator 697 to the output of the random walk filter 696, and opens switch 699 so that timing adjustments are not applied during the estimation phase. The frequency offset estimator 700 computes the timing frequency offset during the estimate phase over K symbols in accordance with the block diagram shown in FIG. 33. An accumulator 703 accumulates the frequency offset estimates over K symbols. A multiplier 704 is used to average the accumulated offset estimate by applying a constant $\gamma/K$. Typically the constant $\gamma$ is empirically derived and is preferably in the range of about 0.5-2. Preferably K is as large as possible to improve the accuracy of the average. K is typically greater than about 500 symbols and less than the recommended training sequence length for the modem in question. In the exemplary embodiment the first order adjustment constant $\alpha$ is preferably in the range of about 100-300 part per million (ppm). The timing frequency offset is preferably estimated during the timing training phase (timing tone) and equalizer training phase based on the accumulated adjustments made to the clock phase adjuster 684 over a period of time.

During steady state operation when the timing adjustments are applied, switch control logic 702 opens switch 698 decoupling the timing frequency offset compensator 697 from the output of the random walk filter, and closes switch 699 so that timing adjustments are applied by summer 705. After K symbols of a symbol period have elapsed and the frequency offset compensation is computed, the incremental logic 701 preferably applies the timing frequency offset estimate in incremental linear steps over a period of time to avoid large sudden adjustments which may throw the feedback loop out of lock. This is the transient phase. The length of time over which the frequency offset compensation is incrementally applied is empirically derived, and is preferably in the range of about 200-800 symbols. After the incremental logic 701 has incrementally applied the total timing frequency offset estimate computed during the estimate phase, a steady state phase begins where the compensation is fixed. Relative to conventional second order loop filter, the described exemplary embodiment provides improved stability and robustness.

b. Multipass Training

Data pump training refers to the process by which training sequences are utilized to various adaptive elements within a data pump receiver. During data pump training, known transmitted training sequences are transmitted by a data pump transmitter in accordance with the applicable ITU-T standard. In the context of a modem connection in accordance with an exemplary embodiment of the present invention, the modems (see FIG. 23) are coupled to a signal processing system, which for the purposes of explanation is operating in a network gateway, either directly or through a PSTN line. In operation, the receive data pump operating in each network gateway of the described exemplary embodiment utilizes PSFSE architecture. The PSFSE architecture has numerous advantages over other architectures when receiving QAM signals. However, the PSFSE architecture has a slow convergence rate when employing the least mean square (LMS) stochastic gradient algorithm. This slow convergence rate typically prevents the use of PSFSE architecture in modems that employ relatively short training sequences in accordance with common standards such as V.29. Because of the slow convergence rate, the described exemplary embodiment reprocesses block of training samples multiple times (multi-pass training).

Although the method of performing multi-pass training is described in the context of a signal processing system with the packet data exchange invoked, those skilled in the art will appreciate that multi-pass training is likewise suitable for various other telephony and telecommunications application. Accordingly, the described exemplary method for multi-pass training in a signal processing system is by way of example only and not by way of limitation. In an exemplary embodiment the data pump receiver operating in the network gateway stores the received QAM samples of the modem's training sequence in a buffer until N symbols have been received. The PSFSE is then adapted sequentially over these N symbols using a LMS algorithm to provide a coarse convergence of the PSFSE. The coarsely converged PSFSE (i.e. with updated values for the equalizer taps) returns to the start of the same block of training samples and adapts a second time. This process is repeated M times over each block of training samples. Each of the M iterations provides a more precise or finer convergence until the PSFSE is completely converged.

c. Scaling Error Compensator

Scaling error compensation refers to the process by which the gain of a data pump receiver (fax or modem) is adjusted to compensate for variations in transmission channel conditions. In the context of a modem connection in accordance with an exemplary embodiment of the present invention, each modem is coupled to a signal processing system, which for the purposes of explanation is operating in a network gateway, either directly or through a PSTN line. In operation, each modem communicates with its respective network gateway using digital modulation techniques. The problem that arises is that digital modulation techniques such as QAM and pulse amplitude modulation (PAM) rely on precise gain (or scaling) in order to achieve satisfactory performance. In addition, transmission in accordance with the V.34 recommendations typically includes a training phase and a data phase whereby a much smaller constellation size is used during the training phase relative to that used in the data phase. The V.34 recommendation, requires scaling to be applied when switching from the smaller constellation during the training phase into the larger constellation during the data phase.

The scaling factor can be precisely computed by theoretical analysis, however, different manufacturers of V.34 systems (modems) tend to use slightly different scaling factors. Scaling factor variation (or error) from the predicted value may degrade performance until the PSFSE compensates for the variation in scaling factor. Variation in gain due to transmission channel condition is compensated by an initial gain estimation algorithm (typically consisting of a simple signal power measurement during a particular signaling phase) and an adaptive equalizer during the training phase. However, since a PSFSE is preferably configured to adapt very slowly during the data phase, there may be a significant number of data bits received in error before the PSFSE has sufficient time to adapt to the scaling error.

It is, therefore, desirable to quickly reduce the scaling error and hence minimize the number of potential erred bits. A scaling factor compensator can be used for this purpose. Although the scaling factor compensator is described in the context of a signal processing system with the packet data modem exchange invoked, those skilled in the art will appreciate that the scaling factor compensator is likewise suitable for various other telephony and telecommunications applications. Accordingly, the described exemplary embodiment of the scaling factor compensator in a signal processing system is by way of example only and not by way of limitation.

Figure 34:
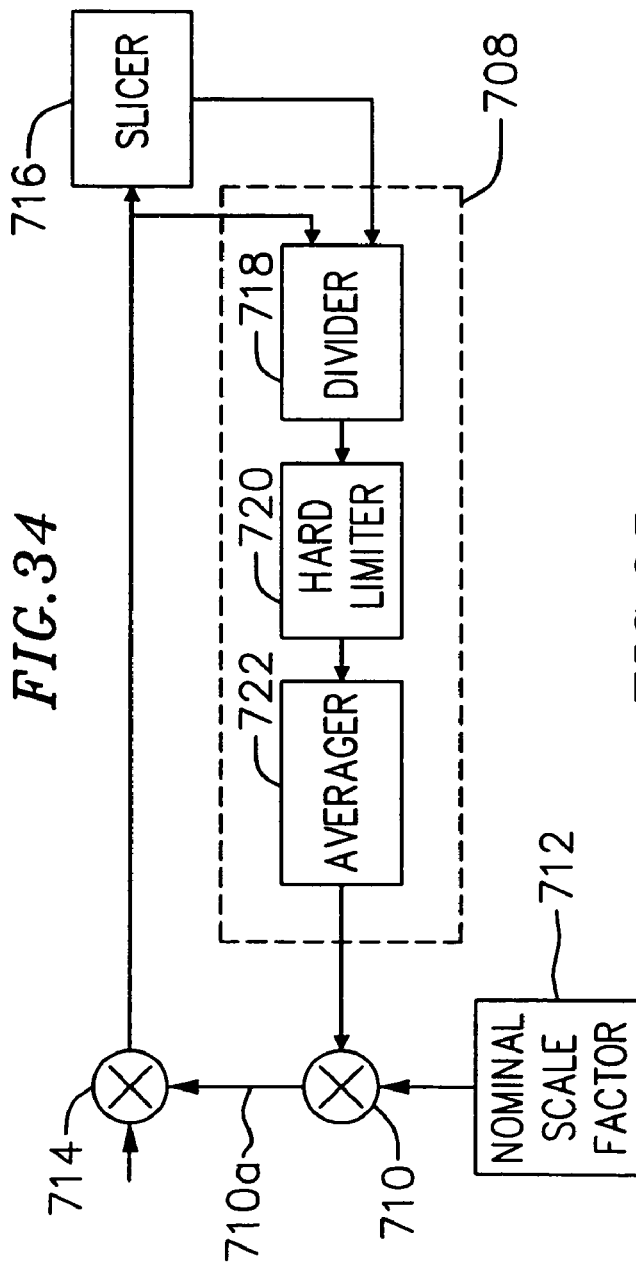
FIG. 34 is a block diagram of a method for adjusting the gain of a data pump receiver (fax or modem) to compensate for variations in transmission channel conditions.

FIG. 34 shows a block diagram of an exemplary embodiment of the scaling error compensator in a data pump receiver 630 (see FIG. 28). In an exemplary embodiment, scaling error compensator 708 computes the gain adjustment of the data pump receiver. Multiplier 710 adjusts a nominal scaling factor 712 (the scaling error computed by the data pump manufacturer) by the gain adjustment as computed by the scaling error compensator 708. The combined scale factor 710(a) is applied to the incoming symbols by multiplier 714. A slicer 716 quantizes the scaled baseband symbols to the nearest ideal constellation points, which are the estimates of the symbols from the remote data pump transmitter.

The scaling error compensator 708 preferably includes a divider 718 which estimates the gain adjustment of the data pump receiver by dividing the expected magnitude of the received symbol 716(a) by the actual magnitude of the received symbol 716(b). In the described exemplary embodiment the magnitude is defined as the sum of squares between real and imaginary parts of the complex symbol. The expected magnitude of the received symbol is the output 716(a) of the slicer 716 (i.e. the symbol quantized to the nearest ideal constellation point) whereas the magnitude of the actual received symbol is the input 716(a) to the slicer 716. In the case where a Viterbi decoder performs the error-correction of the received, noise-disturbed signal (as for V.34), the output of the slicer may be replaced by the first level decision of the Viterbi decoder.

The statistical nature of noise is such that large spikes in the amplitude of the received signal will occasionally occur. A large spike in the amplitude of the received signal will result in an erroneously large estimate of the gain adjustment of the data pump receiver. Typically, scaling is applied in a one to one ratio with the estimate of the gain adjustment, so that large scaling factors may be erroneously applied when large amplitude noise spikes are received. To minimize the impact of large amplitude spikes and improve the accuracy of the system, the described exemplary scaling error: compensator 708 further includes a non-linear filter in the form of a hard-limiter 720 which is applied to each estimate 718(a). The hard limiter 720 limits the maximum adjustment of the scaling value. The hard limiter 720 provides a simple automatic control action that keeps the loop gain constant independent of the amplitude of the input signal so as to minimize the negative effects of large amplitude noise spikes. In addition, an averager 722 computes the average gain adjustment estimate over a number (N) of symbols in the data phase prior to adjusting the nominal scale factor 710. As will be appreciated by those of skill in the art, other non-linear filtering algorithms may also be used in place of the hard-limiter.

Alternatively, the accuracy of the scaling error compensation is further improved by estimating the averaged scaling adjustment twice and applying that estimate in two steps. A large hard limit value (typically 1+/−0.25) is used to compute the first average scaling adjustment. The initial prediction provides an estimate of the average value of the amplitude of the received symbols. The unpredictable nature of the amplitude of the received signal requires the use of a large initial hard limit value to ensure that the true scaling error is included in the initial estimate of the average scaling adjustment. The estimate of the average value of the amplitude of the received symbols is used to calibrate the limits of the scaling adjustment. The average scaling adjustment is then estimated a second time using a lower hard limit value and then applied to the gain of the data pump receiver.

In most modem specifications, such as the V.34 standards, there is a defined signaling period (B1 for V.34) after transition into data phase where the data phase constellation is transmitted with signaling information to flush the receiver pipeline (i.e. Viterbi decoder etc.) prior to the transmission of actual data. In an exemplary embodiment this signaling period may be used to make the scaling adjustment such that any scaling error is compensated for prior to actual transfer of data.

d. Non-Linear Decoder

In the context of a modem connection in accordance with an exemplary embodiment of the present invention, each modem is coupled to a signal processing system, which for the purposes of explanation is operating in a network gateway, either directly or through a PSTN line. In operation, each modem communicates with its respective network gateway using digital modulation techniques. The international telecommunications union (ITU) has promulgated standards for the encoding and decoding of digital data in ITU-T Recommendation G.711 (ref. G.711). The encoding standard specifies that a nonlinear operation (companding) be performed on the analog data signal prior to quantization into 7 bits plus a sign bit. The companding operation is a monatomic invertable function which reduces the higher signal levels. At the decoder, the inverse operation (expanding) is done prior to analog reconstruction. The companding/expanding operation quantizes the higher signal values more coarsely. The companding/expanding operation, is suitable for the transmission of voice signals but introduces quantization noise on data modem signals. The quantization error (noise) is greater for the outer signal levels than the inner signal levels.

The ITU-T Recommendation V.34 describes a mechanism whereby (ref. V.34) the uniform signal is first expanded (ref. BETTS) to space the outer points farther apart than the inner points before G.711 encoding and transmission over the PCM link. At the receiver, the inverse operation is applied after G.711 decoding. The V.34 recommended expansion/inverse operation yields a more uniform signal to noise ratio over the signal amplitude. However, the inverse operation specified in the ITU-T Recommendation V.34 requires a complex receiver calculation. The calculation is computationally intensive, typically requiring numerous machine cycles to implement.

It is, therefore, desirable to reduce the number of machine cycles required to compute the inverse to within an acceptable error level. A simplified nonlinear decoder can be used for this purpose. Although the nonlinear decoder is described in the context of a signal processing system with the packet data modem exchange invoked, those skilled in the art will appreciate that the nonlinear decoder is likewise suitable for various other telephony and telecommunications application. Accordingly, the described exemplary embodiment of the nonlinear decoder in a signal processing system is by way of example only and not by way of limitation.

Conventionally, iteration algorithms have been used to compute the inverse of the nonlinear warping function. Typically, iteration algorithms generate an initial estimate of the input to the nonlinear function and then compute the output. The iteration algorithm compares the output to a reference value and adjusts the input to the nonlinear function. A commonly used adjustment is the successive approximation wherein the difference between the output and the reference function is added to the input. However, when using the successive approximation technique, up to ten iterations may be required to adjust the estimated input of the nonlinear warping function to an acceptable error level, so that the nonlinear warping function must be evaluated ten times. The successive approximation technique is computationally intensive, requiring significant machine cycles to converge to an acceptable approximation of the inverse of the nonlinear warping function. Alternatively, a more complex warping function is a linear Newton Rhapson (ref. Num . . . ) interation. Typically the Newton Rhapson algorithm requires three evaluations to converge to an acceptable error level. However, the inner computations for the Newton Rhapson algorithm are more complex than those required for the successive approximation technique. The Newton Rhapson algorithm utilizes a computationally intensive iteration loop wherein the derivative of the nonlinear warping function is computed for each approximation iteration, so that significant machine cycles are required to conventionally execute the Newton Rhapson algorithm.

An exemplary embodiment of the present invention modifies the successive approximation iteration. A presently preferred algorithm computes an approximation to the derivative of the nonlinear warping function once before the iteration loop is executed and uses the approximation as a scale factor during the successive approximation iteration. The described exemplary embodiment converges to the same acceptable error level as the more complex conventional Newton-Rhapson algorithm in four iterations (Ref. Attachment B). The described exemplary embodiment further improves the computational efficiency by utilizing a simplified approximation of the derivative of the nonlinear warping function.

In operation, development of the described exemplary embodiment proceeds as follows with a warping function defined as:

$$w(v) = \frac{\Theta(v)}{6} + \frac{\Theta(v)^2}{120}$$

the V.34 nonlinear decoder can be written as $$Y = X(1 + w(\|X\|^2))$$

taking the square of the magnitude of both sides yields, $$Y^2 = |X|^2 (1 + w(\|X\|^2))^2$$

The encoder notation can then be simplified with the following substitutions $$Y_r = \|Y\|^2, X_r = \|X\|^2$$

and write the V.34 nonlinear encoder equation in the cannonical form $G(x)=0$.

$$X_r(1 + w(X_r))^2 - Y_r = 0$$

The Newton-Rhapson iteration is a numerical method to determine X that results in an iteration of the form:

$$X_{n+1} = X_n - \frac{G(Xn)}{G'(Xn)}$$

where $G'$ is the derivative and the substitution iteration results when $G'$ is set equal to one.

The computational complexity of the Newton-Rhapson algorithm is thus paced by the derivation of the derivative $G'$, which conventionally is related to $X_r$ so that the mathematical instructions saved by performing fewer iterations are offset by the instructions required to calculate the derivative and perform the divide. Therefore, it would be desirable to have to approximate the derivative $G'$ with a term that is the function of the input $Y_r$ so that $G(x)$ is a monotonic function and $G'(x)$ can be expressed in terms of $G(x)$. Advantageously, if the steps in the iteration are small, then $G'(x)$ will not vary greatly and can be held constant over the iteration. A series of simple experiments yields the following approximation of $G'(x)$ where $\alpha$ is an experimentally derived scaling factor.

$$G' = \frac{1 + Yr}{\alpha}$$

The approximation for $G'$ converges to an acceptable error level in a minimum number of steps, typically one more iteration than the full linear Newton-Rhapson algorithm. A single divide before the iteration loop computes the quantity $$\frac{1}{G'} = \frac{\alpha}{1 + Yr}$$

The error term is multiplied by $1/G'$ in the successive iteration loop. It will be appreciated by one of skill in the art that further improvements in the speed of convergence are possible with the "Generalized Newton-Rhapson" class of algorithms. However, the inner loop computations for this class of algorithm are quite complex.

Advantageously, the described exemplary embodiment does not expand the polynomial because the numeric quantization on a store in a sixteen bit machine may be quite significant for the higher order polynomial terms. The described exemplary embodiment organizes the inner loop computations to minimize the effects of truncation and the number of instructions required for execution. Typically the inner loop requires eighteen instructions and four iterations to converge to within two bits of the actual value which is within the computational roundoff noise of a sixteen bit machine.

D. Human Speech Detector

In a preferred embodiment of the present invention, a signal processing system is employed to interface telephony devices with packet based networks. Telephony devices include, by way of example, analog and digital phones, ethernet phones, Internet Protocol phones, fax machines, data modems, cable modems, interactive voice response systems, PBXs, key systems, and any other conventional telephony devices known in the art. In the described exemplary embodiment the packet voice exchange is common to both the voice mode and the voiceband data mode. In the voiceband data mode, the network VHD invokes the packet voice exchange for transparently exchanging data without modification (other than packetization) between the telephony device or circuit switched network and the packet based network. This is typically used for the exchange of fax and modem data when bandwidth concerns are minimal as an alternative to demodulation and remodulation.

During the voiceband data mode, the human speech detector service is also invoked by the resource manager. The human speech detector monitors the signal from the near end telephony device for speech. In the event that speech is detected by the human speech detector, an event is forwarded to the resource manager which, in turn, causes the resource manager to terminate the human speech detector service and invoke the appropriate services for the voice mode (i.e., the call discriminator, the packet tone exchange, and the packet voice exchange).

Although a preferred embodiment is described in the context of a signal processing system for telephone communications across the packet based network, it will be appreciated by those skilled in the art that the speech detector is likewise suitable for various other telephony and telecommunications application. Accordingly, the described exemplary embodiment of the speech detector in a signal processing system is by way of example only and not by way of limitation.

There are a variety of encoding methods known for encoding a speech signal. Most frequently, speech is modeled on a short-time basis as the response of a linear system excited by a periodic impulse train for voiced sounds or random noise for the unvoiced sounds. Conventional human speech detectors typically monitor the power level of the incoming signal to make a speech/machine decision. Conventional human speech detectors are typically responsive to the frame energy level of an incoming sequence, such that if the power level of the incoming signal is above a predetermined threshold, the sequence is typically declared speech. The performance of such conventional speech detectors may be degraded by the environment, in that a very soft spoken whispered utterance will have a very different power level from a loud shout. If the threshold is set at two low a level noise will be declared speech, whereas if the threshold is set at too high a level soft spoken speech segments will be incorrectly marked as inactive.

Alternatively, speech may generally be classified as voiced if a fundamental frequency is imported to the air stream by the vocal cords of the speaker. In such case the frequency of a voice segment is typically highly periodic at around the pitch frequency. The determination as to whether a speech segment is voiced or unvoiced, and the estimation of the fundamental frequency can be obtained in a variety of ways known in the art as pitch detection algorithms. In the described exemplary embodiment the human speech detector calculates an autocorrelation function for the incoming signal. An autocorrelation function for a voice segment demonstrates local peaks with a periodicity in proportion to the pitch period. The human speech detector service utilizes this feature in conjunction with power measurements to distinguish voice signals from Fax/modem signals. It will be appreciated that other pitch detection algorithms known in the art can be used as well.

Figure 35:
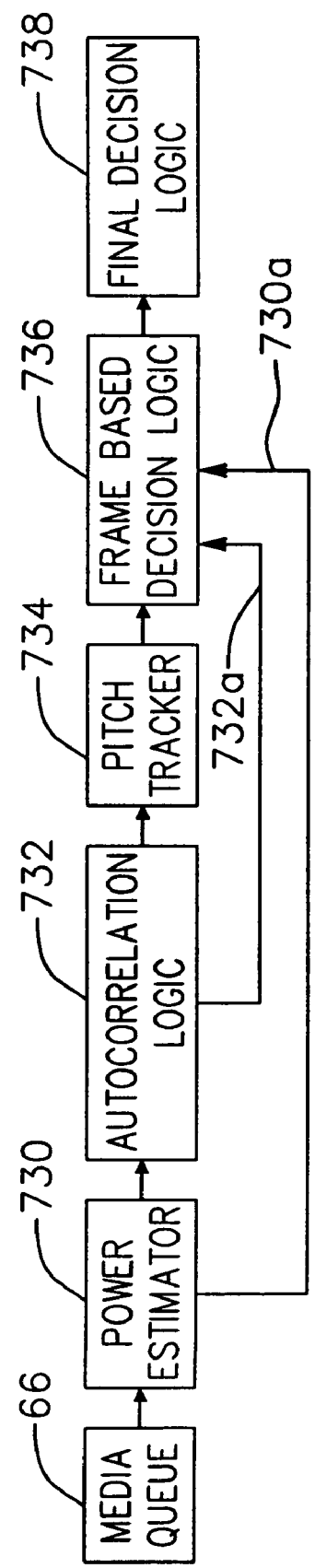
FIG. 35 is a block diagram of a method for detecting human speech in a telephony signal.

Referring to FIG. 35, in the described exemplary embodiment, a power estimator 730 estimates the power level of the incoming signal. Autocorrelation logic 732 computes an autocorrelation function for the input signal to assist in the speech/machine decision. Autocorrelation, as is known in the art, involves correlating a signal with itself. A correlation function shows how similar two signals are, and how long the signals remain similar when one is shifted with respect to the other. Periodic signals go in and out of phase as one is shifted with respect to the other, so that a periodic signal will show strong correlation at shifts where the peaks coincide. Thus, the autocorrelation of a periodic signal is itself a periodic signal, with a period equal to the period of the original signal.

The autocorrelation calculation computes the autocorrelation function over an interval of 360 samples with the following approach:

$$R[k] = \sum_{n=0}^{N-k-1} x[n]x[n+k]$$

where N=360, k=0, 1, 2 . . . 179.

A pitch tracker 734 estimates the period of the computed autocorrelation function. Framed based decision logic 736 analyzes the estimated power level 730a, the autocorrelation function 732a and the periodicity 734a of the incoming signal to execute a frame based voice/machine decision according to a variety of factors. For example, the energy of the input signal must be above a predetermined threshold level, preferably in the range of about −45 to −55 dBm, before the frame based decision logic 736 declares the signal to be speech. In addition, the typical pitch period of a voice segment is in the range of about 60-400 Hz, so that the autocorrelation function should preferably be periodic with a period in the range of about 60-400 Hz before the frame based decision logic 736 declares a signal as active or containing speech.

The amplitude of the autocorrelation function is a maximum for R[0], i.e. when the signal is not shifted relative to itself. Also, for a periodic voice signal, the amplitude of the autocorrelation function with a one period shift i.e. R[pitch period] should preferably be in the range of about 0.25-0.40 of the amplitude of the autocorrelation function with no shift i.e. R[0]. Similarly, modem signaling may involve certain DTMF or MF tones, in this case the signals are highly correlated, so that if the largest peak in the amplitude of the autocorrelation function after R[0] is relatively close in magnitude to R[0], preferably in the range of about 0.75-0.90 R[0], the frame based decision logic 736 declares the sequence as inactive or not containing speech.

Once a decision is made on the current frame as to voice or machine, final decision logic 738 compares the current frame decision with the two adjacent frame decisions. This check is known as backtracking. If a decision conflicts with both adjacent decisions it is flipped, i.e. voice decision turned to machine and vice versa.

Although a preferred embodiment of the present invention has been described, it should not be construed to limit the scope of the appended claims. For example, the present invention can be implemented by both a software embodiment or a hardware embodiment. Those skilled in the art will understand that various modifications may be made to the described embodiment. Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A system for timing recovery of a signal having a data rate, the system comprising:
    a sampler configured to sample the signal at a sampling rate to produce a plurality of samples;
    a timing error estimator configured to estimate a phase error between the data rate and the sampling rate;
    a frequency offset estimator configured to estimate a frequency error between the data rate and the sampling rate, during an estimation phase;
    a combiner configured to combine the estimated phase error with the estimated frequency error;
    a clock adjuster which adjusts the sampling rate of the sampler as a function of the combined phase and frequency error; and
    a switch control logic to decouple the frequency offset estimator from the timing error estimator so that phase adjustment is not applied during the estimation phase.

2. The timing recovery system of claim 1 wherein the frequency offset estimator comprise an accumulator which accumulates the estimated phase error for the samples, and a multiplier which scales the accumulated estimated phase error to compute the frequency error.

3. The timing recovery system of claim 1 wherein the combiner incrementally combines the estimated frequency error with the estimated phase error over the samples.

4. The timing recovery system of claim 3 wherein the combiner combines the estimated frequency error with the estimated phase error in incremental linear steps.

5. The timing recovery system of claim 1 wherein the frequency offset estimator estimates the frequency error from a first portion of the samples.

6. The timing recovery system of claim 5 wherein the timing error estimator estimates the phase error from a second portion of the samples different from the first portion.

7. A data transmission system comprising:
   a telephony device for outputting a signal having a data rate; and
   a data exchange coupled to the telephony device, the data exchange having,
      a sampler configured to sample the signal at a sampling rate to produce a plurality of samples,
      a timing error estimator configured to estimate a phase error between the data rate and the sampling rate,
      a frequency offset estimator configured to estimate a frequency error between the data rate and the sampling rate, during an estimation phase,
      a combiner configured to combine the estimated phase error with the estimated frequency error,
      a clock adjuster which adjusts the sampling rate of the sampler as a function of the combined phase error and frequency error, and
      a switch control logic to decouple the frequency offset estimator from the timing error estimator so that phase adjustment is not applied during the estimation phase.

8. The data transmission system of claim 7 further comprising a multiplier for scaling the estimated phase error before the combiner combines the estimated phase error with the estimated frequency error.

9. The data transmission system of claim 7 wherein the frequency offset estimator comprises an accumulator for accumulating the estimated phase error for the samples, and a multiplier for scaling the accumulated estimated phase error to estimate the frequency error.

10. One or more circuits recovering timing of a signal having a data rate, the one or more circuits comprising:
    at least one interface for receiving a signal having a data rate; and
    at least one processor operably coupled to the at least one interface, and operable to:
       sample the signal at a sampling rate to produce a plurality of samples,
       estimate a phase error between the data rate and the sampling rate,
       estimate a frequency error between the data rate and the sampling rate, during an estimation phase,
       combine the estimated phase error with the estimated frequency error,
       adjust the sampling rate of the sampler as a function of the combined phase and frequency error, and
       decouple a frequency offset estimator from a timing error estimator so that phase adjustment is not applied during the estimation phase.

11. The one or more circuits of claim 10 wherein estimating a frequency error between the data rate and the sampling rate comprises accumulating the estimated phase error for the samples, and scaling the accumulated estimated phase error to compute the frequency error.

12. The one or more circuits of claim 10 wherein combining the estimated phase error with the estimated frequency error comprises incrementally combining the estimated frequency error with the estimated phase error over the samples.

13. The one or more circuits of claim 12 wherein combining the estimated phase error with the estimated frequency error comprises combining the estimated frequency error with the estimated phase error in incremental linear steps over a portion of the samples different from a portion of the samples used for estimating the frequency error.

14. The one or more circuits of claim 10 wherein estimating the frequency error is performed using a first portion of the samples.

15. The one or more circuits of claim 14 wherein estimating the phase error is performed using a second portion of the samples different from the first portion.

\* \* \* \* \*